US008000679B2

(12) United States Patent
Hutcheson et al.

(10) Patent No.: US 8,000,679 B2
(45) Date of Patent: *Aug. 16, 2011

(54) BUSINESS METHOD FOR PROVIDING WIRELESS COMMUNICATION SERVICES AND NETWORK AND SYSTEM FOR DELIVERING SAME

(75) Inventors: S. Doug Hutcheson, San Diego, CA (US); Michael Brink, Bend, OR (US); Scot Jarvis, Sammamish, WA (US)

(73) Assignee: Cricket Communications, Inc., San Diego, CA (US)

( * ) Notice: Subject to any disclaimer, the term of this patent is extended or adjusted under 35 U.S.C. 154(b) by 1237 days.

This patent is subject to a terminal disclaimer.

(21) Appl. No.: 11/529,074

(22) Filed: Sep. 27, 2006

(65) Prior Publication Data

US 2007/0202845 A1  Aug. 30, 2007

Related U.S. Application Data

(63) Continuation of application No. 09/772,066, filed on Jan. 30, 2001, now abandoned.

(60) Provisional application No. 60/241,830, filed on Oct. 20, 2000.

(51) Int. Cl.
*H04M 11/00* (2006.01)
(52) U.S. Cl. ............... 455/406; 455/405; 379/114.01; 379/114.06; 379/114.22
(58) Field of Classification Search .......... 455/405–408; 379/114.01–114.06
See application file for complete search history.

(56) References Cited

U.S. PATENT DOCUMENTS

| | | | | |
|---|---|---|---|---|
| 6,201,957 | B1 * | 3/2001 | Son et al. | 455/406 |
| 6,243,572 | B1 * | 6/2001 | Chow et al. | 455/408 |
| 6,798,871 | B2 * | 9/2004 | Richardson | 379/114.04 |
| 6,959,183 | B2 * | 10/2005 | Hutcheson et al. | 455/406 |
| 7,062,024 | B2 * | 6/2006 | Kreckel et al. | 379/126 |
| 7,248,855 | B2 * | 7/2007 | Joyce et al. | 455/406 |
| 2010/0223096 | A1 * | 9/2010 | Bosan et al. | 705/10 |

* cited by examiner

*Primary Examiner* — Sharad Rampuria
(74) *Attorney, Agent, or Firm* — Perkins Coie LLP

(57) ABSTRACT

The present invention is directed to an improved business method for a wireless communication system. The improved business method, operations method, network and system of the present invention includes the steps of delivering cellular services to the mass market, reducing peak capacity, increasing overall capacity utilization, improving capital utilization, providing an "all-you-can-eat" pricing model, and designing capacity based upon where the users live, work, and play.

20 Claims, 39 Drawing Sheets

PROOF OF CONCEPT CHATTANOOGA

CRICKET WAS EBITDA BREAK-EVEN IN CHATTANOOGA AT 12 MONTHS

| | | |
|---|---|---|
| 7.7% PENETRATION | 12 MONTHS<br>24,000 CUSTOMERS<br>AS OF 2/29/00 | 5 YEARS |

COSTS IN <u>FIRST</u> YEAR

| | | |
|---|---|---|
| COST PER GROSS ADD | <$230 | $550 |
| SUPPORT COSTS/AVERAGE SUB | $5.60 | $11.45 |
| OPERATIONS COST/MOU | $0.013 | $0.039 |

*FIG. 18*

CAPITAL UTILIZATION

| | YEAR FROM SYSTEM LAUNCH | | | | |
|---|---|---|---|---|---|
| | 1 | 2 | 3 | 4 | 5 | 10 |

CUMULATIVE ANTICIPATED CAPITAL EXPENDITURE PER SUBSCRIBER (AVERAGE)
(IN THOUSANDS OF DOLLARS)

| | 1 | 2 | 3 | 4 | 5 | 10 |
|---|---|---|---|---|---|---|
| POWERTEL (GSM) | 9,516 | 4,613 | 2,528 | 1,689 | 1,280 | 692 |
| SPRINT (CDMA) | 19,367 | 4,349 | 1,860 | 954 | 729 | 586 |
| PRESENT INVENTION | 2,354 | 2,628 | 1,949 | 1,183 | 877 | 550 |

CAPITAL EXPENDITURE PER ERLANG (AVERAGE)

| | 1 | 2 | 3 | 4 | 5 | 10 |
|---|---|---|---|---|---|---|
| POWERTEL (GSM) | 278 | 163 | 98 | 70 | 56 | 33 |
| SPRINT (CDMA) | 968 | 217 | 93 | 47 | 36 | 29 |
| PRESENT INVENTION | 47 | 52 | 38 | 23 | 17 | 11 |

*FIG. 19*

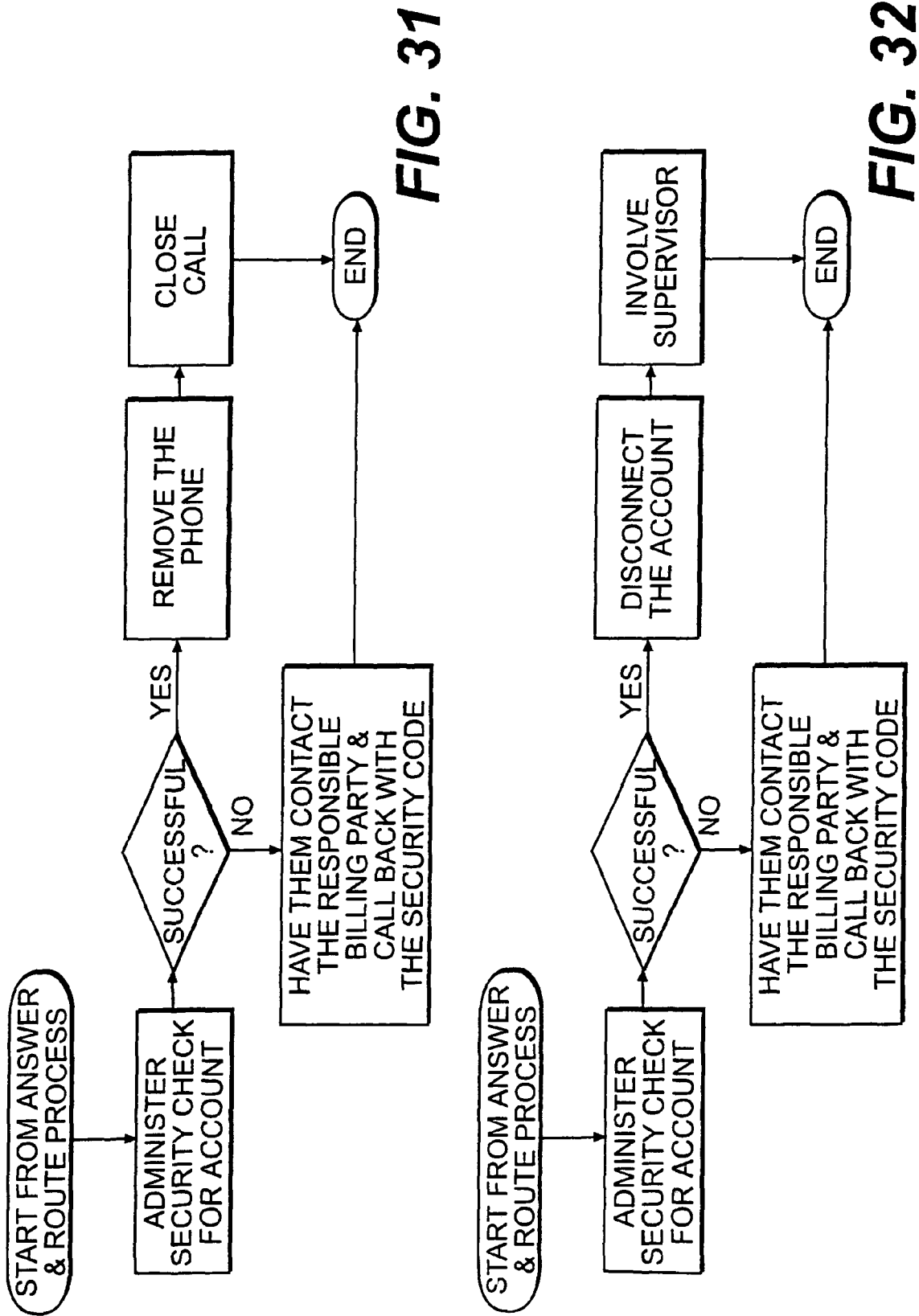

BUSINESS METHOD FOR PROVIDING WIRELESS COMMUNICATION SERVICES AND NETWORK AND SYSTEM FOR DELIVERING SAME

RELATED APPLICATIONS

This application is a continuation of U.S. patent application Ser. No. 09/772,066, filed on Jan. 30, 2001 now abandoned, titled "Business Method for Providing Wireless Communication Services and Network and System for Delivering Same," the entire disclosure of which is incorporated by reference herein, as if being set forth in its entirety, which claims priority on provisional U.S. Patent Application Ser. No. 60/241,830, filed Oct. 20, 2000, titled "Business Method for Providing Wireless Communications Services and Network and System for Delivering Same."

FIELD OF THE INVENTION

The present invention relates to an improved business method, operations method, network and system for delivering wireless communications services. The business method, operations, and network and system of the present invention may be used separately, or in combination. The invention is adapted to higher overall network capacity, lower peak capacity, and higher overall network usage, relative to prior known methods, networks, and systems for delivering wireless communications services. The present invention may feature flat rate billing of users. This is in contrast to prior known wireless services, in which services are delivered on a per call or per minute usage charge basis. This change in pricing model affects usage and capacity of the network in certain ways. In a preferred embodiment, the system and network of the present invention employs flat rate billing, achieves high capacity utilization of network components, and achieves lower peak capacity. These features enable the network and system of the present invention to handle a higher overall volume of calls with less costly central network components and more streamlined operations than conventional cellular systems.

BACKGROUND OF THE INVENTION

Wireless communications services represent the fastest growing segment of the telecommunications industry worldwide. Although the Telecommunications Act of 1996 was intended to open the competitive environment in the United States, allowing many new entrants into the local access loop, growth has been constrained by several factors. Some of these factors are endemic to any communications system (limited bandwidth, high capital costs, etc.). Other constraints are imposed by the business models that have come to be generally accepted in the industry. Most land line and wireless operators typically derive the majority of their revenues and profits from a relatively few—"heavy" and "business"—users of their networks. The heavy and business user segments have come to be considered the most desirable segment of the wireless customer population, due to their relative price inelasticity. Land line providers have typically focused on business users. Accordingly, per minute of usage pricing of cellular services has been adapted to that conventional business model, which was introduced in the late 1980's That conventional model, however, imposes constraints on operations and networks, and presents high usage charges to casual users. These patterns have, in fact, been favored by cellular operators due to the high profitability levels they offer.

A conventional wireless system of the type known prior to the present invention is described by Robert C. Raciti, in CELLULAR TECHNOLOGY (July 1995), which is incorporated herein by reference. Prior known cellular networks are typically constructed to achieve a relatively uniform level of coverage over a preselected service area. The service area is extended to a greater metropolitan area, namely, major population centers and major highway connections. Generally, the service area is specifically adapted to serve roaming traffic, which is billed at a higher rate. Consequently, roaming is favored in prior known systems. The service has been marketed on the breadth of coverage as well as complex features, targeted at the heavy and business users.

Network capacity is rationed, to avoid over use of the network, by maintaining pricing levels that tend to limit casual usage. Use is metered by price, and constrained by that pricing within the design limits of the system. When the existing wireless communications operators have looked at moving their market focus from the typical business users to a broader market, they have typically introduced prepaid services that allow the consumer to control the costs but have required very high per minute usage charges.

Wireless communications networks using this conventional business model typically comprise three basic components: Cell sites with RF base stations; Mobile Telephone Switching Offices (MTSO); and mobile phones that are provided to subscribers. Each base station contains a radio transceiver and controller, and provides radio communications to the mobile phone units operating in its cell. The cells are typically engineered into a network that is deployed in a hexagonal cell pattern, in order to provide local, regional, or national cellular coverage.

The MTSO links calls together using traditional copper, fiber optic, and/or microwave technology and acts as a central office exchange, allowing users to place a call on the local and long distance public telephone systems or mobile to mobile traffic. It allows mobile communication devices in the, cell to dial out and alerts devices in the cell of incoming calls. The MTSO continuously monitors the quality of the communications signal and transfers the call to another base station that is better suited to provide communications services to the mobile device.

The mobile communication devices comprise hand-held phones, car phones, notebook computers, personal digital assistants, pen-based computers, palm-top computers, pagers, hand-held e-mail devices (such as those produced under the Blackberry™ brand), and portable data collection devices. The present inventors anticipate that, although the majority of cellular traffic has traditionally been voice communications, the relative proportion of traffic that comprises data, text, and potentially video, messages is increasing and is expected to increase dramatically in the coming years. The present invention is intended to work with all wireless communications devices. When these various types of mobile units communicate with the network, they must register with the system by subscribing with a wireless operator.

Most wireless operators of prior known systems have arrangements with other operators allowing users to roam. Roaming occurs when the mobile unit is outside the coverage area of their "home" cellular service provider and an alternative cellular provider handles the communication. Mobile units may also be connected to the Public Switched Telephone Network (PSTN) operated by an Incumbent Local Exchange Carrier (ILEC), Competitive Local Exchange Carrier (CLEC), Regional Bell Operating Company (RBOC), long distance carrier, or other telecommunications provider.

The radio spectrum used for wireless (cellular) communications comprises many bands that are allocated and used for commercial, personal, and military use. Fifty (50) MHZ of spectrum is allocated to cellular networks in the 824-849 MHZ and the 869-894 MHZ bands. This spectrum has been allocated into two 25 Mhz bands and has generally been allocated to very large service providers. Other bands of spectrum have been allocated for wireless communications. PCS is a wireless communications network that operates at a radio frequency of 1.9 GHz. This spectrum has been subdivided into three 30 Mhz and three 10 Mhz bands that are used by both large service providers and many new, more innovative service providers. The allocation of radio spectrum in the United States is described in the NTIA Manual of Regulations and Procedures for Federal Radio Frequency Management, Ch. 4, at 4-4 to 4-91 (2000), which is incorporated herein by reference.

Several types of network access are available in the United States including, without limitation: Advanced Mobile Phone Systems (AMPS), Time Division Multiple Access (TDMA) (in two formats), and Code Division Multiple Access (CDMA). AMPS is the cellular standard that has been extensively deployed in North America and has been commercially available since 1983. The current cellular standard describing access methods to the network is IS-553. It divides 50 MHZ of spectrum into 832 frequency channels, each 30 KHz wide. Various organizations, such as the Portable Computer and Communications Association (PCCA), modem manufacturers, computer manufactures, and service providers, have worked together in defining the IS-553 interoperability standard.

Time Division Multiple Access (TDMA) is a digital access method that allocates time slots to different users, allowing them to share similar radio frequency channels. TDMA divides each frequency channel into six time slots and allocates two slots to each user. This time division of the carrier signal increases the network capacity by 300% (a factor of 3). Standard IS-54, currently upgraded to IS-136, describes a dual mode network access method allowing mobile units the choice of using TDMA or AMPS operation.

Code Division Multiple Access (CDMA) sends multiple messages over the same wide frequency channel that is decoded at the receiving end. Each mobile unit in a cell is assigned a different spreading sequence. This allows multiple users to share the same frequency spectrum. The use of CDMA increases network capacity by an order of magnitude (a factor of ten). CDMA network access standards are specified in standard IS-95, which is incorporated herein by reference. TDMA and CDMA digital access methods offer superior performance in terms of higher capacity, improved voice quality, encryption for communication privacy, and integration with digital terrestrial networks.

Cellular Digital Packet Data (CDPD) is a technology standard sponsored by the RBOCs and McCaw Cellular. CDPD overlays packet switching onto the existing cellular voice network, and transmits data packets over the idle capacity. This packet overlay is based on an Internet protocol backbone and does not need the call setup procedures that are required for switched voice calls. This makes CDPD adapted to short, bursty message applications, such as point-of-sale (POS) credit card verification, vehicle dispatch, package tracking, and e-mail. CDPD generally increases the network utilization, yet, excessive data traffic may cause interference with existing cellular calls.

There are a number of other wireless applications that may be used in conjunction with cellular telephony or separately: digital communications such as CDMA; cordless telephones; paging; specialized mobile radio (SMR); and satellite communication. Networks based on digital communications typically have a greater capacity than analog networks for carrying voice and data traffic than analog networks.

Michael E. Porter, in COMPETITIVE STRATEGY (1980), which is incorporated herein by reference, described various stages through which products progress through their life cycles: introduction; growth; maturity; and decline. Prior to the present invention, the cellular industry has remained in its growth phase. Some characteristics of Porter's growth phase are: growth in use; widening of the buyer group; improved reliability; competitive product improvements; increased advertising; increased channels of distribution; and high profit margins. The cellular industry has shared these features prior to the present invention.

There are approximately 100 million cellular customers in the United States. Cellular service is growing at a rate of approximately 1 million new customers every month. The buyer group has widened, extending the initial buyer group of large businesses to include most businesses. System reliability has improved, greatly. There have been many competitive product improvements, such as digital technology advancements, voicemail, encryption, and enhanced battery life. Cellular products and services are featured widely in advertising on television, radio, print, and on the Internet. Alternate channels of distribution are also becoming more popular. For example, retail office supply, electronic, and computer chains are actively marketing cellular phones and services. Throughout this period of growth, cellular operators have enjoyed high profit margins.

McCaw Cellular was one of the early entrants into the wireless telephone market. The business model developed by McCaw (AMPS) has come to be generally accepted as the predominant business model for rendering cellular service, at least in the United States. A typical cellular system 10 configuration of the type that was known prior to the present invention is described by Heith Knightson, in D1-CELLULAR NETWORK INFRASTRUCTURE—VOICE AND SHORT MESSAGE SERVICES, Telecommunications Standards Advisory Council of Canada (1997), which is incorporated herein by reference. As described by Knightson, AMPS is based on analog RF technology operating on frequencies 825-844 MHZ and 870-899 MHZ. The definitive standard for AMPS voice services is TIA IS-53 Cellular Features Description, which is incorporated herein by reference. The mechanisms to implement these services are given in TIA IS41 Cellular Radio Telecommunications Intersystem Operations, which is incorporated herein by reference.

Prior to about 1997, AMPS was generally considered to be the main technology for providing mobile phone service. Currently, digital technologies, such as TDMA and CDMA have gained ascendency. These digital technologies offer improved voice quality and increased capacity. Standards have been promulgated for each technology, which are incorporated herein by reference. Although the technologies for TDMA and CDMA are different from AMPS, some of the equipment, infrastructure, and standards currently deployed for AMPS may be used in CDMA and TDMA networks. The radio portions (physical layer) of the mobile phones and base stations have been modified to support these new RF technologies.

The cellular network is viewed by the PSTN as an alternative End Office, where voice traffic originates and terminates. The interface between the PSTN and cellular network operates SS7 protocols, which are incorporated herein by reference. Within the cellular network, the signaling and voice traffic operate over separate trunking facilities, just as in the land line network. The SS7 protocol is used to carry signaling information over these out-of-band common channel signaling facilities. This separation of signaling and voice traffic is also preserved over-the-air. Between the mobile phone and the base station, the Forward Control Channel and Reverse Control Channel convey signaling information. Voice traffic is transmitted over the Forward Voice Channel and Reverse Voice Channel.

FIG. 1 illustrates the relationship between the cellular network infrastructure and the PSTN in wireless communications systems of the type that were common in the cellular industry prior to the present invention. The IS-41 messages are routed via Signaling Transfer Points (STPs). The STPs handle network routing. In particular, the route to the Home Location Register (HLR) for a specific mobile phone is handled by the STP. This has the advantage that, as the network expands and ranges of mobile phone numbers are assigned to different HLRs or new ranges come into service, only the routing tables in the STP need be updated. Mobile Switching Centers (MSCs) do not need to maintain full routing tables to all other MSCs. FIG. 2 illustrates the functions and interfaces that support voice services. The interface reference points are defined in the IS41 standard, which is incorporated herein by reference, to ensure correct interoperation of equipment. A typical cellular system prior to the present invention was understood to comprise the following functional elements:

Authentication Center (AC): The AC manages the authentication information related to the Mobile Station (MS). The AC may, or may not be located within, and be indistinguishable from an Home Location Register (HLR). An AC may serve more than one HLR.

Base Station (BS): The BS describes all of the radio equipment at a single location used for serving one or more cells. The Base Station comprises a Base Station Controller and the Base Station Transceiver systems.

Equipment Identity Register (EIR): The EIR maintains user equipment identity information. The nature, purpose, and utilization continues to develop and the present inventors intend that all such uses to which these components may be put are considered part of the present invention. The EIR may, or may not, be located within, and be indistinguishable from an Mobile Switching Center (MSC).

Home Location Register (HLR): The HLR is the location register to which a user identity is assigned for record purposes such as subscriber information (e.g. ESN, MDN, Profile Information, Current Location, Authorization Period). The HLR may, or may not be located within, and be indistinguishable from an MSC. The HLR may serve more than one MSC. The HLR may be distributed over more than one physical entity.

Integrated Services Digital Network (ISDN): The ISDN is defined by the appropriate ANSI TI Standards, which are incorporated herein by reference.

Mobile Station (MS): The MS is the interface equipment used to terminate the radio path at the user side. It provides the capabilities to access network services by the user.

Mobile Switching Center (MSC): The MSC provides the interface for user traffic between the cellular network and other public switched networks, or other MSCs in the same or other cellular networks.

Public Switched Telephone Network (PSTN): The PSTN is defined by the applicable ANSI T 1 Standards.

Visitor Location Register (VLR): The VLR is the location register other than the HLR used by an MSC to retrieve information for handling of calls to or from a visiting subscriber. The VLR may, or may not be located within, and be indistinguishable from an MSC. The VLR may serve more than one MSC.

The main feature of the cellular network voice service when compared with POTS (plain old 5 telephone service) is the geographical mobility of the phone. The equipment and interfaces depicted in FIGS. 2 and 3 perform two main functions. First, they transmit and receive voice signals over the radio spectrum. This is primarily the function of the Base Station and Mobile Station, which occurs over the Um interface. Second, they track where each mobile phone is within the cellular network. This is called "mobility management" and is performed by the MSC, referencing and dynamically updating the HLR and VLR databases. As shown in FIGS. 2 and 3, this occurs over the C, D, B, and E interfaces.

The interfaces and standards associated with these two functions of RF transmission and mobility management are distinct to cellular voice services. The other interfaces connect the cellular network to the existing land line telephone network (PSTN or ISDN), support authentication of users and equipment (AC and EIR), or support special features such as the Short Message Service (as shown in FIG. 3), that are not shown in the previous figures. These functions of network interconnection, security, and special services are not unique to the cellular network. Similar functions can be found in all land line telephone networks.

The generally accepted consensus standards applicable to wireless communications systems of the type known prior to the present invention are identified in Table 1, each of which standards are incorporated herein by reference:

TABLE 1

Standards Applicable to Wireless Communications Interfaces

| Interface | Applicable Standards ITU/ISO | Comments ANSI/TIA/EIA |
|---|---|---|
| A: BS to MSC interface | n/a | n/aIS-634 |
| Ai: MSC to PSTN interface | X.25 | SS7IS-93-A |
| B: MSC to VLR interface | X.25 | SS7IS-41.2, IS-41.3 |
| C: MSC to HLR interface. | X.25 | SS7IS-41.2, IS-41.3 |
| D: VLR to HLR interface | X.25 | SS7IS-41.2, IS-41.3 |
| Di: MSC to ISDN interface | ? | T1.611IS-93-A |
| E: MSC to MSC interface | X.25 | SS7IS-41.2, IS-41.3, IS-41.4 |
| F: MSC to EIR interface | not defined | not defined; |
| H: HLR to AC interface. | X.25 | SS7IS-41.2, IS-41.3 |
| Q: | X.25 | SS7IS-41.2, IS-41.3 |
| Um: B S to MS interface, which corresponds to the air interface | n/a | n/aIS-54-B (TDMA and AMPS), IS-88 AMPS IS-95-A (CDMA) |

Notes:

SS7 refers to the ANSI standards T1.111, T1.112, and T1.114.

X.25 refers to ITU Recommendation X.25 and ISO 8878, ISO 8208 and ISO 7776.

Consensus standards for wireless communications networks have been promulgated by various bodies. Table 2 identifies the most prominent standards, each of which are incorporated herein by reference.

TABLE 2

| Wireless Communications Standards | |
|---|---|
| ANSI/TIA/EIA Standards: | |
| TIA/EIA-660 | Uniform Dialing Procedures and Call Processing for Cellular Radio Telecommunications; Telecommunications Industry Association |
| TIA/EIA-664 | Cellular Features Description; Telecommunications Indus Association |
| TIA/EIA/IS-93 | Cellular Radio Telecommunications Ai-Di Interfaces Standard; Telecommunications Indus Association |
| TIA/EIA/IS-41-C.1 | Cellular Radio Telecommunications Intersystem Operations: Functional Overview; Telecommunications Industry Association |
| TIA/EIA/IS-41-C.2 | Cellular Radio Telecommunications Intersystem Operations: Intersystem Hand-off Information Flows; Telecommunications Indus Association |
| TIA/EIA/IS-41-C.3 | Cellular Radio Telecommunications Intersystem Operations: Automatic Roaming Information Flows; Telecommunications Indus Association |
| TIA/EIA/IS-41-C.4 | Cellular Radio Telecommunications Intersystem Operations: Operations, Administration, and Maintenance Information Flows and Procedures; Telecommunications Indus Association |
| TIA/EIA/IS-41-C.5 | Cellular Radio Telecommunications Intersystem Operations: Signaling Protocols; Telecommunications Indus Association |
| TIA/EIA/IS-41-C.6 | Cellular Radio Telecommunications Intersystem Operations: Signaling Procedures; Telecommunications Indus Association |
| TIA/EIA/IS-732 | Cellular Digital Packet Data Specification; Telecommunications Industry Association. |
| TIA/EIA/IS-634 | 800-MHZ A-Interface Supporting AMPS, NAMPS, CDMA, TDMA Air Interfaces; Telecommunications Industry |
| AMPS: | |
| EIA/TIA-553 | Mobile Station - Land Station Compatibility Specification |
| CDMA: | |
| TIA/EIA/IS-95 | A Mobile Station-Base Station Compatibility Standard Dual-Mode Wideband Spread Spectrum Cellular System; Telecommunications Indus Association |
| TIA/EIA/IS-97 | Recommended Minimum Performance Standards for Stations Supporting Dual-Mode Wideband Spread Spectrum Cellular Mobile Stations; Telecommunications Indus Association |
| TIA/EIA/IS-637 | Short Message Services for Wideband Spread Spectrum Cellular System; Telecommunications Indus Association |
| DMH: | |
| TIA/EIA/IS-124 | Cellular Radio Telecommunications Intersystem Non Signaling Data Communications (DMH); Telecommunications Indus Association |
| NAMPS: | |
| TIA/EIA/IS-88 | Mobile Station - Land Station Compatibility Standard for Dual-Mode Narrow Band Analog Cellular Technology; Telecommunications Industry Association |
| TIA/EIA/IS-91 | Mobile Station - Base Station Compatibility Standard for 800 MHZ Analog Cellular; Telecommunications Industry Association |
| TDMA: | |
| TIA/EIA/IS-54-B | Cellular System Dual - Mode Mobile Station - Base Compatibility Standard; Telecommunications Industry Association |
| TIA/EIA/IS-136 | 800 MHz TDMA Cellular - Radio Interface - Mobile - Base Station Compatibility Standard; Telecommunications Indus Association |
| ANSI T1 Standards: | |
| T1.111 | Signaling System Number 7 - Message Transfer Part MTP |
| T1.112 | Signaling System Number 7 - Signal in Connection Control Part SCCP |
| T1.114 | System Number 7 - Transaction Capabilities Application Part TCAP |

TABLE 2-continued

Wireless Communications Standards

| | |
|---|---|
| T1.611 | Signaling System Number 7 (SS7) - Supplementary Services for Non-ISDN-Subscribers |
| T1.209 | Operations, Administration, Maintenance, and Provisioning (OAM&P) - Network Tones and Announcements |
| ITU-T Standards: | |
| T.50 | International Reference Alphabet (IRA) formerly Alphabet No. 5 or IA5 |
| Other Related Documents: | |
| SR-TSV-002275 | Notes on the LEC Networks; Bell Communications Research Inc. |
| TR-NWT-000776 | Network Interface Description for National ISDN-1 Customer Access; Bell Communications Research Inc. |

In addition to the above services, many wireless communications networks also feature Short Message Service (SMS). SMS includes the following additional elements:

Message Center (MC): The MC stores and forwards short messages. The MC may also provide supplementary services for Short Message Service.

Short Message Entity (SME): The SME composes and decomposes short messages. The SME may be implemented in many ways, such as an operator assisted service or interactive voice response service. An SME may, or may not be located within, and be indistinguishable from, an HLR, MC, VLR, MS, or MSC.

The interface reference points in FIG. 4, which support the Short Message Service, are Interface M is the SME to MC interface;
Interface N is the MC to HLR interface; and
Interface Q is the MC to MSC interface.

FIG. 3 depicts a cellular network, of the type known prior to the present invention, which further comprises a Message Center (MC) and Short Message Entity (SME), in addition to the infrastructure shown in FIG. 2. SMS is a data service available over the AMPS network. It is defined in IS-41, and is included under voice services because it is an integral part of the IS-41 specification. SMS allows a single packet of data to be transmitted to or from a mobile phone. SMS does not require packet fragmentation or re-assembly. Message integrity must be maintained across all interfaces, including the air (Um) interface. The SMS attempts to deliver the message whenever the mobile phone is registered on the cellular network, even when the phone is engaged in a voice or data call.

By early 1998, although the market continued in what Porter defines as its growth stage, some of the constraints imposed by the accepted cellular operation model had become apparent to the present inventors. Existing cellular business models in the United States had become stagnant. Only one business model as the McCaw, "AMPS" model—had come into widespread use and the growth of the wireless market had been limited to relatively price-insensitive users based upon that model. Accordingly, the present inventors perceived that known business methods limit future growth. These constraints include price, access to credit-challenged users, ability of users to control their monthly expenditures under prior billing models, high network operating costs, high back office support costs, high capital costs, low capital utilization, and other related limitations.

Capacity constraints were widely perceived to be a problem. Yet, the only apparent technical solutions were approaches to expand peak system capacity. Techniques to utilize existing capacity more efficiently, or using emerging technology through modification of the business model, were unknown.

For example, Motorola and Qualcomm have both been very active in advancing the development of cellular technology. Kaschke, et al., U.S. Pat. No. 6,078,821, discloses a cordless 10 radiotelephone system having an extendable geographic coverage area and a method therefor. Cukak, et al., U.S. Pat. No. 6,058,106, discloses a method for providing a centrally coordinated peer-to-peer wireless communications network. Smith, et al., U.S. Pat. No. 5,432,780, discloses a high capacity sectorized cellular communication system. Willkie, et al., U.S. Pat. No. 5,956,651, discloses a cellular telephone interface system for AMPS or CDMA data services. None of these solutions, however, sought to resolve any capacity limitations through modification of the basic McCaw-type, cellular business model, described above.

Hence, prior to the present invention, entrenched business and pricing models limited the attractiveness of cellular services primarily to business users, who were relatively insensitive to pricing. Average Revenue Per User (ARPU) of many cellular operators of these systems had stagnated. Most cellular networks were employing the same business and technical models, resulting in little relative differentiation between cellular operators. Operators typically resisted the incorporation of new technology. Changes in one portion of a regional or nationwide network could have implications for the entire network. Although most systems had been built to a relatively high peak capacity level, average capacity utilization in most systems was relatively low. Capital utilization was low. Customers were severely segregated based upon pricing. Pricing, in turn, tended to restrict usage.

The cellular industry typically characterizes usage patterns based upon the number of minutes a phone is used each month. Table 3 below, identifies typical usage patterns by the number of minutes used per month:

TABLE 3

Traditional Market Segmentation Prior to the Present Invention Based upon Minutes of Usage (MOU)

| Usage | Minutes of Use per Month | Average Revenue per User |
|---|---|---|
| Very Heavy | >500 | >$100 |
| Heavy | 400-500 min./mo. | >$75 |
| Business | 200-300 min./mo. | $40-75 |

TABLE 3-continued

Traditional Market Segmentation Prior to the Present Invention Based upon Minutes of Usage (MOU)

| Usage | Minutes of Use per Month | Average Revenue per User |
|---|---|---|
| Consumer | 100-150 min./mo. | $25-40 |
| Mass Market | 15-20 min./mo. | $15-25 |

In a cellular network of the type known prior to the present invention, the Mass Market customer group was considered sensitive to price, relative to heavy users. Prior to the present invention, due to the deficiencies of the generally accepted business model for cellular operations, marketing efforts were not generally devoted to this customer segment. Yet, this lowest customer segment (in terms of usage and ARPU) is also the most numerous. Customer growth of most systems, therefore, was inherently limited by their business models. Design limitations prevented them from expanding into the mass market.

These pricing constraints, and resulting constraints on overall usage, were simply accepted by most operators. These constraints enabled operators to reduce the overall system capacity to a lower relative level, with the anticipation that consumers would shift their personal economics to afford these pricing constraints. Yet, this model did not avoid the substantial capital cost of building 10 networks to service peak capacity levels. Moreover, due to the slowness of incorporating new technologies, voice quality of cellular networks was generally considered inferior to that of wireline networks. Hence, the prior known cellular operations business models had failed to deliver cellular services to the mass market, to improve quality, to reduce peak capacity and, therefore, the capital requirements on system networks, or to increase overall capacity utilization.

Other business approaches had been tried but these too failed to deliver the benefits of the present invention. For example, in about 1995, PHS introduced in the Japanese market a strategy of pricing below other cellular providers and close to wireline providers. PHS was successful in so called "telepoint" applications in which subscriber density is very high. William Webb, UNDERSTANDING CELLULAR RADIO (1998), at 183-190, which is incorporated herein by reference.

The business model was well-received by consumers and the service enjoyed strong initial market penetration. The user demographics shifted rapidly from traditional business users to a mass market demographic user profile. Nonetheless, the PHS business model failed to deliver the unique advantages of the present invention for several reasons, including without limitation: unpredictability 5 of the monthly costs; poor service quality do to inferior technology; and churn.

Users employed the service for brief periods, then abandoned it. This churn left the system operators with high initial costs of securing new customers and an insufficient time of retention of those customers to recover the acquisition cost through monthly service charges. This experience merely reinforced the conventional wisdom that the dominant business model, relatively high-priced to cellular service through a network designed based upon coverage and designed to a high peak capacity usage, was the appropriate business model for wireless communications services.

Cellular networks have been deployed that incorporate some of the high capacity features of the present invention, but these network have been operated on the business model of prior known systems. For example, networks have been deployed in both Korea (Seoul) and Hong Kong that employ additional carrier signals to boost system capacity. Prior known cellular systems typically employed a single carrier signal. Adding additional carriers substantially increases system capacity.

These two high capacity Asian cellular systems, are heavy usage CDMA systems designed around a convention cellular usage model, of the type known prior to the present invention. For example, the Seoul, Korea system features up to 6 carriers, on a CDMA network, using a substantial number of frequencies. The system is operated by SK Telecom and serves the metropolitan area in Seoul. Hong Kong had a AMPS and TDMA network. Hong Kong deployed the first CDMA network system. It, too, features numerous carriers and extremely high call capacity, due to the density of downtown Hong Kong.

Both of these known, high capacity systems, however, employed a conventional business model, operations method, network and systems approach. They are designed and operated based upon coverage, rather than capacity. They do not employ the "wireline call model" of the present invention. They do not include the business method, operations, network, and/or systems improvements to address capacity, namely, providing service primarily where people live, work, and play. Although these high-capacity networks in Seoul and Hong Kong featured multiple carriers and substantially more capacity than prior known systems, they did not include other of the unique features of the present invention. They are both "metered capacity" models, in which usage is billed based upon the number of minutes used.

As a result of the extensive experience of the cellular industry, by early 1998, the generally accepted business model for operating a wireless communications network involved: primary business users, numerous additional features for which surcharges applied, relatively high ARPU, and widespread system coverage to secure additional revenues from roamers passing through the system and paying higher roaming surcharge rates.

Neil J. Boucher, in THE CELLULAR RADIO HANDBOOK (1990), which is incorporated herein by reference, discloses a typical demand curve for a wireless system of the type known prior to the present invention. That curve is depicted in FIG. 4. Such a prior known wireless system has two peak times during the day. These occur at approximately 11 am and 7 pm, as illustrated in FIG. 4. In addition, the changes in demand from peak time to low-usage time are significantly high. In contrast, the demand curve for a wireless system according to the present invention, as shown in FIG. 5, is relatively flat and does not have the peaks and significant deltas in demand that occur in prior known wireless systems. FIG. 5 illustrates a typical busy hour utilization of a preferred embodiment of a wireless system according to the present invention.

In 1997, the present inventors began development of a new business model for delivering wireless communications services. The present inventors developed a new method, operations, network, and system for delivering wireless communications services. This invention offered low cost cellular service to a more numerous mass market, rather than merely to a limited submarket of relatively price insensitive business users.

Prior known wireless communications operators typically targeted only high-end market segments, namely, heavy users and business users, and not the consumer or mass markets. ARPU values in the consumer ($25 to 40) and mass market ($15 to 25) were generally understood to be substantially lower than ARPUs' for business users ($40 to 75) and heavy users (>$75). There was no motivation to target lower ARPU customers prior to the present invention. Addressing these consumer and mass markets through prior business models would result in higher capital and customer acquisition costs, lower revenues, and lower profitability. Nor was it obvious that increasing market penetration in these consumer and mass market segments would increase revenues. Particularly in view of the high initial cost of acquisition and high operating costs of most cellular systems, customers at the low ARPU levels associated with the consumer and mass markets would have to be retained for long periods of time. Thus, the prior known business methods, operations, networks, and systems failed to address the unique problems addressed and resolved by the present invention.

The present inventors conducted extensive studies of the demand for cellular services. Based upon these investigations, the present inventors discovered that there were several basic flaws and omissions in the prior known business methods for delivering cellular services. Specifically, rather than being an unprofitable customer segment, the mass market and consumer markets could be viable, provided sufficient costs were driven out of the cellular operation.

This had not been done by prior known business methods. The present inventors discovered that, contrary to the conventional view, as unit price and monthly service fees fell, consumer interest (in the mass market and consumer market segments) increased to relatively high levels of penetration that would support a viable business model.

In order to be profitable, however, additional costs must be driven out of the traditional method of delivering cellular services. Specifically, the high operating costs, high capital costs, and relatively low capacity utilization characteristic of prior known systems each impeded the efficiencies necessary to serve these additional market segments. As the market had already demonstrated, the requisite degree of cost savings was not possible using the prior known methods of rendering cellular services.

The present inventors identified several critical factors in achieving the cost savings necessary effectively to expand cellular service to these additional market segments: improved capacity utilization and reduced peak system capacity; targeted area coverage; improved capital utilization; channels; reduced interconnect costs; improved back office operating efficiency; and improved network operating efficiency.

Particularly in view of a number of recent technical advances, capacity is highly dependent on the network technology employed. Webb, at 101-149, which is incorporated herein by reference. Several advances in recent years have enabled operators to enhance capacity from existing bandwidth and use bandwidth more efficiently, although other operators preferred legacy technology and the associated capacities. The present inventors believe that CDMA technology offers certain capacity advantages relative to rival technologies. Specifically, through the use of CDMA technology, the capacity of the system could be increased by a factor of two in terms of calls per sector, relative to rival technical formats. Similarly, the data rate can be increased from about 8 k to over 100 k, with projections of up to 2.4 Megabits per sector. The present inventors anticipate continued advances in network capacity.

Coverage is one of the primary design criteria for any cellular network. Prior known networks are designed to provide extensive coverage for the basic service area, as well as for the surrounding area and major transportation arteries. Although the cost of this additional coverage is substantial, revenues from roamers, entering the system and using this extended coverage area typically defray the added cost and generate substantial additional revenues in prior known cellular systems. The capacity and signal strength are optimized for coverage, and in particular, in-vehicle use. In addition, the capacity of prior known systems is typically built out to the peak demand of the system, throughout the service area. Although this results in higher capital cost, that capital cost is typically recovered through roaming charges.

The present inventors, however, have designed the system coverage based upon extensive market studies identifying patterns of living, working, playing, shopping, and schooling ("live, work, and play") of the primary service area. The system is designed to provide strong signal coverage, tailored to the usage pattern in each cell in the primary service area. The system of the present invention is preferably designed for in-building, as opposed to merely in-vehicle use. No capacity is built into an extended service area or arteries. System coverage is designed specifically for local service, without regard to roaming. Nonetheless, major interconnection arteries are covered by the service of the present invention.

This provides two benefits. First, the coverage area of the present invention is typically more limited than coverage of systems of the type known prior to the present invention. FIGS. 8 and 9 are maps depicting coverage patterns of a system prior to implementation of a system according to the present invention and after such implementation, respectively.

Second, rather than building peak system capacity throughout the coverage area, the present invention tailors capacity within each cell to expected local traffic patterns. This allows a reduction in system cost. Fewer cells are built and the capacity of the cells that are built is increased relative to prior known systems. The present inventors believe that this approach enables the system to achieve effective coverage for the service area with only about 80% of the number of cell sites of prior known systems, when sites that are related primarily to highway and roaming coverage are removed.

Capital utilization is also enhanced by the present invention as the reduced coverage sites are provided and the cost of capacity is reduced through the use of CDMA technology. In a preferred embodiment of the present invention, the capital expenditure per subscriber is reduced, from 12 to 25% of the capital expenditure per subscriber in year 1 relative to prior known systems, to 25 to 50% of the cumulative capital expenditure per subscriber in year 10. Moreover, due to the higher capacity utilization of the present invention, the difference between the present invention and prior known systems in terms of cumulative capital expenditure per unit of usage is even more substantial. The present inventors estimate that cumulative capital expenditure per unit of usage (Erlang) in year 1 preferably is only about 5% to 15% of prior known methods. In year 10, it is as low as one half.

Based upon these factors, the break even point for a network of the present invention is substantially sooner than for a network of the type known prior to the present invention. In the preferred embodiment of the present invention, the break even point is 12 months, as shown in FIG. 19. The calculations illustrated in FIG. 19 are based upon the "Typical PCS Company" model, as disclosed by the firm Donaldson, Lufkin & Jenrette in THE GLOBAL WIRELESS COMMUNICATIONS INDUSTRY (1999), which is incorporated herein by reference. The present invention may achieve break even at the end of year one, relative to year three in systems of the type known prior to the present invention.

Channel costs of marketing cellular services comprise one of the most significant cost elements for a cellular network. Cellular services of the type known prior to the present invention are typically highly diversified and segmented, featuring highly complex pricing plans and usage models. The selling activity requires highly trained customer service representatives to explain the various phones available, their features, and the relative benefits and disadvantages of the various service plans relative to a particular customers usage pattern. All of this adds substantial selling cost to a wireless operator. The present invention, in contrast, features one or two phones, a simple plan, and high volume usage. Rather than selling through specialized channels, the present invention may sell through mass merchandise outlets. Advertising and marketing efforts are oriented to the point of-sale and limit sales personnel involvement. Each of these features further reduces the selling expense associated with the present invention.

Interconnect costs represent a significant cost factor to the system operator in systems of the type known prior to the present invention. Specifically, when users are charged by the minute, they tend to leave their phones off when they are not placing a call in order to avoid receiving charges for unwanted calls, or they avoid giving callers their phone number. This results in the system operator generating far more outgoing calls than are received within the system. In a typical cellular system of the type known prior to the present invention, the balance between calls generated by the user and calls received is approximately 75% outgoing; 25% incoming. This means that there is a greater chance of the user making a call to a number outside the service area than of receiving one from outside the service area. Interconnect charges, therefore, tend in the direction of the system operator having to pay to operators of other systems fees for outward bound calls made from users within the system.

The present invention, however, seeks to reduce substantially interconnect charges by modifying the user's calling patterns. As the user enjoys unlimited use, without any additional charges for that higher use, the user tends to leave their phone on, even when they are not making a call. The present inventors have observed that usage patterns tend to be more balanced, in the range of 60/40 (20 point difference), in contrast to the 75/25 (50 point difference) balance observed in prior known systems. The present inventors believe that, over periods of several years, usage would migrate toward a balance of 55/45 or 50/50 in a preferred embodiment of the present invention. At that point, the interconnect charges will offset one another, eliminating this cost from the system.

Enhanced network operating efficiencies are another feature of the present invention providing a benefit relative to prior known systems. These benefits may include: reduced direct labor costs; reduced lease costs as a result of fewer, higher capacity cell sites; simplified operations; and improved back office operating efficiencies.

The present invention allows the operator to reduce the total number of cells in the system. This employs less expensive capital equipment and improves the efficiency of maintenance and repair activities, as both fewer cell are used and distance for traveling to the outlying cells that have been eliminated is reduced. As fewer cells are built into the system, lease costs are reduced for cell towers and cell sites. The cost of the fixed network and facilities are reduced relative to systems of the type known prior to the present invention.

The operating model of the present invention is preferably based upon monthly, bill-in advance, pay-in-advance service, which is different then the pay-in-arrears system generally used for credit-worthy business customers or the prepaid system typically used for consumers. The operator, therefore, is not dependent on variable usage patterns, which result in fluctuating revenues. Revenues are based upon service and not the specific features employed from call to call. The revenue stream is leveled, offering the operator greater predictability and certainty.

Back office expenses are reduced dramatically, relative to prior known systems. One of the largest operating cost elements in prior known systems is customer service to handle billing inquiries. A typical cellular billing statement itemizes every call and details the various features (roaming, call waiting, etc.) accessed. This level of detail typically generates billing questions and challenges, all of which must be handled in a person-to-person discussion with the customer service department. The cost of handling this call volume can be one of the largest single cost elements in the back office operation of a typical prior known system. The present intention, however, eliminates these expenses. Credit checks are unnecessary. Account receivable balances are not permitted to accrue. As service is flat rate and pre-paid, there are no charges based upon the number of calls, length of calls, and features accessed. Itemized billing statements may be eliminated and replaced by simple flat rate bills. Accounts receivable and collection activities are eliminated, further simplifying back office operations.

Further, the present invention substantially reduces activation-related costs. The phones of the present invention are sold preactivated. Each phone already has loaded into it a unique cellular number upon leaving the factory. This reduces the effort required to activate. Rather than supplying skilled customer service personnel to assist in activation, activation may be conducted by the customer upon leaving the store. This Over the Air (Activation) Subscriber Provisioning (OTASP) feature of the present invention substantially reduces operations costs, and simplifies the customer's role in activating the phone. OTASP results in substantial cost savings to the system operator.

None of these improvements were obvious at the time the invention was made. In contrast, the incumbent business model has been and remains based upon minutes of usage, the time of day, and features accessed. Absent substantial elimination of costs from the existing model, the shift to lower ARPU users is not desired by system operators.

By combining these features in various combinations, to expand capacity utilization and reduce systems, capital, and operating costs, the advantages of the present invention are fully 5 achieved.

In his recent book, Webb presents a simple and accessible primer on wireless communications systems. William Webb, UNDERSTANDING CELLULAR RADIO, Artech House, Inc. (1998), which is incorporated herein by reference. Webb describes a number of generally accepted network design factors prior to the present invention. Webb notes that prior known systems provided only enough capacity for the expected number of subscribers; if needed, additional capacity would be built into the system at a later date. Webb confirms, that prior to the present invention: "[t]o minimize system cost and roll-out time, operators need to insure that they use the fewest number of cells cites possible to provide the required coverage. The problems would be familiar to the cellular operators who expend considerable time and effort planning their networks to use the minimum number of base stations for the required coverage." Id. at 95. Webb further teaches that in cases where there was not sufficient capacity in the network, "the cells had to be made smaller." Id. at 98. Webb amplifies that "microcells are the only way to improve capacity in city centers." Id. at 99.

Yet, the present inventors have adopted a different approach to network design. By designing for capacity, rather than coverage, the present inventors have been able to further reduce the number of cells, without deploying substantial numbers of microcells. The present inventors have found that, by aggressively managing the cost of their wireless communications services and deploying appropriate technology, preferably CDMA technology, they have been able to increase capacity utilization of the network, dramatically reduce their operating costs, pass substantial savings on to the consumer (who enjoys not only greater access to their wireless communications service, but does so at a lower price), and enjoy ample margin to run the business profitably on a sustaining basis.

OBJECTS OF THE INVENTION

It is therefore an object of the present invention to provide a low cost wireless communications service.

Another object of the present invention is to provide a low cost wireless communications service that is targeted to market segments beyond the traditional heavy and business users.

A further object of the present invention is to provide a low cost wireless communications service that is attractive to mass market users.

An additional object of the present invention is to provide a low cost wireless communications service that is based upon flat rate pricing.

Yet another object of the present invention is to provide wireless communications services that are at a high level of capacity utilization of the cellular network components, relative to prior known systems and networks.

It is an object of the present invention to provide a high quality wireless communications service.

Another object of the present invention is to provide a wireless communications service at a low flat rate monthly charge.

A further object of the present invention is to provide a wireless communications service that enables higher capacity utilization of the wireless network.

An additional object of the present invention is to provide a wireless communications service in a fashion that reduces peak capacity utilization relative to prior known networks.

Yet another object of the present invention is to provide wireless communications services that are preactivated.

Another object of the present invention is to provide wireless communications services while substantially reducing the customer service requirements of prior known wireless networks and systems.

It is an object of the present invention to adapt prior known wireless communications services to improve capacity utilization of the network or system.

An additional object of the present invention is to reduce peak calling capacity.

Another object of the present invention is to adapt the wireless communications services to a targeted coverage area.

Yet another object of the present invention is to achieve improved capital utilization from the wireless communications network and system.

A further object of the present invention is to broaden the channels through which wireless communications services are marketed.

It is another object of the present invention to extend the channels for marketing wireless communications services to mass merchandisers.

An additional object of the present invention to reduce system or network interconnect costs to other system operators.

Another object of the present invention is to improve back office efficiency.

Yet another object of the present invention is to reduce back office operating costs.

A further object of the present invention is to improve network operating efficiency.

It is an object of the present invention to reduce network operating costs.

It is an object of the present invention to bundle long distance service with local wireless communications services.

Another object of the present invention is to combine free unlimited long distance service with local wireless communications services.

An additional object of the present invention is to offer a variety of enhanced features with wireless communication services.

A further object of the present invention is to provide voice mail.

Yet another object of the present invention is to provide call waiting.

It is an object of the preset invention to provide paging.

Another object of the present invention is to provide data services.

An additional object of the present invention is to provide Internet services.

A further object of the present invention is to provide tailored information services adapted to the individual user.

Yet another object of the present invention is to model subscriber behavior and adapt the services delivered to the user based on heuristic studies of the subscriber's preferences and behaviors.

It is an object of the present invention to provide position location information. Another object of the present invention is to provide advertising to users or subscribers.

An additional object of the present invention is to facilitate mCommerce.

A further object of the present invention is to safeguard users' and subscribers' privacy. Additional objects and advantages of the invention are set forth, in part, in the description which follows and, in part, will be obvious from the description or may be learned by practice of the invention. The objects and advantages of the invention will be realized in detail by means of the instrumentalities and combinations particularly pointed out in the appended claims.

BRIEF SUMMARY OF THE INVENTION

As illustrated in the accompanying diagrams and disclosed in the accompanying claims, the invention is an improved wireless communications service, business method, operation method, and network and system for delivering the same.

In one embodiment, the present invention is an improved business method for a wireless communication system, comprising, either alone or in various combinations, the steps of-.

Flat rate billing, not based on individual minutes of use (MOU) or number of individual calls;

Unlimited use, not packaged based on individual minutes of use or number of individual calls;

Providing service where users "live, work, and play";

Achieving wireline phone functionality, as a replacement for the standard wire-line phone (>800 MOU/month);

Mapping customer demand geographically, by where users "live, work, and play" and by demographics of key market segments;

Providing service only in a pre-determined area (no roaming), along with the potential for exchange services with other markets;
Bill-in-advance;
Pay-in-advance;
No service contract required;
Limited hand set and features;
No detailed billing;
Operating expense at or below about 85% of the flat monthly fee;
ARPU equal to or below about $40.00 per month; and
Deploying "islands" of service.

In an alternative embodiment, the present invention is an improved operations and selling method, comprising, either alone or in various combinations, the steps of
Flat Rate billing;
Bill-in-Advance;
Pay in Advance;
No detail call record;
Service in predetermined calling area, with no roaming;
Pre-paid long distance ("gas tank");
Simple service offering;
Centralized systems which enable aggressive and effective cost reduction;
Cost-driven (vs. revenue-driven) operational model;
Reduced churn rate to less than 4% after three months or more (increased stickiness);
Operating expense per subscriber per month less than or equal to about $26;
Cash cost per unit less than or equal to about $20;
Acquisition costs per subscriber less than or equal to about $230;
ARPU less than $40.00 per month;
Margin greater than or equal to about 15%. Single-rate plan;
Achieving better balance in the mix of incoming and outgoing calls to reduce interconnect charges;
Reducing or eliminating collection and bad debt expense;
Reduced sales cycle time;
Phone-in-a-box, containing all the information you need on the outside of the package;
Pre-programmed phones;
Limited handset selection;
Single-band phones;
Customer Activation
Wholesale discount only—no commissions or residuals;
Limited service features;
Familiar features requiring no training;
Inventory kept with distributor;
Phone bundled with service;
Simplified sales process;
Reduced Cost per Gross Add; and
Separate branding of an "all-you-can-eat" service (flat rate/unlimited service).

In a preferred embodiment, the present invention is an improved network and system for delivering wireless communications services, comprising, either alone or in various combinations, the steps of
Generating Erlangs per subscriber per square mile greater than or equal to about 0.03 E;
In building coverage greater than or equal to about 12 db;
Tailoring the network to capacity;
Targeting cell site deployment;
Covered Population per site greater than 4,000;
Second Carrier frequency, upon or within about three months after launch;
Frame error rate less than about 2%; and
Enhanced capacity network offering unlimited use (>800 minutes per month).

It will be apparent to persons of ordinary skill in the art that various modifications and variations any be made to the business method, operations method, network and/or system of the present invention, without departing from the scope or spirit of the invention. For example, although service is preferably unlimited by number of minutes of use or number of calls, service may also be bundled in predetermined amounts, such as 400, 600, 800, or 1,000 minutes a month, or any other level of minutes per time period. Margin may be maintained at any level that supports a sustainable business.

Prior known bundled minute of use service offerings have ranged up to several hundred dollars a months (ARPU) for 2,000 or 3,000 minutes of use. ARPU values of the present invention, therefore, may be set at any level sufficient to distinguish prior service offerings, for example, at $30, $35, $40, $45, or $50 per month. Similarly operating expense per subscriber may be maintained at any sustainable level-below ARPU, such as $26 at an ARPU of $30, or any comparable level on the cost continuum. Similarly, the time period of the service offering is not critical and the present inventors intend to cover offerings at comparable rates (ARPU per month or minutes of use per month) that may be offered for shorter (hours, days, or weeks) or longer (multiple month, quarter, year or longer) periods of time.

Churn may be reduced below levels experienced by unlimited service offerings such as PHS, at any time after a subscriber has been added, whether at 3, 4, or 12 months, or at apy. other time. Acquisition costs per subscriber may be less than or equal to about $500 or any lower level, such as $230.

The level of Erlangs per subscriber, per square mile, may be maintained at any level greater than or equal to about 0.03 E of prior known systems, such as 0.04, 0.05, 0.055, or higher. In building coverage may be maintained at greater than or equal to about 12 db, 15 db, or 18 db, or any other level that distinguishes the in-building coverage of the present invention from prior known systems. Covered Population per Site may be greater than or equal to about, 4,000, 6,000, 8,000, 10,000, or any level along a continuum greater than 4,000. Similarly, the average number of minutes of use per month may be maintained at any level grater than about 400, such as 600, 800, 1,000, or any other level along that continuum.

The Frame Error Rate may be relaxed from 1%, to 2%, or 3%, or any other level that continues to provide effective service. The equipment used is not critical, provided that it provides the requisite capacity, quality, and reliability. Thus, it is intended that the present invention cover the modifications and variations of the invention provided they come within the scope of the appended claims and their equivalents.

It is to be understood that both the foregoing general description and the following detailed description are exemplary and explanatory only, and are not restrictive of the invention as claimed. The accompanying drawings, which are incorporated herein by reference, and constitute apart of the specification, illustrate certain embodiments of the invention, and together with, the detailed description, serve to explain the principles of the present invention.

BRIEF DESCRIPTION OF THE DRAWINGS

FIG. 18 is a slide illustrating the break even point for an implementation of a system according to the present invention.

FIG. 19 is a Table comparing the expected relative Capital Utilization requirements between GSM and CDMA systems of the types known prior to the present invention and the present invention.

FIG. 31 is a flowchart depicting a process for removing a phone from a multi-phone account in a preferred embodiment of the present invention.

FIG. 32 is a flowchart depicting a process for disconnecting a phone in a preferred embodiment of the present invention.

DETAILED DESCRIPTION OF THE PREFERRED EMBODIMENTS

Figure 1:
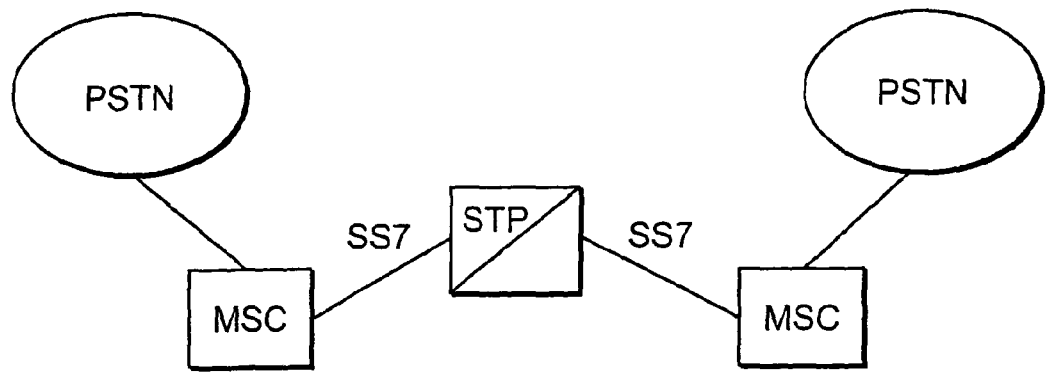
FIG. 1 is a schematic diagram showing the relationship of a cellular network of the type known prior to the present invention to the public switched telephone network.
Figure 2:
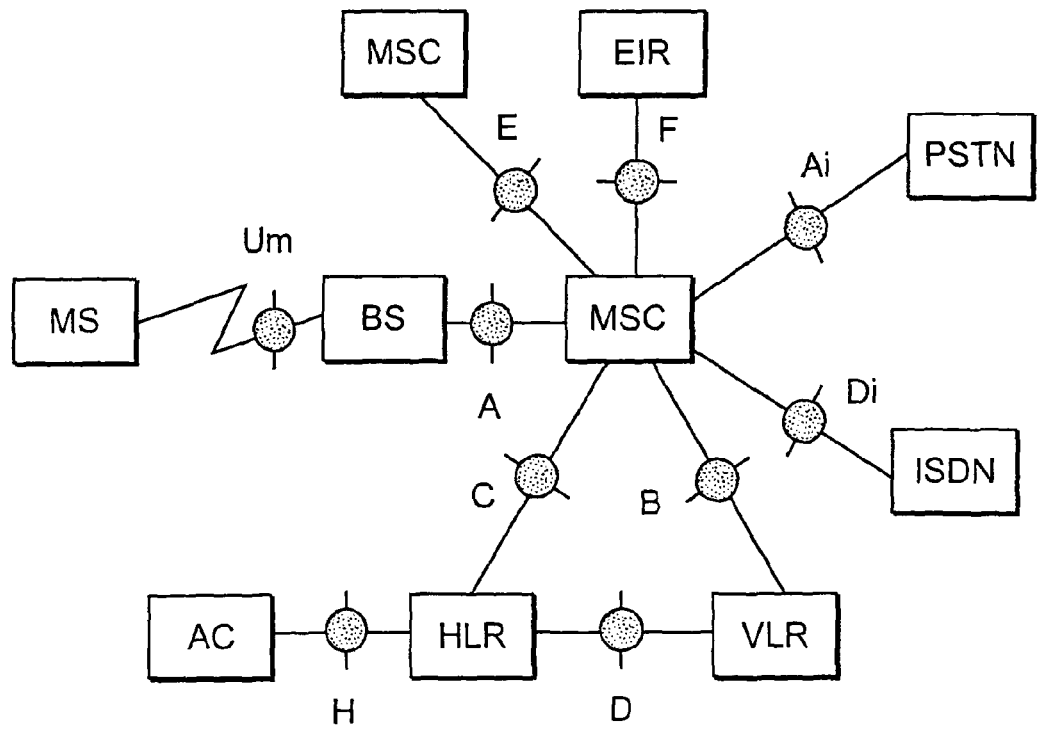
FIG. 2 is a schematic diagram showing the interrelationship of the principal components of a cellular system adapted for voice communications of the type known prior to the present invention.
Figure 3:
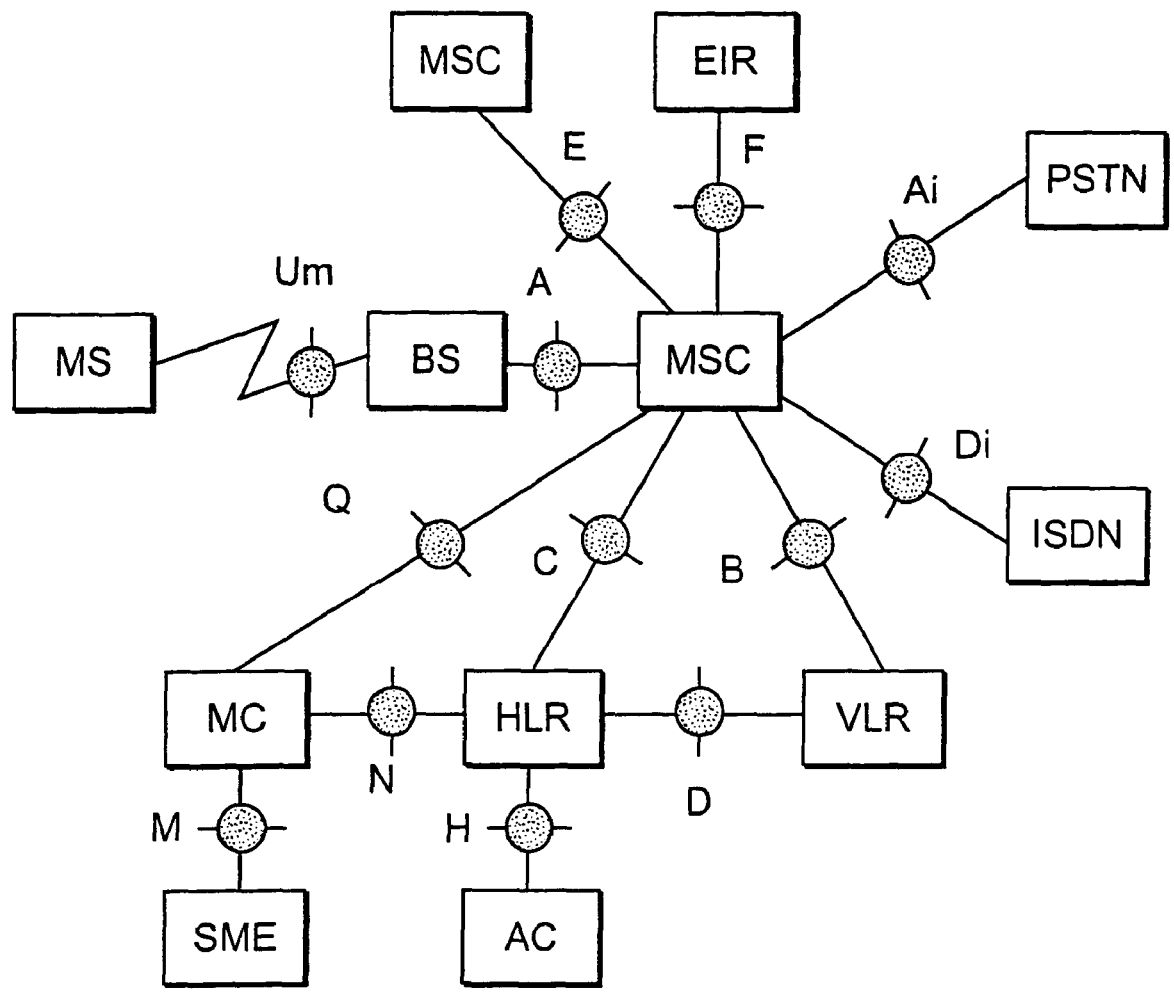
FIG. 3 is a schematic diagram showing the interrelationship of the various components of a cellular system adapted for both voice and data services, of the type known prior to the present invention.
Figure 4:
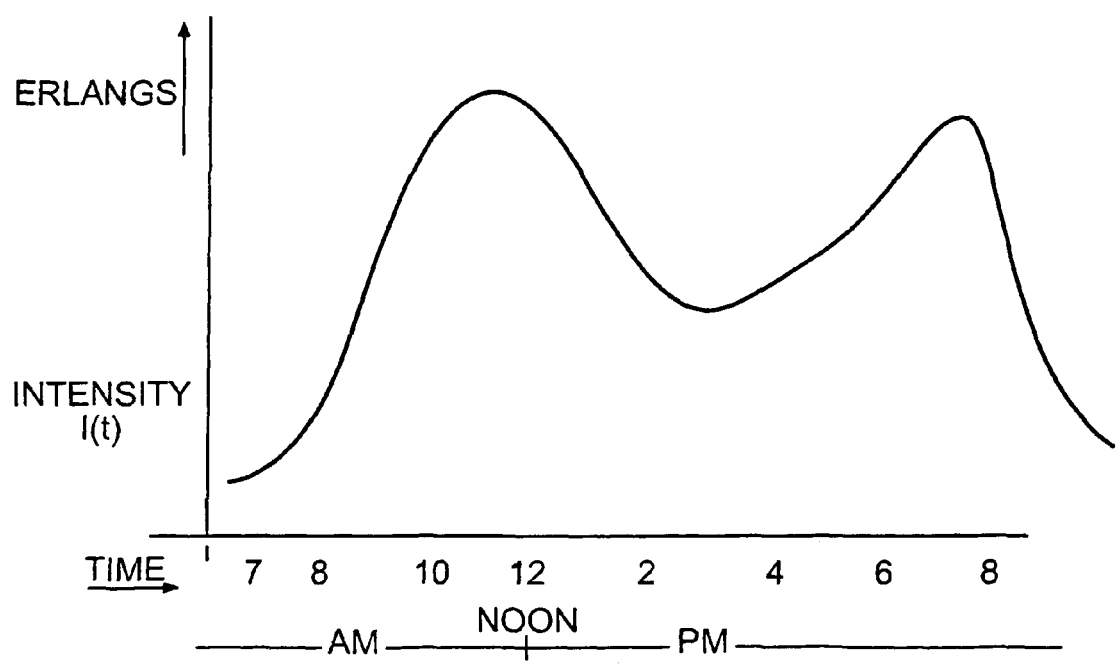
FIG. 4 is a graph illustrating 4 typical demand curve for a wireless system of the type known prior to the present invention.
Figure 5:
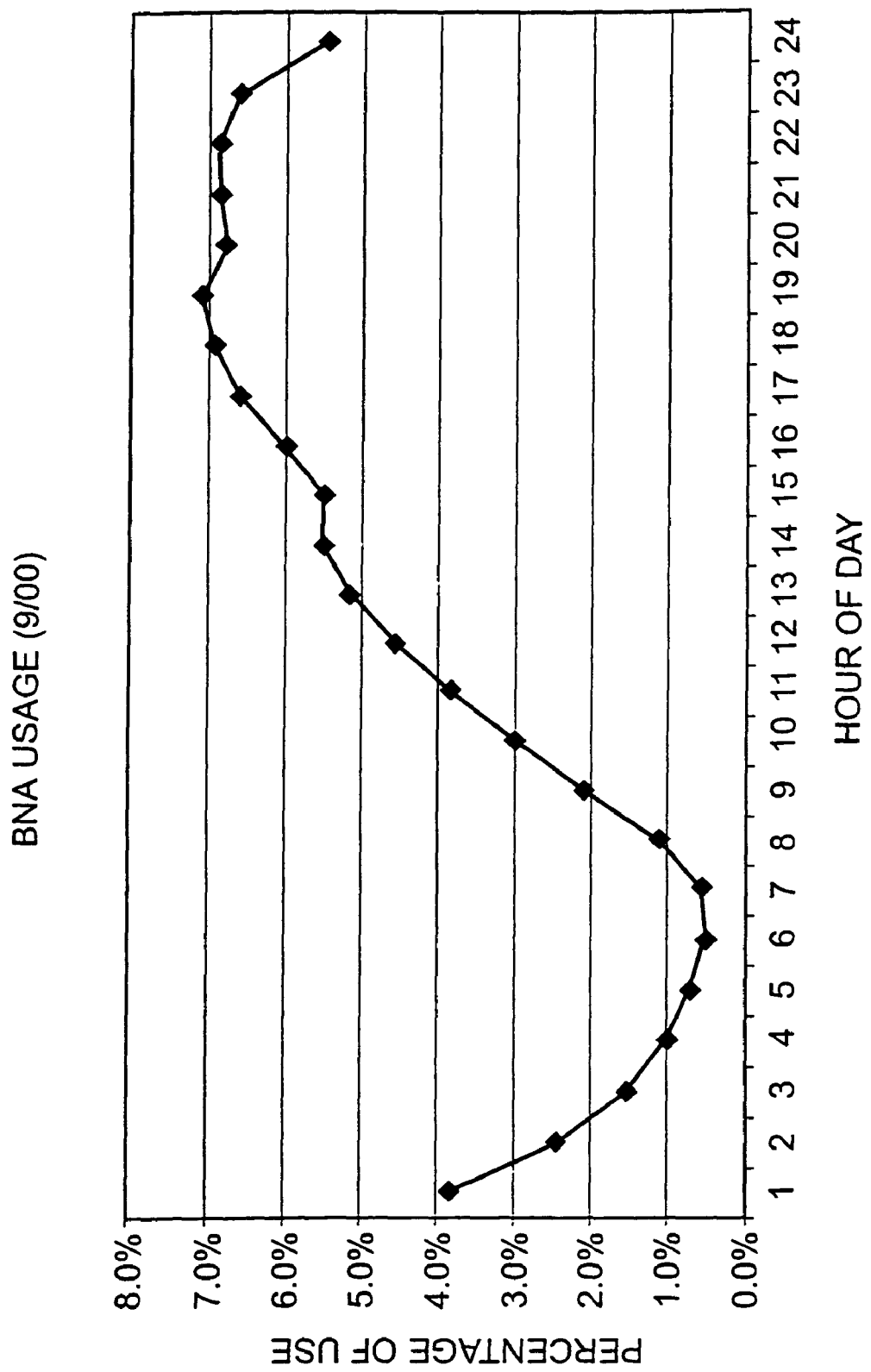
FIG. 5 is a graph illustrating the busy hour utilization of a wireless system of the type known prior to the present invention.

Reference will now be made in detail to a preferred embodiment of the improved business method of the present invention, an example of which is illustrated in the accompanying drawings. First, the basic concept of the service offering of the present invention will be discussed in broad, functional terms. Next, examples will be given of the operation of the invention with respect to various embodiments, namely: a business method, the operations method, and the network and system of the present invention, identifying preferred elements of each embodiment. Additional detail will be provided with respect to the operations method of the present invention with particular attention to a preferred embodiment of the customer service functions of the back office. Third, the conversion of a system of the type known prior to the present invention to incorporate features of the present invention will be discussed.

Basic Concept of the Service Offering

The present invention comprises a realigned service offering for wireless communications services. One objective of the present invention is to develop a high-value, fixed-price, wireless communication service offering that features high voice quality, is directed to the mass market, and succeeds in realigning the service offering to the lowest cost position. Specifically, the present inventors have developed a new business model that is targeted at achieving high subscriber penetration, namely greater than 10 or 20 million nationwide. This level of penetration, however, cannot readily be achieved by focusing only on high-end business users.

One component of the present invention, therefore, is to develop an "every day" wireless focus by attracting a mass market subscriber base. The business method of the present invention relies upon the unique combination of technology, operations, and network engineering to achieve the objects of the invention. In a preferred embodiment, the invention employs CDMAone technology in an optimal manner, to gain maximum competitive advantage from the technical features and advantages that CDMA offers. CDMA technology greatly enhances the capacity of the network. By providing a flat rate unlimited access offering, the present inventors are able to exploit the inherent technical advantages of CDMA to achieve higher capacity utilization than was typical of systems of the type known prior to the present invention. This provides a vehicle for wireless mass communication.

The networks of the present invention may be deployed as "islands"—isolated from sister systems by a geographic area where service is not available. The "islands" of the present invention may be determined based upon market studies. By deploying the network on an "island" basis, the present inventors are able to exploit the latest developments of the technology, building an incremental installed base in each new service area in which they offer their services. This allows the present inventors to capitalize on future technical gains, on a local, regional, and/or national basis, and to improve isolated islands without widespread disruption of a larger network.

The present inventors anticipate that the business method, operations method, and network of the present invention will evolve as their service offering matures. Initially, local and toll calling, voice mail, and long distance service (to be provided by others) are offered in a local metropolitan area. Additional features may be provided, such as call waiting, call forwarding, call barring, and call conferencing. In addition, data products may be available in the form of information, sports, stocks, weather, and any other information of interest. This could be based on Internet-provided content or content from any other source that is housed on or linked into the wireless communication network. Advertising feeds could be supplied over Short Message Service (SMS) or other methods.

In the next phase of evolution of the invention, the present inventors anticipate internalizing long distance service within the product offering and providing a unified message product on a regional basis. One of the features that enables the present inventors to hold costs down is the lack of "roaming." Nonetheless, exchange services could be offered between networks of the present invention on a regional or national basis.

As was the case with the initial stage, call waiting, call forwarding, call barring, and call conferencing may all be offered at this stage. In addition to basic data information (information, stocks, sports, weather, etc.), the present inventors anticipate that enhanced information download services would be provided at this next stage. In addition to providing advertising feeds over Short Message Service (SMS), advertising feeds could be provided over voice, or alternative technologies. In addition, greater customization could be built into the subscriber unit, providing the customer additional options.

The present inventors anticipate that in the third stage of evolution of the invention, long distance service would be provided over IP protocols, across the footprint of those networks deploying the invention. This could occur on a national basis. All of the call waiting, call forwarding, call barring, call conferencing, as well as additional features may be included. Further, mobile data product offerings may be developed to enhance the information download service and basic information services. Advertising may continue to be provided, as appropriate. In addition, as the path of evolution progresses, the present inventors anticipate handset exchanges and upgrade programs would be implemented in order to allow consumers to continue to exploit the most advanced technology and service offering.

The realigned service offering of the present invention features a number of discrete components that enhance its attractiveness to the customer and its effectiveness as a network, as a method of operation, and as a business model. These include, without limitation:

Designing the network for capacity, rather than merely geographic coverage.

Providing coverage primarily in the areas where the users substantially live, work, play, shop, go to school, and undertake most of their day-to-day activities, and principal small corridors between them.

Achieving efficient capital utilization of the network.

Pursuing an enhanced channel strategy in order to reduce the cost of selling and delivering the services to the lowest reasonable point.

Managing variable interconnect costs to eliminate the net outflow of interconnect charges that might otherwise occur.

Improving back office operating efficiency.

Enhancing network operating efficiency.

Increased capacity is an important function of many of the embodiments of the present invention. Table 4 provides some approximations of the capacity, in terms of simultaneous calls per sector/carrier for various telephony applications.

TABLE 4

Simultaneous Calls Per Sector Carrier Capacity By Application

| Application | Present | Future |
|---|---|---|
| Mobile | 15 | 18 |
| Mixed | 19-20 | 23-24 |
| Fixed | 24 | 28 |
| Present Invention | 19 | 19-28 |

As can be seen from Table 4, the present invention provides in the setting of a wireless communication network some of the capacity advantages that are available today only through a wireline or Wireless Local Loop (WILL) telephony system and would be available to other wireless carriers only at some date in the future.

The present inventors believe that the use of the CDMA air interface provides distinct advantages in achieving the preferred capacities of the present invention. The air interface has evolved from the IS-95A Standard (19 calls per sector) in 1998 to the IS-95B Standard (22 calls per sector) to the current IS-95C Standard (39 calls per sector). Present inventors anticipate further evolution of the IS Standard to implement additional improvements. All of these standards are backward compatible. In addition, while the data rate available under IS-95A was only 8K, IS-95B offered 64-115K. Is anticipated further improvements will offer substantially higher rates.

In order to optimize the coverage of the network of the present invention, the design objective in a preferred embodiments of the present invention is to cover a greater metropolitan area with a strong signal and provide a capacity advantage over systems to the type known prior to the present invention.

The signal is designed to achieve effective levels of in-building coverage, rather than in-vehicle coverage typical of prior known systems. The coverage objective is to cover substantially those areas where the lifestyle of the user leads them to work, live, play, shop, or attend school. This is in distinct contrast to systems to the type known prior to the present invention, in which the system was designed for geographic coverage to enhance service to mobile users who travel through the area. Nonetheless, the present invention also covers, in preferred embodiments, the major interconnection arteries within the geographic area.

In a preferred embodiment of the present invention, this results in fewer cell sites being required to provide the requisite level of service. For example, the present inventors anticipate that for an example market, such as the San Diego market, substantial reductions in the number of cells could be achieved, while also achieving the goals of the present invention. Table 5 summarizes this effect:

TABLE 5

| San Diego Marketplace | | | | |
|---|---|---|---|---|
| | Air Touch | Sprint | PBMS | The Present Invention |
| Anticipated Number of Cells | 181 | c. 190 | c. 280 | 155 |

As a result of the business method, operational methods, and network of the present invention, the present inventors anticipate that overall capital expenditures, both on a per subscriber and on a per Erlang basis, can be reduced dramatically. FIG. 19 provides information regarding the anticipated capital expenditure per subscriber. (All dollar values used in this application are in approximately 2000 dollars. The present inventors expressly intended that these values would be adjusted by the user to accommodate changes in the time value of these amounts and/or improvements in technology that may alter the relative values of various elements of the present invention.)

As can be seen from FIG. 19, capital expenditure is high in the early years and falls off as each of the systems mature. The height of the initial peak for systems such as the Power Tel (GSM) and Sprint (CDMA) systems depicted in FIG. 19 are higher in the earlier years than that of the present invention. The cumulative capital expenditure per subscriber for each system is anticipated to be lower in the succeeding years as the systems mature. Yet, the present invention retains a distinct advantage. The same pattern appears with respect to Capital Expenditure per Erlang. The Power Tel and Sprint systems are substantially higher in early years from system launch than is the present invention. Similarly, the present invention may be able to secure savings of up to two thirds in later years, relative to the commutative Capital Expenditure per Erlang of these prior known systems.

Channel costs are reduced in a preferred embodiment of the present invention in a number of ways. The product offering is preferably simple, namely, one phone featuring a limited number of rate plans. Sales are preferably oriented to mass merchandising and mass retail outlets, rather than dedicated specialty stores that require higher investment in real estate and operating expense. Advertising is directed at mass channels. Similarly, marketing efforts are directed in areas where traffic generation is high, such as mass merchandising retailers. Limiting the involvement of sales personnel substantially reduces selling expenses. By packaging the "phone-in-a-box" with all of the material marketing information contained on the outside of the packaging, most of the consumers' questions can be answered by a review of the product offering. The first month's service is preferably included. No extensive and lengthy explanations are required by a specialty sales force, further reducing selling expense.

In contrast, most operators of wireless communications systems of the type known prior to the present invention offer the consumer a bewildering array of options, which also serves to increase the operator's direct selling expense. For example, Cingular Wireless, formerly Bell South, offers to several series of wireless calling plans at the home, region, and nation level. At the time of filing of this application, for example, Cingular offered nine different home calling plans, six different region calling plans, and six different nation calling plans. Each has different monthly costs, numbers of included minutes per month, costs of additional units per month, and included features. Similarly, AllTell Cellular offers three local plans, five regional plans, and-six national plans all of which have different pricing, features, and number of included minutes per month. AT&T and Sprint offer comparable levels of diversity. Even Nextel.com, a service provider that presents itself as offering progressive plans, including an unlimited service plan for about $99 per month, a price point substantially higher than that of the present invention, offers a wide array of plans. For example, Nextel's offering includes digital cellular service (locally, national, and worldwide), a digital radio, business network, business directories, messaging services, online wireless, worldwide service, and additional service features such as: one second rounding, caller ID, call waiting, call forwarding, voice mail, no roaming, additional lines, three-way calling, and call restriction. At each of its levels of rate plan, Nextel offers several options with different pricing, numbers of included minutes, and features. In addition, virtually all of these cellular operators offer an array of handsets, featuring numerous features and options.

The net result of the diversity of handsets, rate plans, and service offerings, is not only consumer confusion and bewilderment, maintaining this array of options increases the operators' direct selling expense. It requires the operator to maintain a highly trained workforce at the point of sale, in order to answer and resolve the consumer's questions. It requires substantial inventory. The present invention avoids this complexity and its attendant effect to complicate the sales process and increase direct, as well as indirect, selling expenses.

The present inventors anticipate that better balance can be achieved by the present invention on inter-connect costs than was available through systems of the type known prior to the present invention. The present inventors further believe that their flat rate pricing encourages balance by eliminating minute of use-based pricing. Specifically, the present invention may allow the inter-connection cost balance to migrate from approximately 65/35 to 65/45 or a number closer to 50/50 over a period of years. Although the present inventors initially anticipated that this process may take about 4 years, the present invention has achieved unexpected results, in which a 53/47 inter-connect balance has been achieved within approximately a year and a half.

The present invention also obtains numerous network operating efficiencies. In a preferred embodiment of the present invention, direct labor cost is reduced. This is, in part, a result of deploying fewer cells, larger cells, and using less equipment. Similarly, lease costs are reduced. This is a result of the reduction of the number of cell sites and towers, as well as a reduction of the level of investment required for fixed network and facilities. The simpler operating model of the present invention, relative to prior known systems is enhanced by the use of larger cells, flat monthly rate structures versus minutes of use revenue-based structures, and basic services versus feature-driven pricing. Back office operating efficiencies are enhanced and cost reduced due to simplified prepaid product offering.

Components of the Business Model; Operations; and Network and Systems Embodiment The present invention comprises various embodiments, that may be used separately, or in combination with one or both other embodiments. Viewed generally, the embodiments of the present invention are as: a business model; operations; and network and system. In turn, those embodiments each comprise one or more functional elements. These elements may be used separately, or in combination with one another, or elements of one type of embodiment may be used in combination with elements of the others.

The business method embodiments of the present invention comprise innovations in one or more of the following areas: business method; economic model implementing that method; capital utilization; "all-you-can-eat" pricing model; capacity driven service; "wireline" design for capacity rather than coverage; based upon where people live, work, and play; and various operational features and functions.

The operational embodiments of the present invention comprise one or more of the following features: marketing; brand strategies and implementation; selling channels; sizes, configurations, and locations for selling; product design and selection; phone selection; phone activation; appropriate staffing in each functional area and balance between each functional area in order to achieve the cost advantage of certain embodiments of the invention; driving substantial cost components out of, or at least down relative to prior known cellular systems; financial modeling; back office operations; billing; financial models; call center; customer service; maintenance; and Network Operations Center ("NOC").

The network and systems embodiments of the present invention comprise: network design; equipment; systems; traffic modeling; growth; deployment; systems integration; maintenance; and financial modeling.

Turning now to each of these basic embodiments, it will be apparent to persons of ordinary skill in the art that each of such embodiments may in turn be embodied in various ways. The assignee of the present inventors has embodied various aspects of the present invention in a service offering in the Chattanooga, Tenn. market, that is sold under the "CRICKET" brand. The business method, operations, and network and systems of the present invention have been referred to by the present inventors as the "Cricket Model."

The business method of the "Cricket Model" features any one or more of the following improvements: simplified back office; network design for in-building coverage; lower marketing costs; and flat-rate fee for service. The Cricket Model offers "wire line" type service on a cellular network, namely, it provides service where people "live, work, and play." The system is designed for "capacity" rather than "coverage." This business model, however, is very different in many respects from the model for cellular systems of the type known prior to the present invention. Consequently, the Cricket Model was received skeptically by persons skilled in the wireless industry, who were experienced with more traditional cellular models.

The operations of the present invention differ in any one or more of a numerous respects from the operations of cellular systems of the type known prior to the present invention. These operational features have been referred to by the assignee of the present invention as the "Cricket Differentiators". These include, but are not limited to: call center; customer operations; internal infrastructure; long distance; voice over IP; billing; trouble ticketing; and Network Operations Center 10 (NOC).

The operations of the present invention involve a number of improvements relative to prior known cellular systems. The billing system is modified and improved. The format, customer service screens and interfaces, and return and repair functions are improved. Simplified "one-line billing" is preferred. The billing is based upon a flat rate for cellular service. Preferably, that rate is low 15 enough to attract additional users who are eliminated by traditional metered billing formats based upon minute of use charges. Payment is requested in advance, eliminating or substantially reducing accounts receivable. Service is terminated for non-payment, eliminating or reducing collections operations.

The present inventors anticipate serving market segments that operators of wireless communication systems the type known prior to the present invention have either failed to serve, or in which they have shown limited or no interest. In particular, individuals residing in households with incomes less than approximately $75,000 per year, generally have not been a target of marketing efforts by prior known cellular system operators. This is primarily because the targets of those systems have been business and heavy users who are relatively insensitive to price. Individuals who do not have credit or whose credit is challenged are also not well served by systems of the type known prior to the present invention. Many system operators require credit checks as well as execution of a formal cellular services contract with consumers. Credit checks alone may eliminate 30 to 60% of potential customers.

The present inventors have identified a number of demographic segments that they believe have been under served or not been the subject of significant interest by operators of prior wireless communication systems. These include, without limitation: New wage earners (age 25 to 35); Blue collar workers; Secondary income spouses; College students; and Teenagers. The present inventors have developed demographic profiles of each of these key market segments and have found certain features that tend to characterize these various segments. New wage earners are likely to move residences frequently. They likely spend discretionary time outside of their primary residence. They focus on convenience and usage. In addition, the present invention may readily become their primary phone.

Blue-collar workers tend to have a more stable residence. The present invention allows easy and convenient outbound communications. Business usage tends to be limited in this segment and usage instead tends to focus on friends and family. The present inventors anticipate that, in this market segment, the present invention will evolve to become the primary phone in approximately 18 to 24 months of usage.

Secondary income spouses also tend to have stable residences. Nonetheless, they tend to be very mobile within a local area, particularly with their children. They are looking for affordable convenience. Although they may expect limited usage of the phone, they tend to evolve into a pattern of primary usage of the wireless phone of the present invention in a period of 24 to 36 months.

College students tend to move their residence frequently, and are unlikely to be in any one place for an extended period of time. This market segment was generally overlooked by operators of conventional systems prior to the present invention due to the high churn rate at the end of semesters. This group tends to use wireless communication services for convenience and tends to use the phone heavily. It quickly becomes their primary phone.

Teenagers also tend to exhibit a stable pattern of residence but are looking for ways to assert their independence. The present invention provides convenience and privacy and quickly becomes their primary phone.

Some of the features of traditional wireless communication systems are particularly ill-suited for these market segments. For example, traditional operators tend to require extended (for example, one year) contracts. Credit checks may prove problematic for certain individuals. The present invention eliminates these disadvantages. As a result of the realigned service offering of the present invention, neither pre-subscription contracts nor credit checks are necessary. Although they could be employed, they tend to increase costs and limit the demographic segment to whom the services may be extended.

In the present invention, training procedures are modified and implemented. In addition, improvements are implemented to bring cost per gross add down to preferred levels. The sales strategy approaches high volume, low value channels that were typically shunned by conventional cellular operators. Indirect selling is implemented.

In a preferred embodiment of the present invention, company stores are modified and adopt a unique look and feel as well as format and style. Indirect costs are managed, in order to drive the cost of selling to the lowest possible level. Mass merchandising channels may be used. In addition, the offering of products (phones) service packages, accessories, and functions is curtailed to simplify the offering and reduce costs. The processes and procedures employed in selling are modified to reduce the cost to convert a new customer to the service of the present invention.

Customer service is improved to lower acquisition cost. Over-the-air activation is implemented to enable mass merchandising channels and reduce or eliminate activation costs. In order to overcome the substantial biases of the industry toward the prior known models and methods, the present inventors implemented orientation, training, and educational materials and programs. Office space costs were reduced in view of the favorable cost structure the invention offers.

The assignee of the present inventors has also included long distance service within the present invention. The long distance service of the present invention is preferably prepaid. The assignee of the present invention accepts payment by credit card and cash, and envisions that various alternative payment plans may be included within the present invention, including, without limitation: monthly billing; automatic debiting of credit cards; over-the-air purchase authorization and payment; and any other appropriate billing and payment mechanism. Long distance traffic is routed from the user's phone, to the switch of the present invention, to a dedicated long distance service box, the balance in the user's pre-paid account ("gas tank") is then checked and, if the user's balance is adequate, the call is routed through a long distance service provider.

Some preferred embodiments of the present invention include an internal network to facilitate the operational improvements of the present invention at reduced cost. These may include: billing; hot lines; call center; trouble ticketing; NOC; and engineering. The internal network of the present invention offers substantial advantages. It is preferably a "voice over IP" network. It operates as a Frame Relay network. Market hubs are connected to regional offices, which are in turn connected to assignee's operation center in San Diego. This internal network provides data and operational to support, as well as Voice over IP service, within assignee's operations. The present inventors anticipate that this internal network could also carry local or long distance traffic relating to the "Cricket" business model, operations, and network and system of the present invention.

The network and systems of the present invention are adapted to provide capacity to service users where they live, work, and play, rather than coverage of a geographic area, as in prior known cellular systems. These features are depicted in the maps, as shown in FIGS. 8 and 9. To accomplish this coverage pattern, the footprint of the system is modified relative to prior known cellular systems. Specifically, the coverage footprint of the present intention is a function of density, competition, and locations and attractions where those users live, work and play within the service area. The system design was adapted to provide high capacity in those areas, at the expense of low usage portions of prior known cellular networks where capacity may have been maintained for roaming use. This can be seen by comparing FIG. 8 (pre-cut coverage) with FIG. 9 (post-cut coverage). Although various of the embodiments of the present invention could offer roaming, it is not a critical or essential element of the present invention and is eliminated from preferred embodiments.

The "capacity" vs. "coverage" feature of the present invention is implemented through various design criteria: adding cells in downtown areas; rework of network design to focus on traffic patterns; modification of the equipment; modifying the geographic extent of coverage; and altering the amount of traffic various cells are carrying in the system. In order to implement some of these improvements, some users phones were changed out to enable the system to enhance capacity.

The network modifications of the present invention, relative to prior known inventions, include a number of modifications to improve capacity. For example, the "in-building" coverage of the network is improved, relative to "in-vehicle" bias of most prior known systems. The present invention pays particular attention to improving capacity at malls, buildings, intersections, and other locations where people live, work, and play. Cell sites and their placement are improved. The system is tailored to "capacity," rather than "coverage" based upon load analyses, switch statistics, and other functional aspects of the system. These improvements were arrived at empirically and through the use of various modeling techniques that are unique to the present invention.

The specific improvements comprise various stages and types. The inventors implemented Enhanced Variable Rate Code (EVRC) technology. According to the present invention, high usage subscribers are offered improved equipment to enable the network to exploit these capacity improvements. The present inventors have selected Lucent equipment for various reasons, including reliability, and capabilities of that equipment, relative to other network components. The inventors have added a second carrier signal and anticipate adding additional carriers as the need for additional capacity grows.

When the present inventors deployed the "Cricket" business model in the Chattanooga, Tenn. market, they took over from the prior system operator, ChaseTel. That system incorporated a traditional design of the type that was known in the art prior to the present invention. The "Cricket" business model, however, requires increased capacity to handle a higher anticipated number of users and higher levels of use than anticipated by prior known metered-use based systems. The present inventors, therefore, found the existing business model, operation, and network and system of the ChaseTel system to be poorly adapted to the present invention.

Figure 10A:
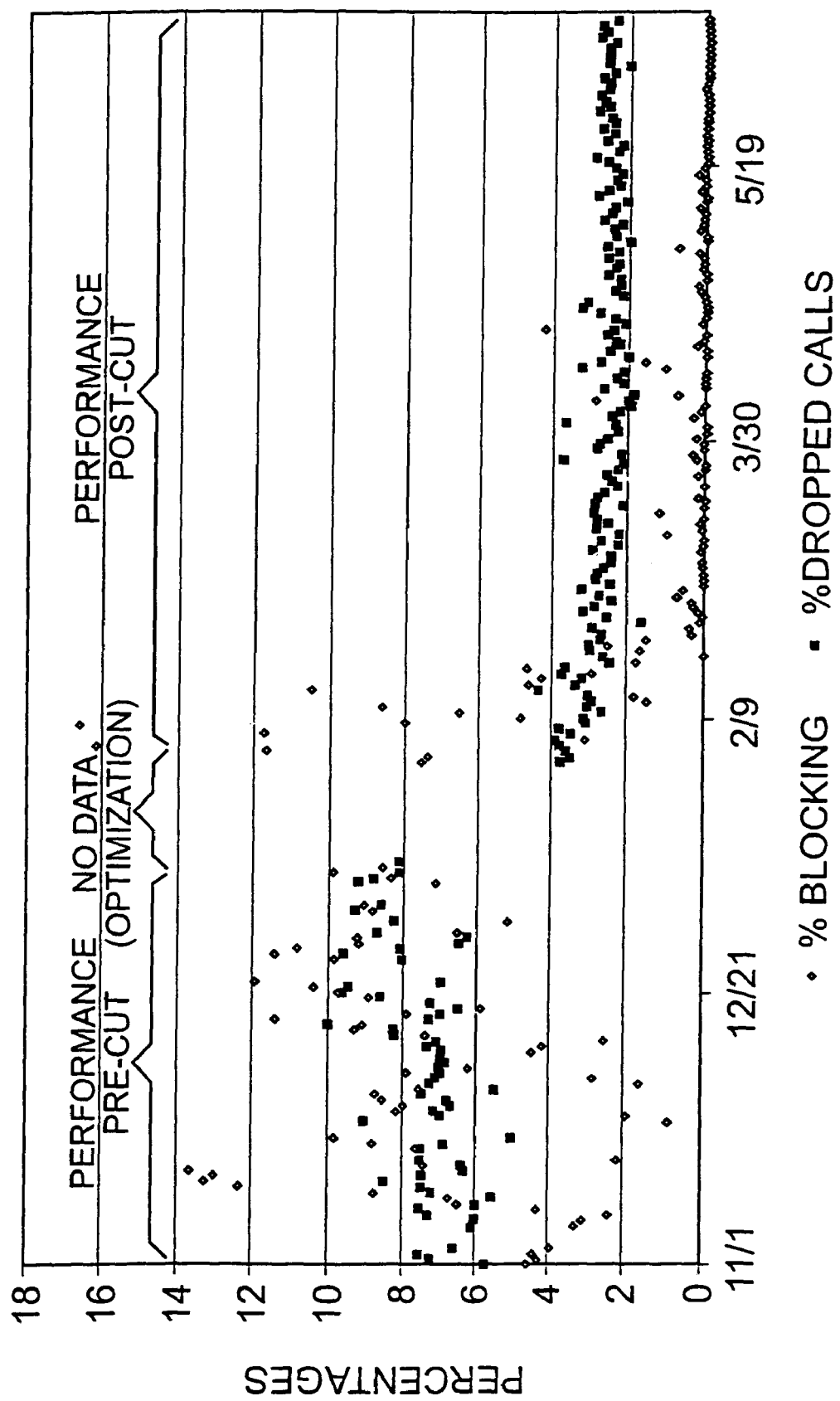
FIG. 10a is a graph depicting actual network performance of both a system known prior to the present invention and a system according to the present invention with respect to combined dropped and blocked calls.
Figure 10B:
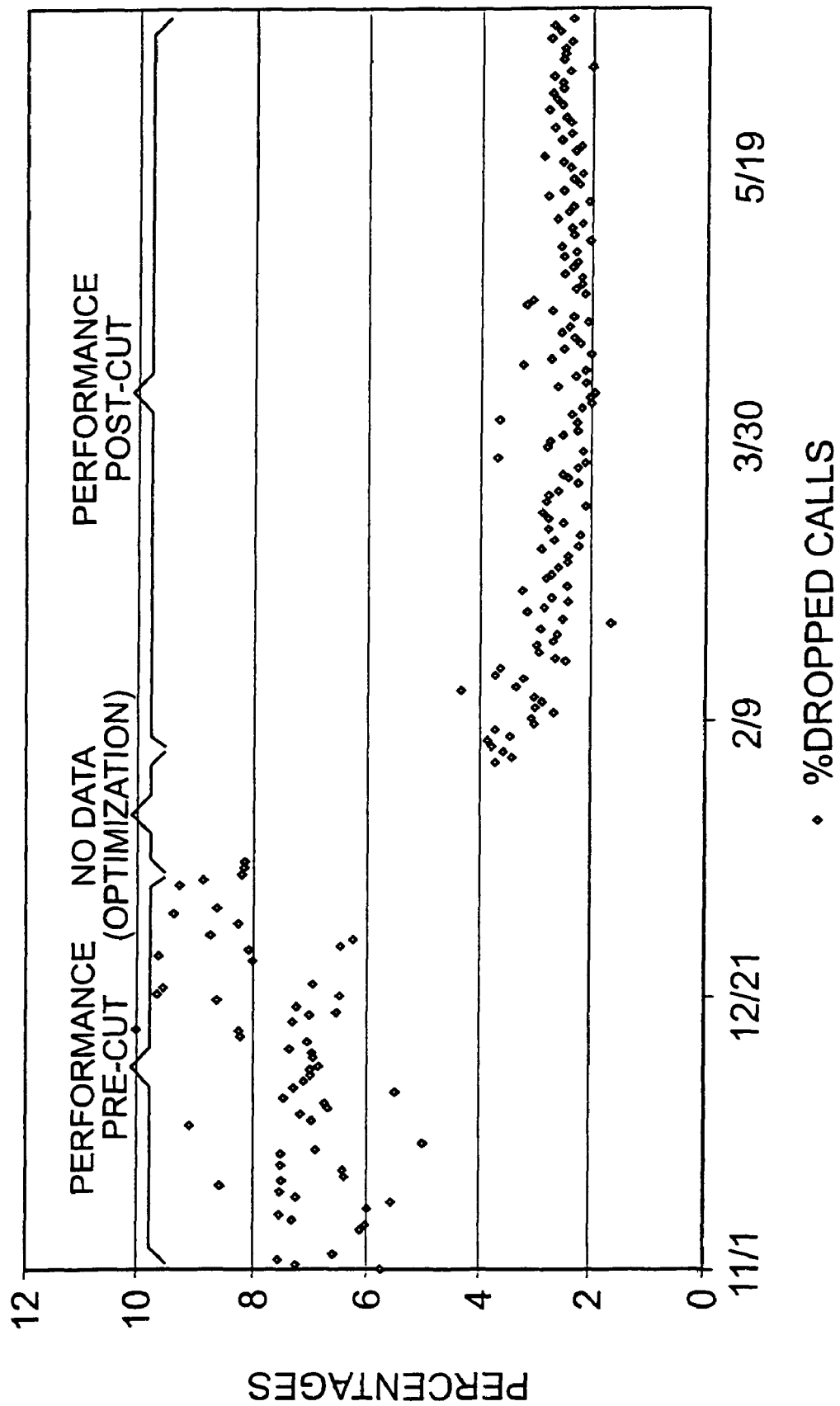
FIG. 10b is a graph depicting actual network performance of both a system known prior to the present invention and a system according to the present invention with respect to dropped call percentage.
Figure 10C:
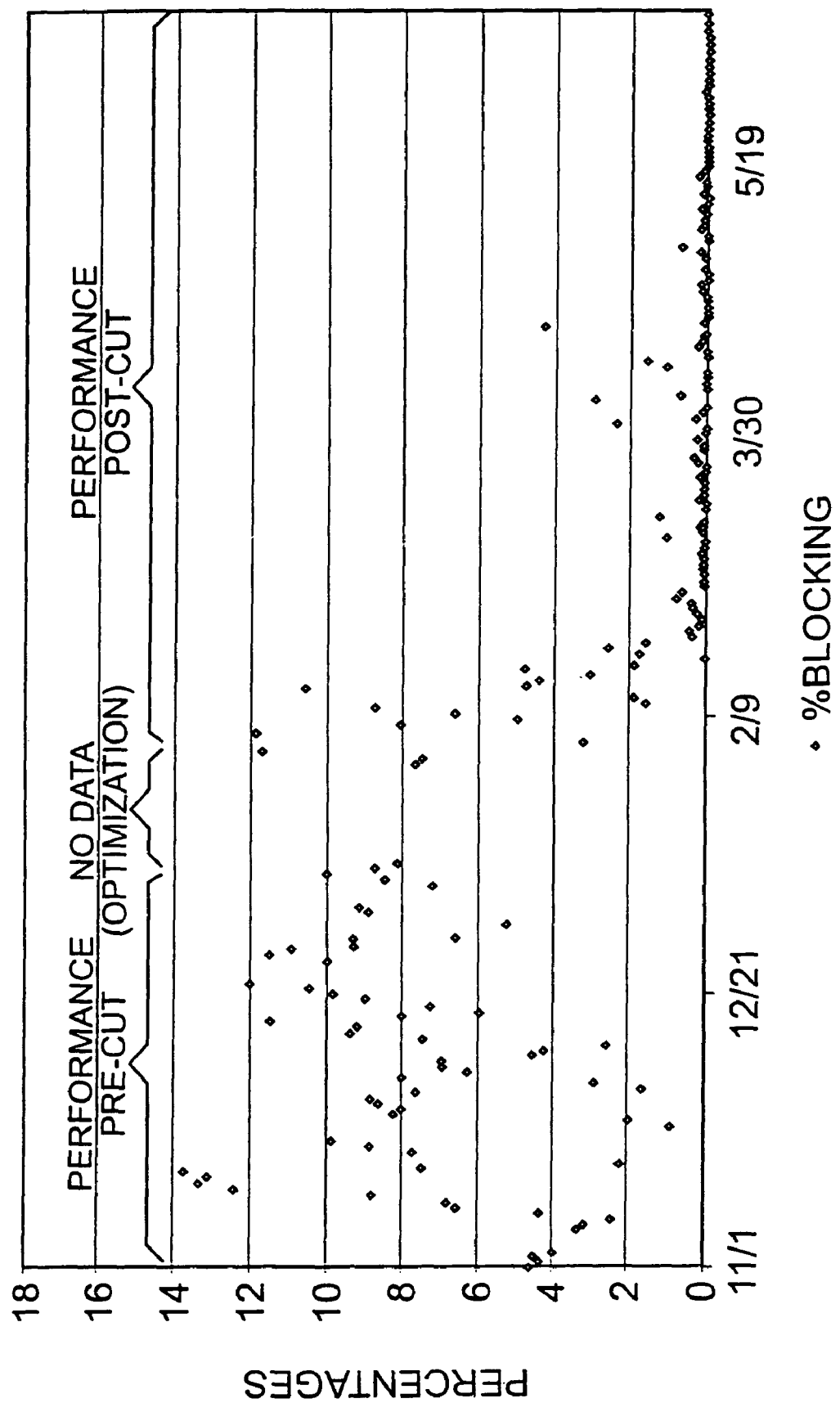
FIG. 10c is a graph depicting actual network performance of both a system known prior to the present invention and a system according to the present invention with respect to blocked call percentage.

Some of these shortcomings exhibited as a high rate of dropped and blocked calls, as shown in FIGS. 10a-c. These failures resulted because the prior system was not adapted to optimal placement and sizing of cell sites, inadequate capacity, and an existing design bias toward coverage and in-vehicle use, in contrast to capacity and in-building use. This resulted in substantial over subscription of the switch and high blocking levels.

The present inventors implemented various modifications to adapt the existing Chase network to the "Cricket" business model, operations, and network and system. Ericsson's proprietary "Smart Rate" III service version of EVRC was instituted, increasing capacity modestly. The present inventors subsequently implemented Erickson's "Smart Rate" IV service which provided additional capacity improvements. The Frame Error Rate was relaxed. Traditional operators maintain a Frame Error Rate at about 1 percent. The present inventors believe that the Frame Error Rate may be relaxed to about 2 percent (or potentially 3%), increasing systems capacity, without significant degradation of signal quality and quality of service.

The present inventors modeled the behavior of the network and modified the size and location of cells. The present invention employs various modifications and variations in the design of the service area to improve the capacity of the wireless services offered. Specifically, new sites were defined, some sites were moved or modified, sites were removed from service, and new sites were added. The present inventors also replaced equipment to add an additional carrier and anticipate that further additional carriers may be added as capacity demand grows.

The improvements of the present invention enable the wireless network to achieve increased capacity utilization. The present invention tends to increase substantially individual user call volume. By eliminating the increased cost of additional calls and service at particular times of day, users tend to use their phone more and at more varied times throughout the day. This increase in overall call volume enables the network and systems components to be utilized more fully, throughout a greater proportion of the day, resulting in increased capacity utilization.

Although user demand is increased in the present invention, that demand is spread more evenly throughout the day, reducing the peak calling capacity of the system relative to prior known wireless communications networks and systems. As peak demand is reduced, so too are the capital and operational constraints in meeting the former peak demand.

The present invention targets the coverage area to a more limited geographic area. Rather than emphasizing coverage throughout as wide an area as possible, the present invention emphasizes capacity to handle the demands of the local area. In a preferred embodiment, the present invention is adapted to a local calling area, based generally on the Rand McNally Trade Area (RMA), rather than seeking extensive coverage of the surrounding area. This more limited coverage reduces the number of cell sites and reduces the capacity of the fewer remaining cells to levels needed to service the local traffic demand, rather than building in substantial overcapacity to handle roaming. These improvements, individually and collectively, enable the business method of the present invention to achieve higher capital utilization. Cells are not built in anticipation of demand and are instead adapted to demand as it develops. Building fewer cells reduces capital demands. Higher capacity utilization enables the capital that is expended to be employed more efficiently.

Cellular services have traditionally been sold through various relatively high cost channels, prior to the present invention. Specifically, large advertising campaigns are met on the customer end by specialized equipment and service offerings. The present invention adapts the services to the most popular types of cellular phones and reduces the variety of service offerings. The need for specialized selling is eliminated. Simplified in this manner, the services of the present invention may be sold through mass merchandising channels that have not been exploited by prior known wireless offerings.

Interconnection is roughly balanced in the present system by shifting the balance of call volume from outgoing calls to other operators to a more even balance between called made and calls received outside the system. This is accomplished by the pricing structure of the present invention, which eliminates or at least reduces the disincentives of prior known systems to leaving the phone on so that it can receive unexpected calls.

The present invention improves back office efficiency dramatically. By simplifying billing and instead issuing a single flat rate bill, the costs of billing are reduced from prior known systems in which complex, detailed bills are rendered. Accounts receivable are eliminated in certain embodiments in which the services are pre-paid. Moreover, customer service costs are dramatically reduced by eliminating detailed billing, and the numerous questions and complaints that follow from message unit pricing.

Finally, the network and system of the present invention improve system network operating efficiency. The present invention combines any of a number of improvements to enhance the pool of available customers while driving costs from the system: improved capacity utilization; reduced peak system capacity; targeted area coverage; coverage generally based upon Rand McNally Trade Area (RMA); improved capital utilization; channels; mass merchandising and simplified direct sales; reduced interconnect costs; reduced back office operating efficiency; and improved network operating efficiency.

Figure 6:
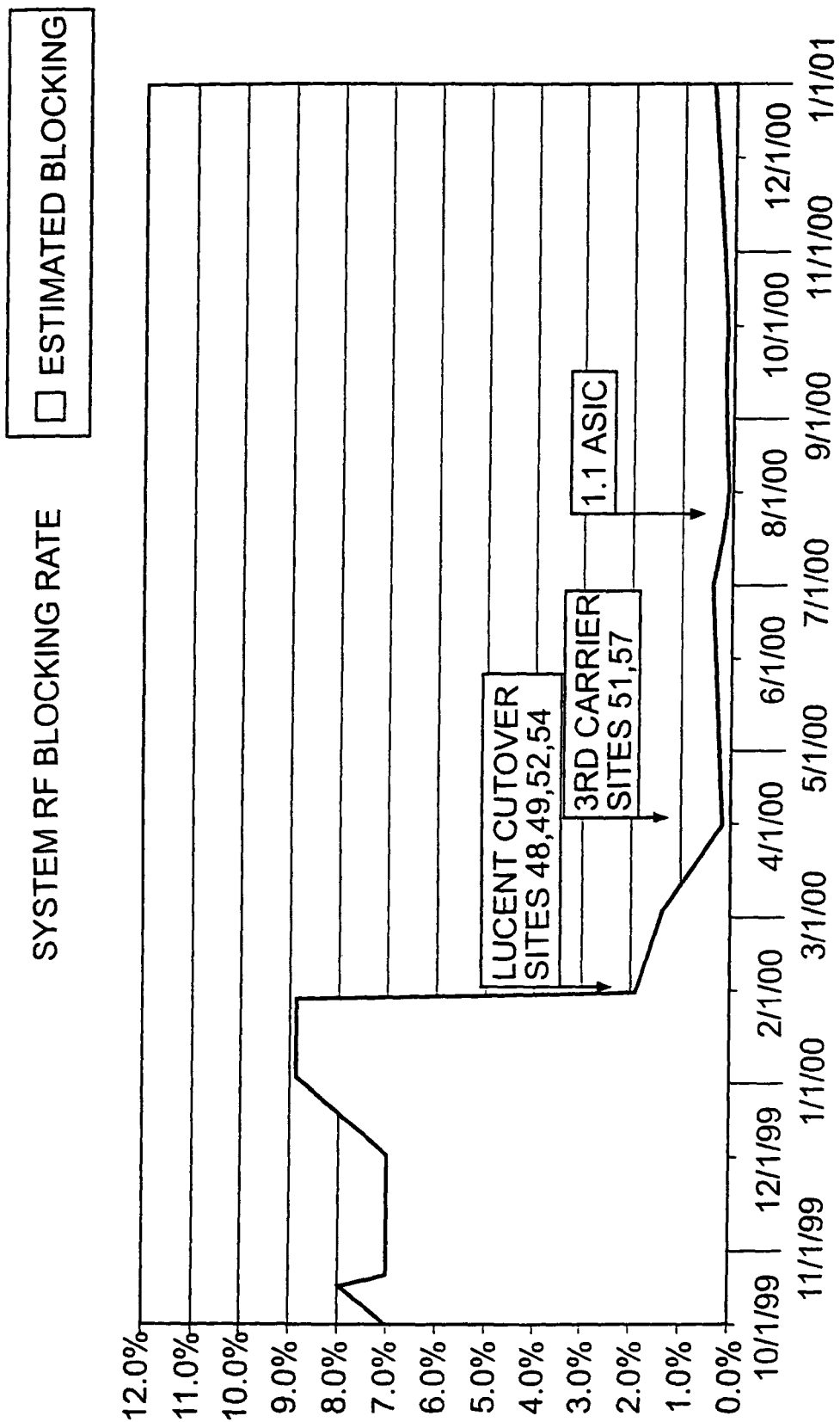
FIG. 6 is a graph depicting the predicted change in System RF Blocking Rate upon conversion of a system of the according to the present invention.
Figure 7:
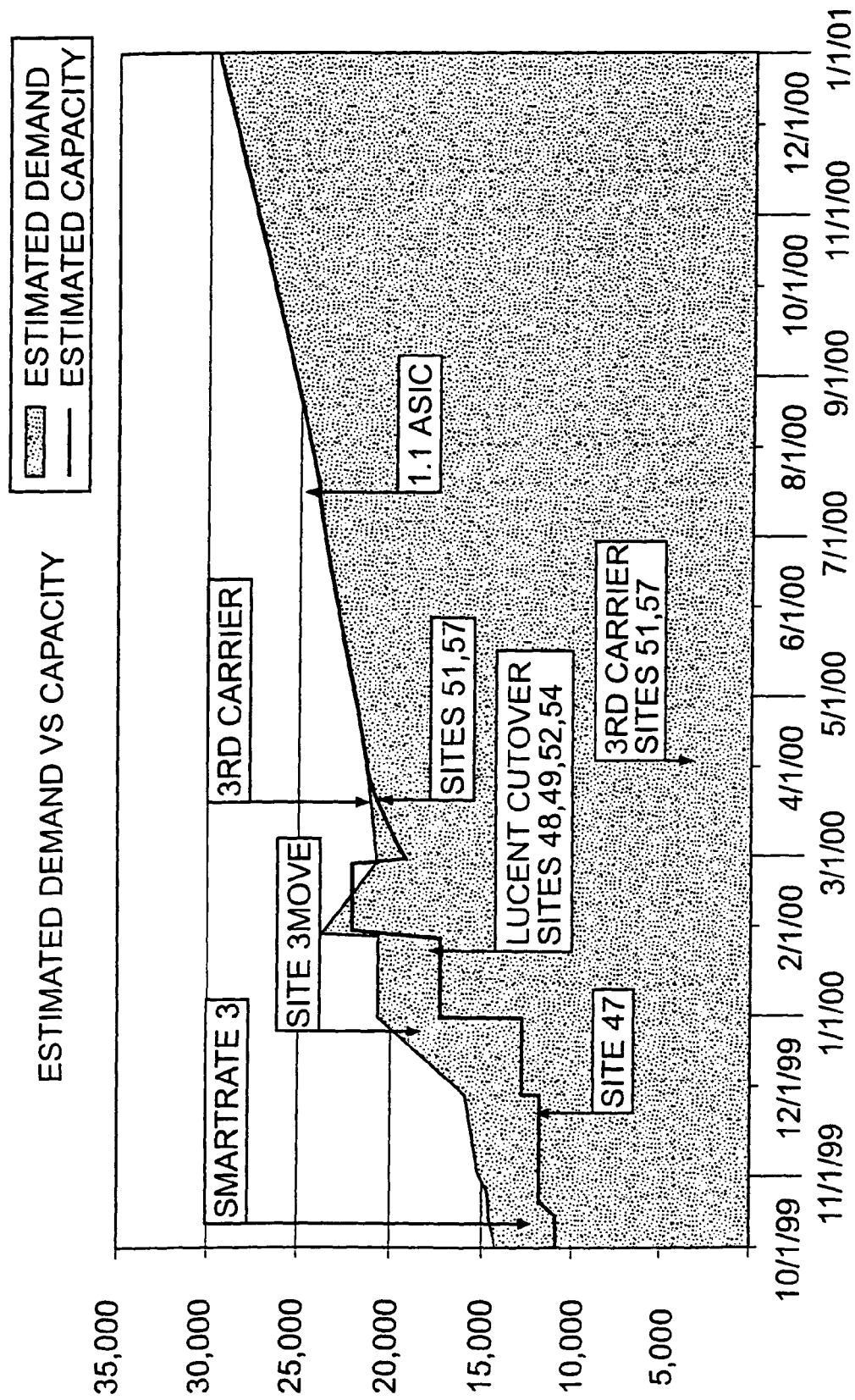
FIG. 7 is a graph of estimated demand vs. capacity upon conversion to a system according to the present invention.
Figure 8A:
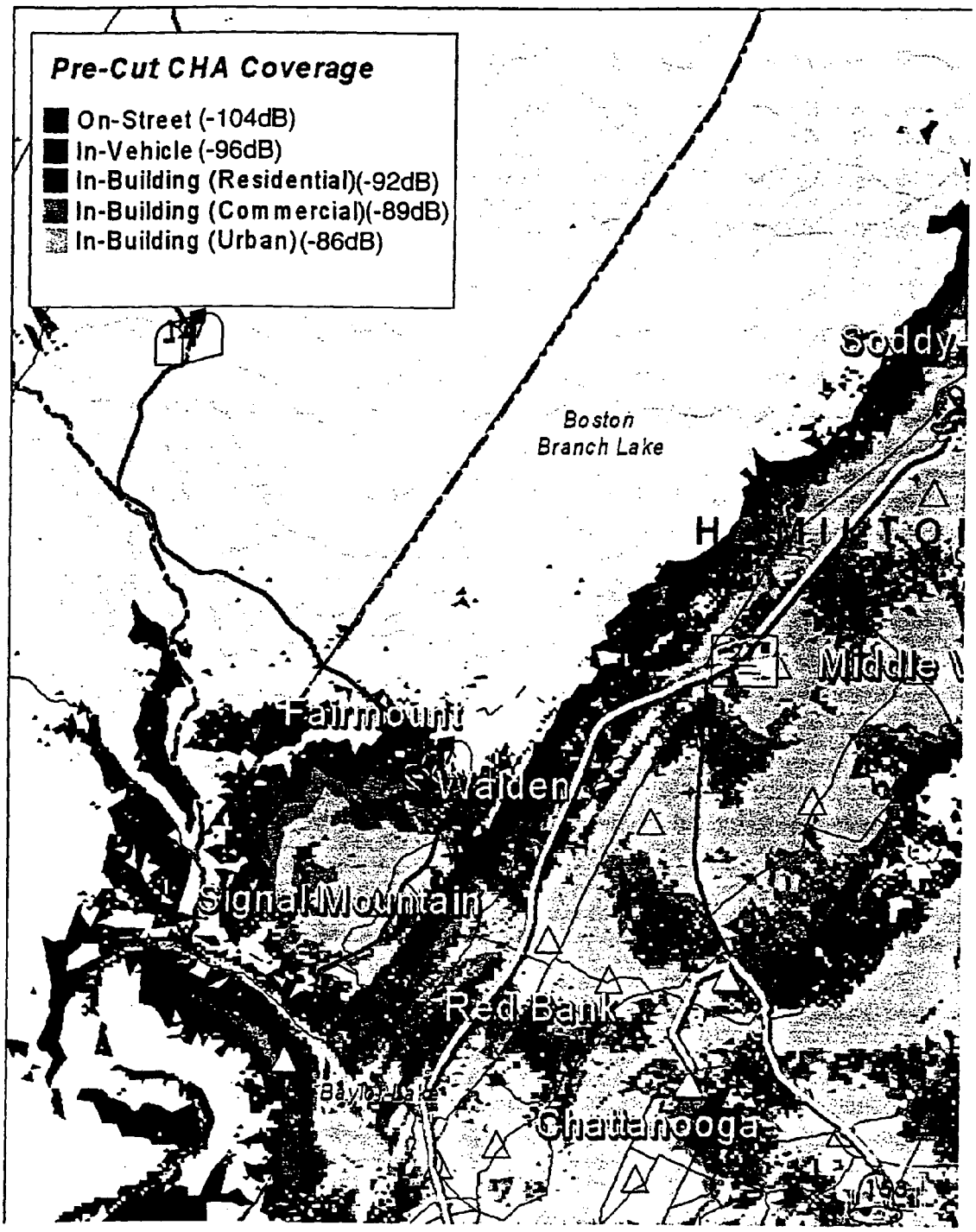
FIG. 8 is a map depicting system coverage of a cellular system prior to implementation of a system according to the present invention.
Figure 8B:
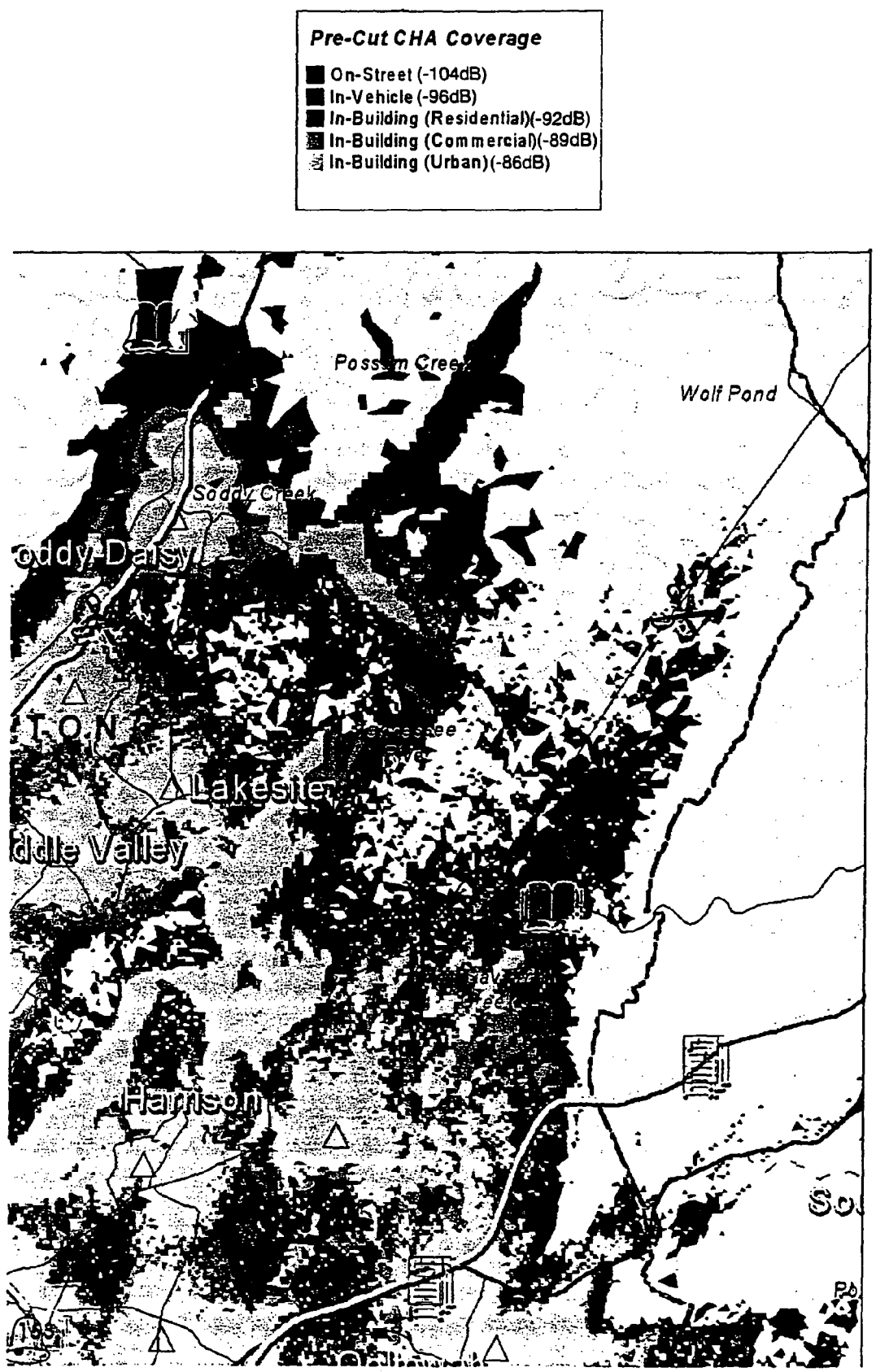
Figure 8C:
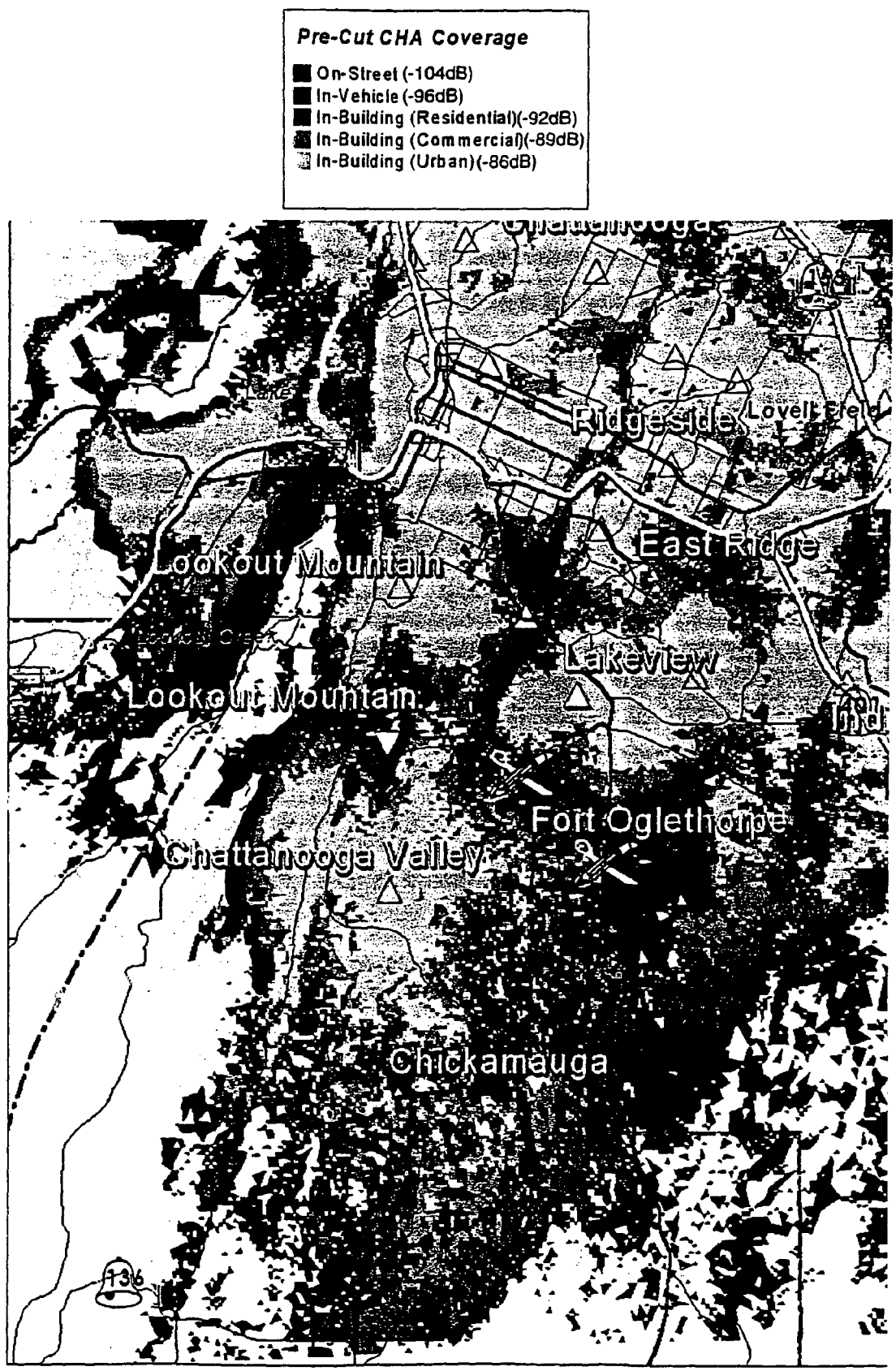
Figure 8D:
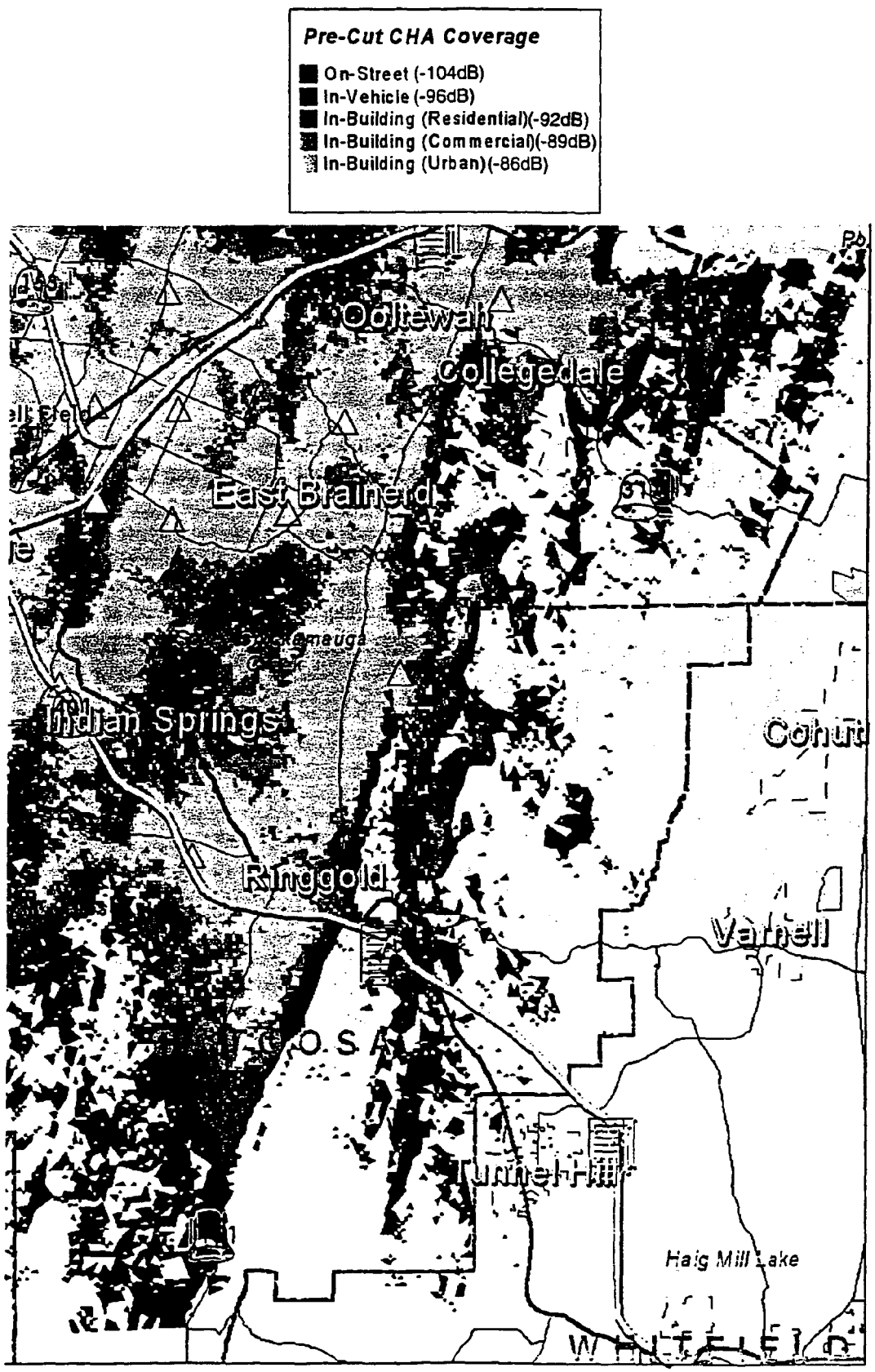
Figure 9A:
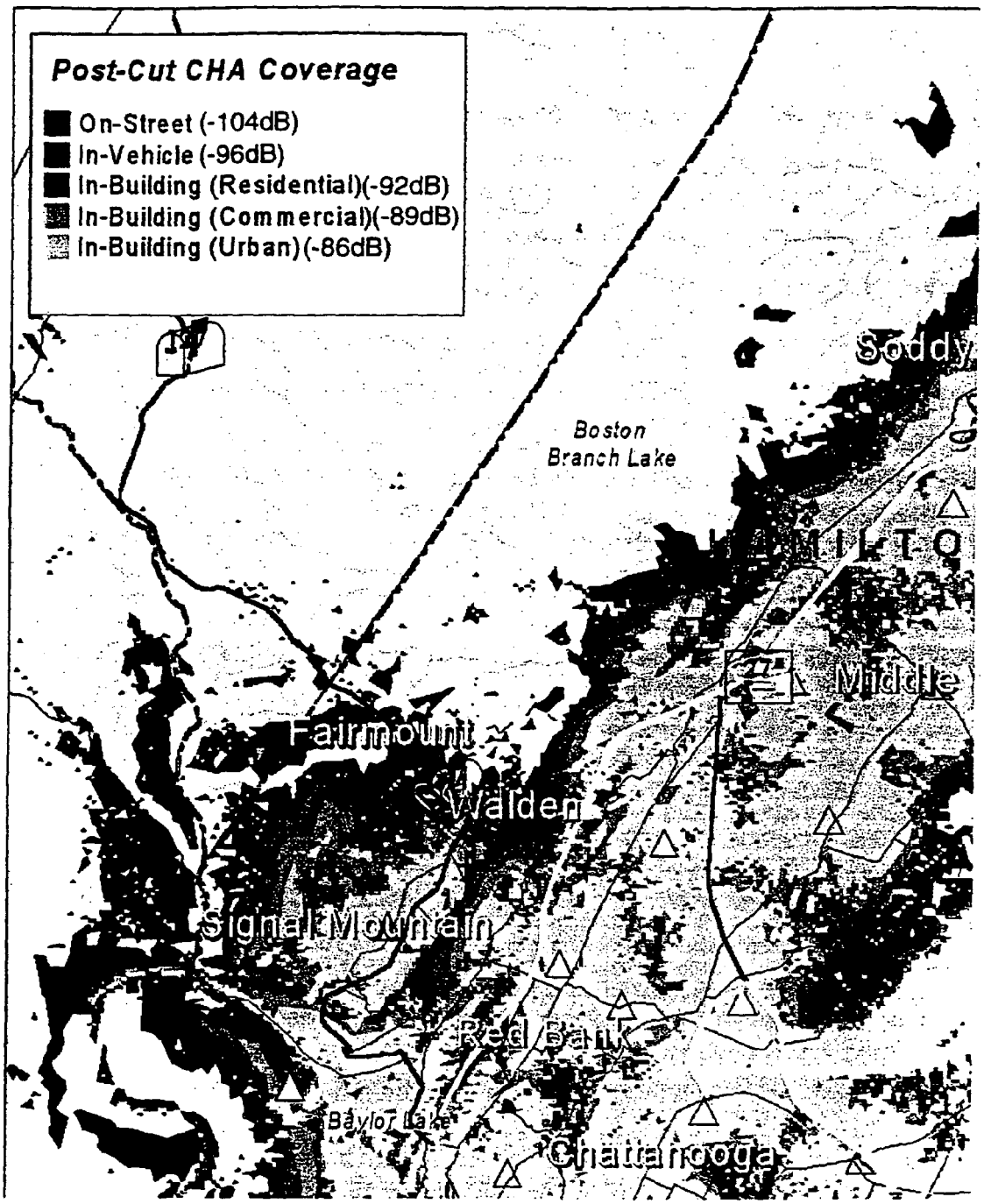
FIG. 9 is a map depicting system coverage of a cellular system according to the present invention.
Figure 9B:
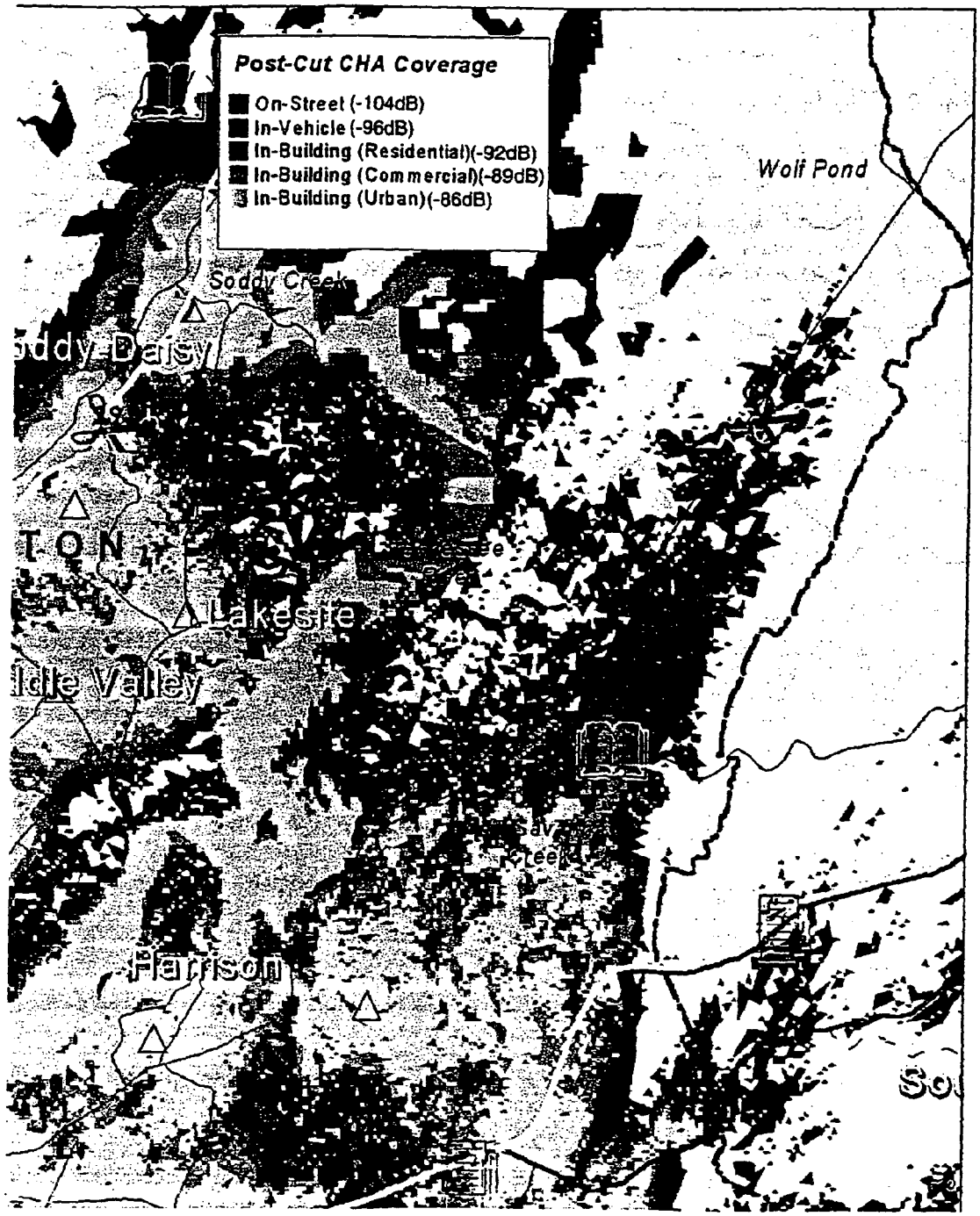
Figure 9C:
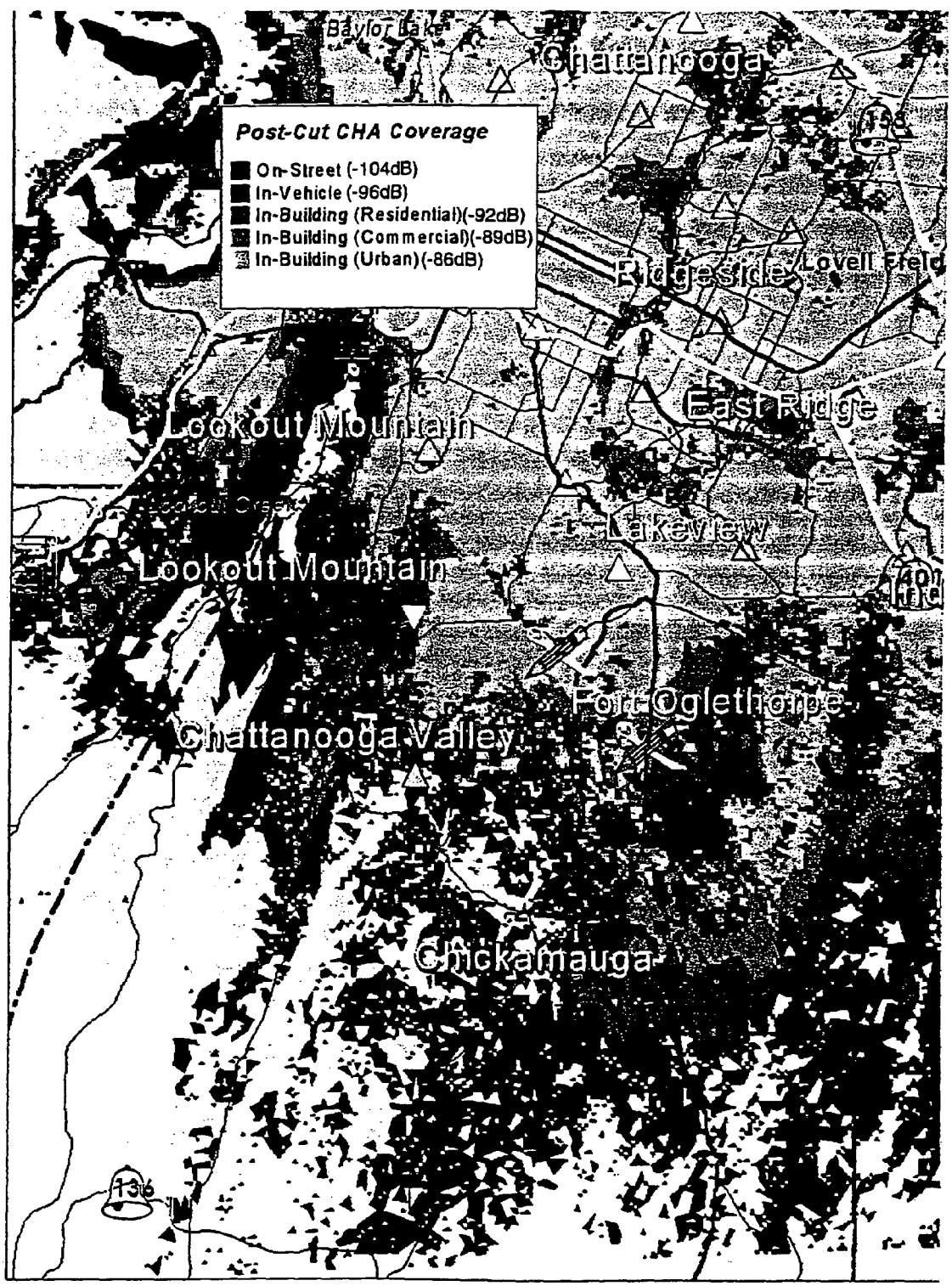
Figure 9D:
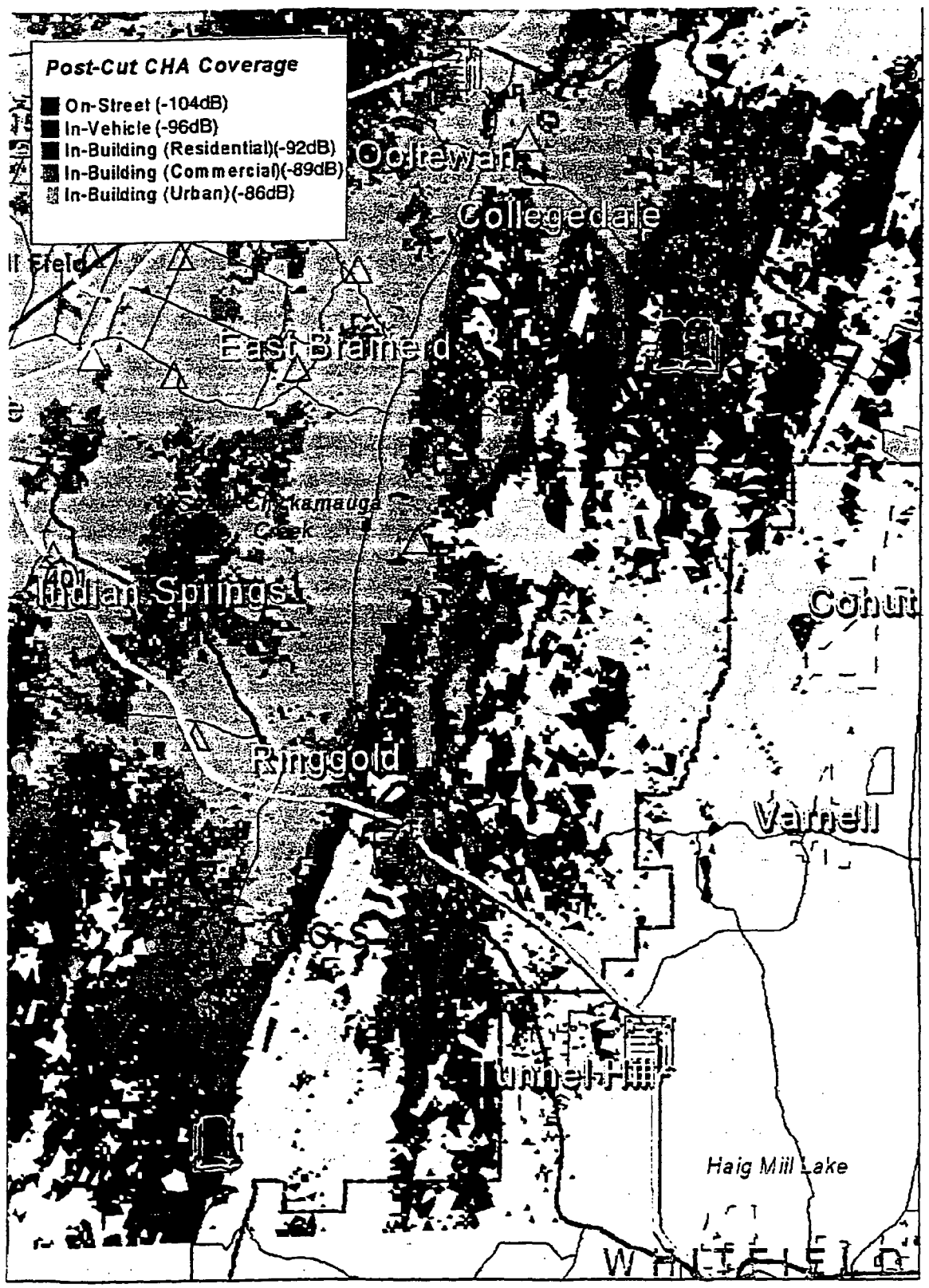

Several of the figures provided depict the improvement in performance of the present invention. FIG. 6 depicts the predicted change in System RF Blocking Rate upon conversion of a system of the according to the present invention. FIG. 7 estimates demand vs. capacity upon conversion to a system according to the present invention. FIG. 10*a* depicts actual network performance (in terms of dropped and blocked calls) of both a system known prior to the present invention and a system according to the present invention. FIG. 10*b* depicts actual network performance (in terms of dropped and blocked calls) of both a system known prior to the present invention and a system according to the present invention. FIG. 10*c* depicts actual network performance of both a system known prior to the present invention and a system according to the present invention with respect to blocked call percentage.

In general, the present inventors anticipate that at no time during any 24-hour period will the system of the present invention be unused. Each user segment is expected to use at least ¼ minute of service during any given hour. Busy hour usage was spread only between the hours of 6 AM and 10 PM. Usage patterns from 11 PM to 5 AM are expected to be lower. Table 6, below, illustrates the population by user segment, as contemplated by the present inventors for a typical installation.

TABLE 6

Population by User Segment

| Segment | Number | Percentage | Breakdown |
|---|---|---|---|
| Teens | 23,601 | 4.30% | Ages 15-17 |
| College Students | 30,724 | 5.60% | Ages 18-21 |

TABLE 6-continued

Population by User Segment

| Segment | Number | Percentage | Breakdown |
|---|---|---|---|
| Spouse | 65,086 | 11.85% | ½ of Married People >35 yrs. Old |
| New Wage Earner | 92,890 | 16.92% | Ages 22-34 |
| Blue Collar | 96,450 | 17.57% | Ages 35-64 with House Hold income <$75K |
| Other | 240,291 | 43.77% | Ages 0-14 (108,697) Retired >_65 (77,997) Ages 35-64 with income >_$75K (23,452) Ages 35-64 with roommate (30,145) |
| Total | 549,042 | 100.00% | |

Figure 11:
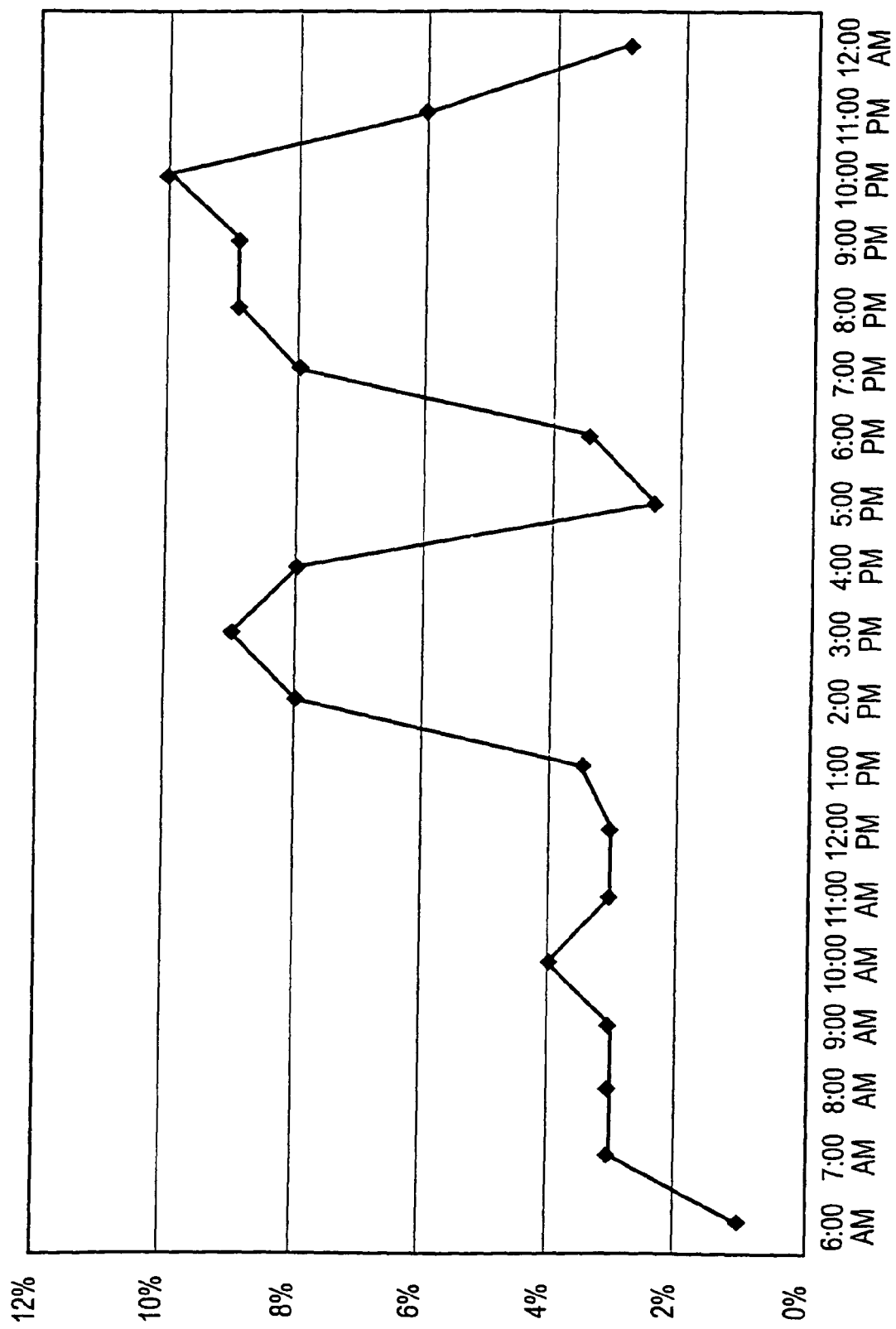
FIG. 11 is a graph of the usage distribution for the teen segment, as contemplated by the present inventors.

FIG. 11 illustrates the usage of the teen segment. In the teen segment, the inventors contemplate that the primary use is after school and into the later parts of the evening. When teens get on the phone, they will stay on it for extended periods of time. They will use their phones in the morning to arrange rides to school, during the day in general, and during lunch times. As illustrated in FIG. 11, the peak usage is between approximately 3 pm and 5 pm.

Figure 12:
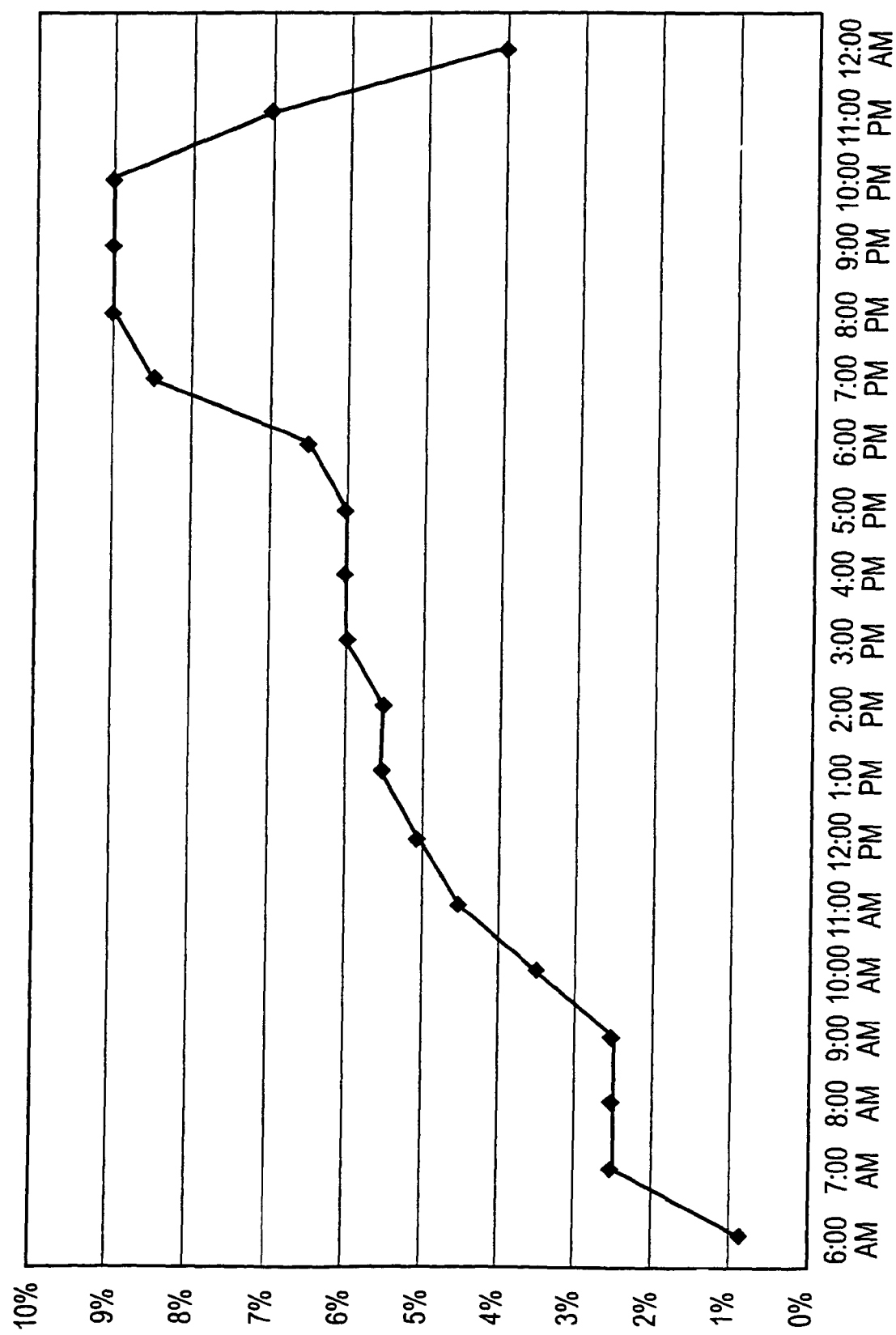
FIG. 12 is a graph of the usage distribution for the college student segment, as contemplated by the present inventors.

FIG. 12 illustrates the usage of the college student segment. The users in this segment tend to awake later in the morning than other users, and typically stay up later at night than other segments. Accordingly, their phone use reflects this pattern. Typically, these users will use their phone during the later periods of the day and scattered throughout the day depending on an ever changing schedules. As illustrated in FIG. 12, the peak usage is between approximately 4 pm and 8 pm.

Figure 13:
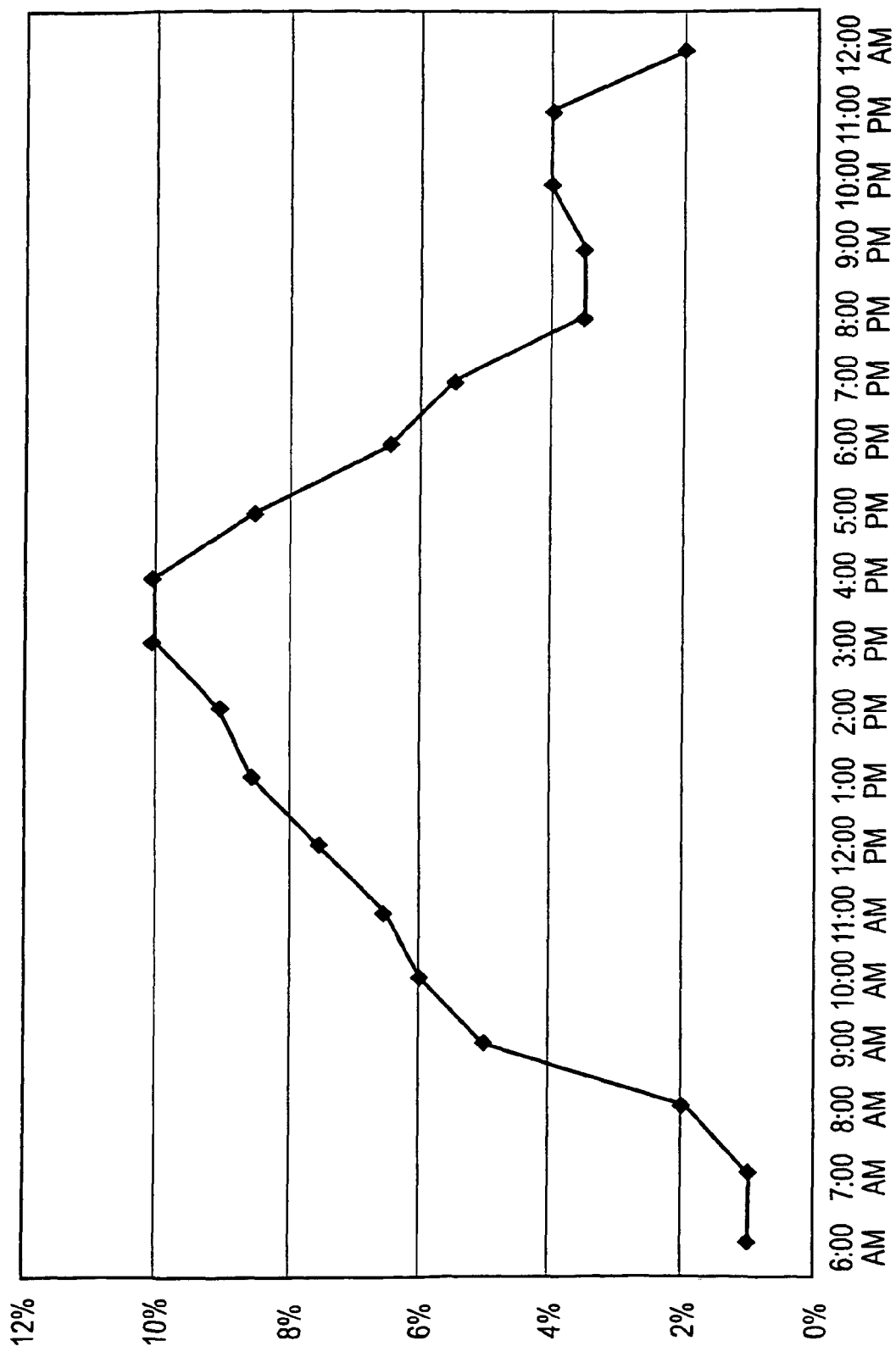
FIG. 13 is a graph of the usage distribution for the secondary income spouse segment, as contemplated by the present inventors.

FIG. 13 illustrates the usage of the segment represented by secondary income spouses. The primary usage in this segment occurs while children are in school between the hours of 8 AM and 2 PM, when users talk to friends and run errands. The users in this segment will also have sporadic usage in the evenings to communicate with other working family members and friends. As illustrated in FIG. 13, the peak usage is between 4 pm and 8 pm.

Figure 14:
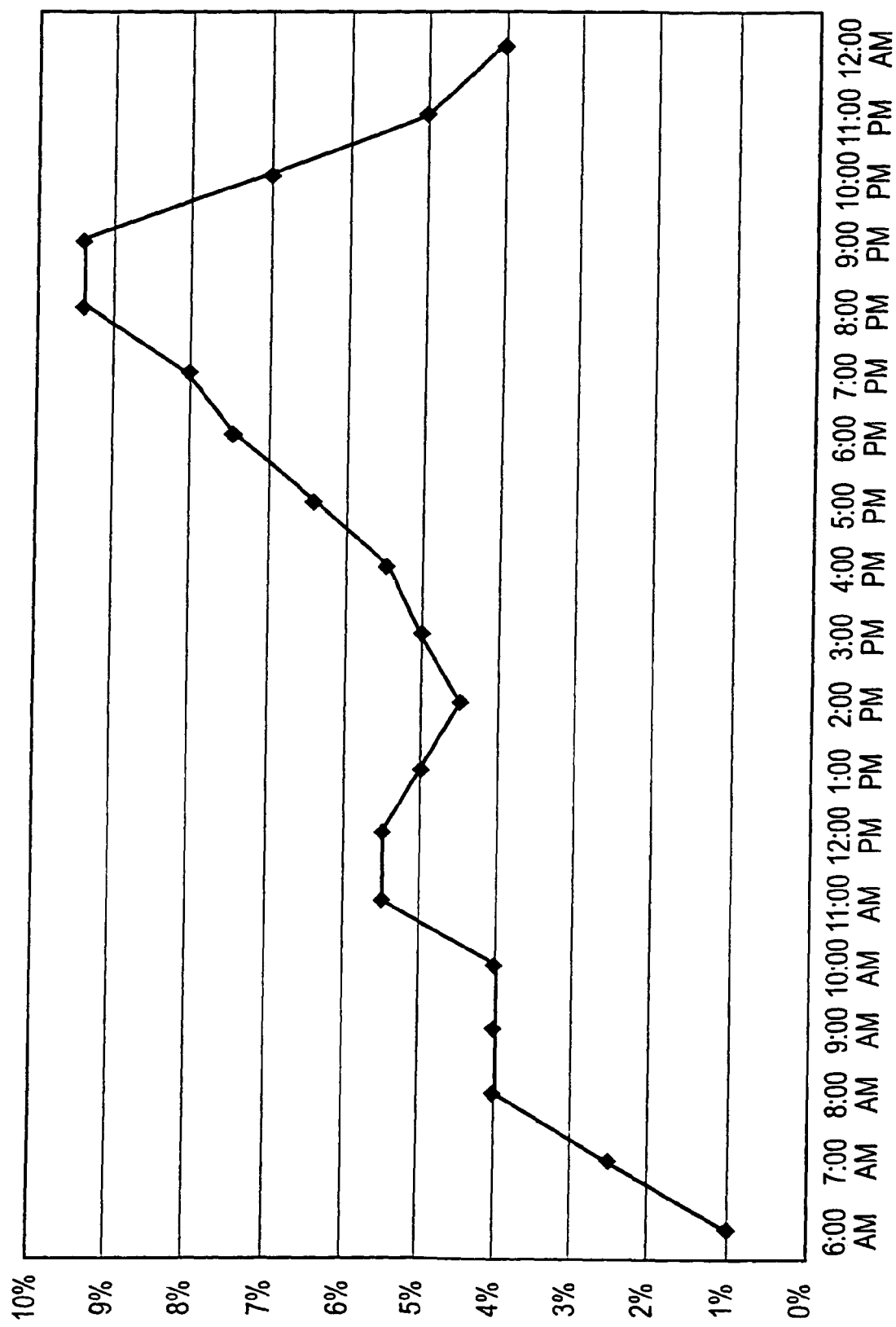
FIG. 14 is a graph of the usage distribution for the new wage earner segment, as contemplated by the present inventors.

FIG. 14 illustrates the usage of the segment represented by new wage earners. This group is typically comprised of young professionals. These users do not hesitate to use the office phone during the day, but will use their wireless phones on the way to work, during the lunch period and directly after work to stay in contact with a large group of friends. As illustrated in FIG. 14, the peak usage is between 4 pm and 8 pm.

Figure 15:
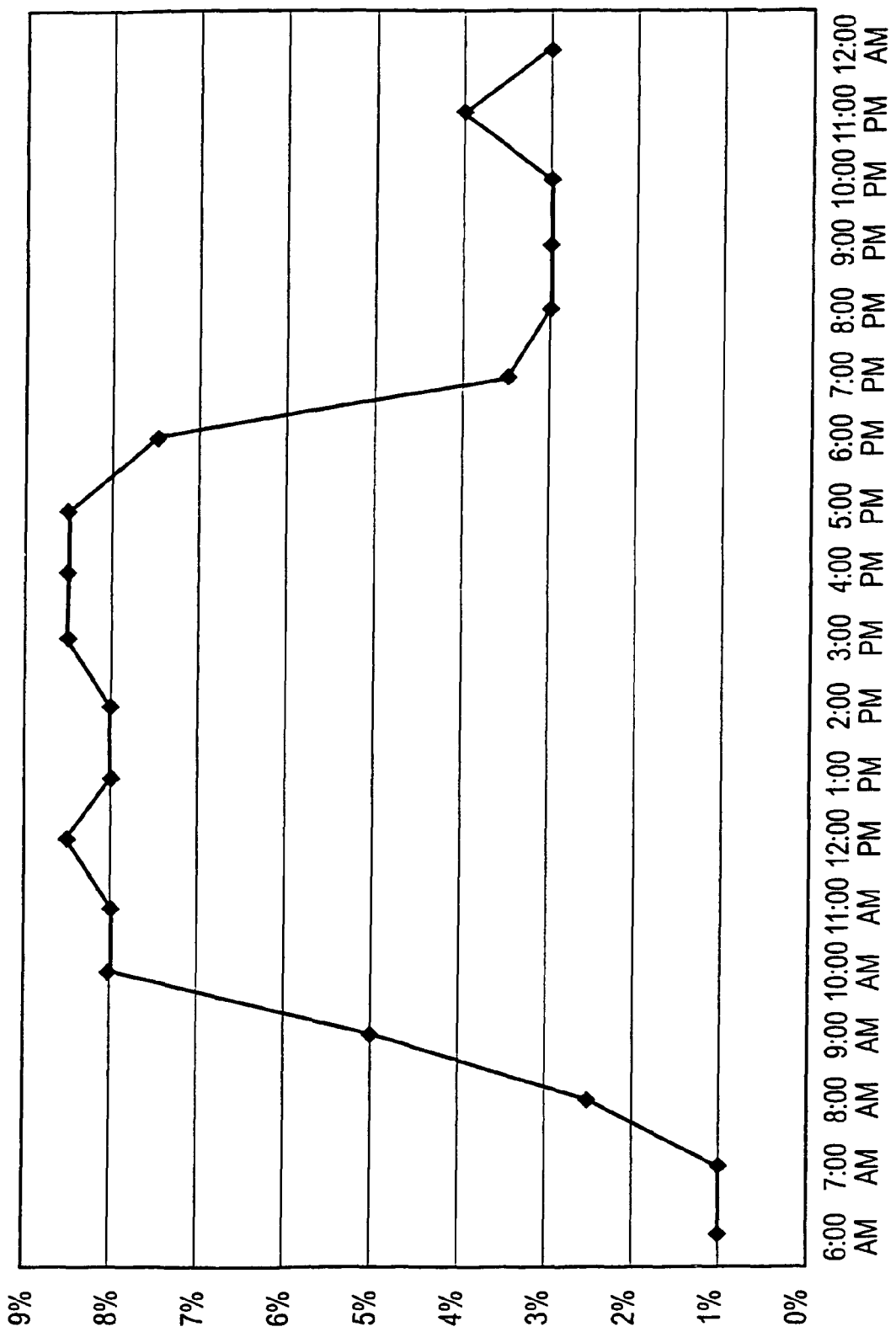
FIG. 15 is a graph of the usage distribution for the blue collar segment, as contemplated by the present inventors.

FIG. 15 illustrates the usage of the segment represented by blue collar workers. This segment will use their phones on their way to and from work, during the noon period and in the early evening. They will not hesitate to use the office phone, if available, during working hours. As illustrated in FIG. 15, the peak usage is between 3 pm and 8 pm.

Figure 16:
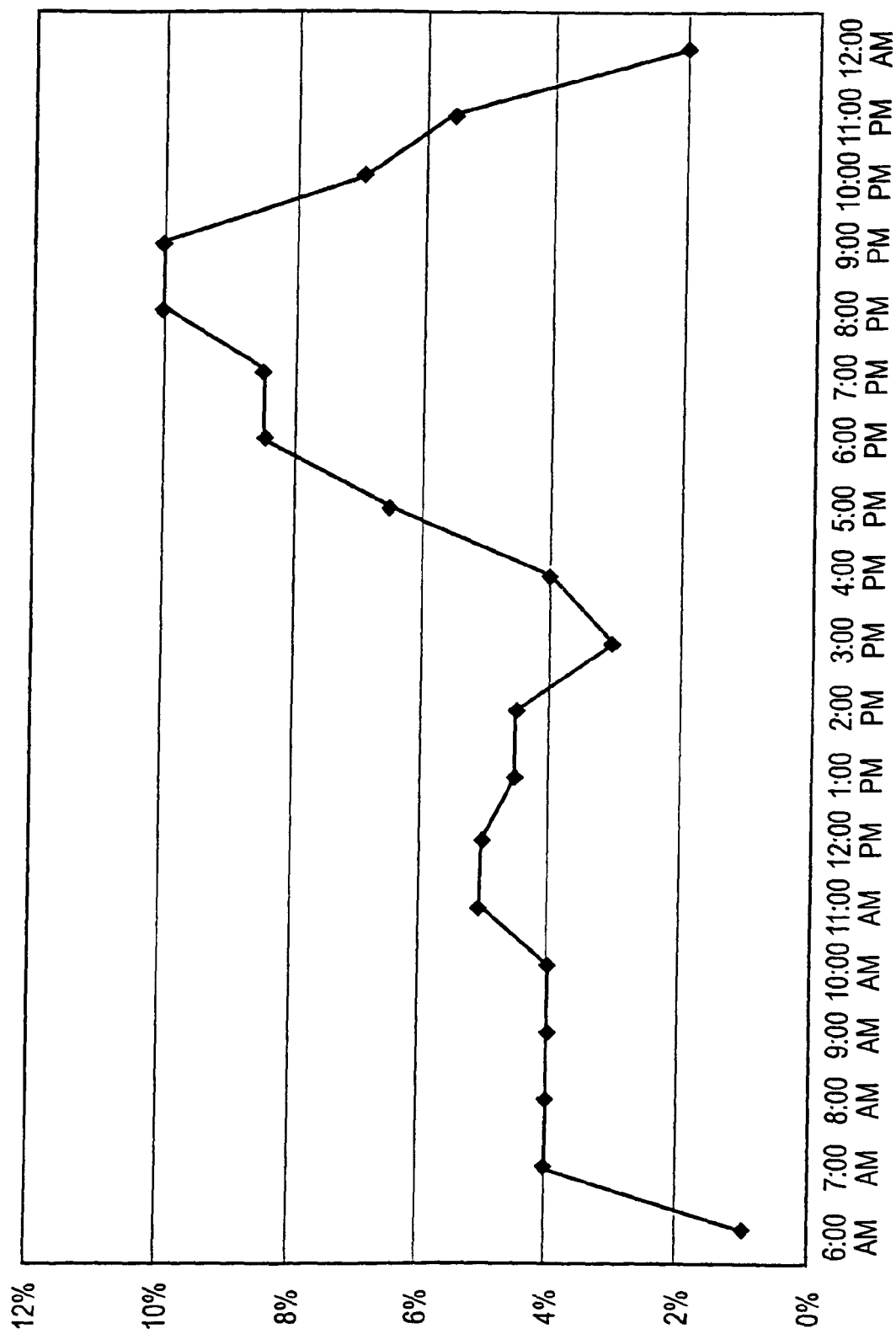
FIG. 16 is a graph of the usage distribution for all other users, as contemplated by the present inventors.

FIG. 16 illustrates the usage of the segment that can best be described as "other." This segment is comprised of a mix of people. Their usage is spread across the day with heavier usage during the noon and evening hours.

Figure 17:
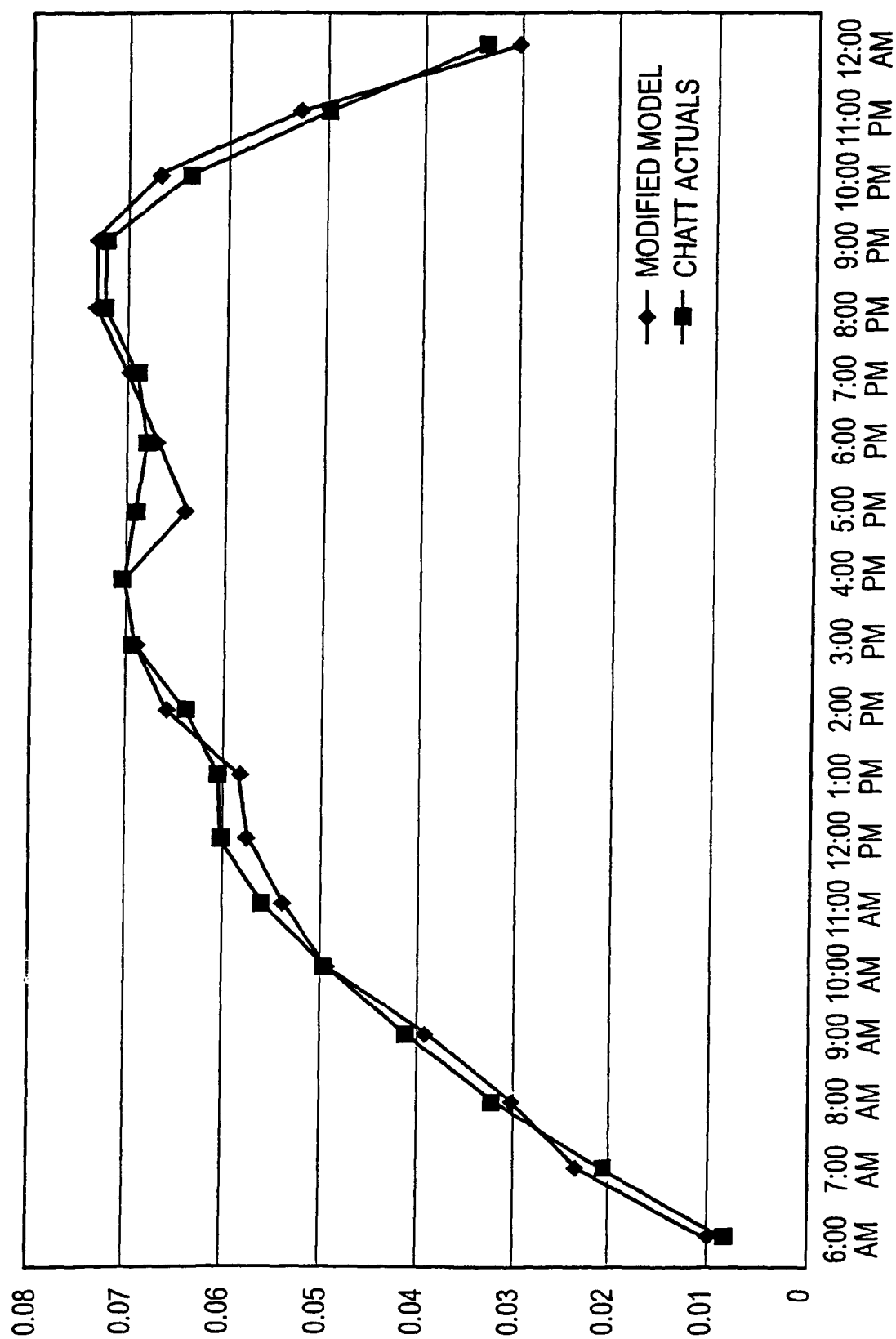
FIG. 17 is a graph of the usage distribution for all users comparing predicted data with the actual data.

FIG. 17 is a graph of the usage distribution for all users comparing the modified model with the actual data.

FIG. 18 is a chart illustrating the unexpected success of the present invention. FIG. 18 illustrates some of the substantial advantages of a preferred embodiment of the present invention over systems of the type known prior to the present invention. When the Chattanooga system was deployed as a Cricket system in early 1999, it included very few improvements and enhancements of the present invention. During the course of the first year of deployment, numerous improvements and enhancements were made to implement the present invention in the Chattanooga market. Specifically, numerous additions to the operational features were added during mid- ~6. late-1999, and the network components were cut over to a network operating system of the present invention at the end of January 2000.

In spite of the fact that many of these features were present for only a portion of the first year of operation, the Cricket system achieved a 7.7 percent market penetration in 12 months of operation of the Chattanooga market. The costs were less than $230.00 per customer. The support costs per average subscriber were approximately $5.60 and the operations costs per minutes of use was 1.3 cents. These results amplify the substantial and unexpected results achieved by the present invention. On each of these criteria, the performance of the present invention, both on a market penetration basis and a cost reduction basis, far out strips the performance of systems of the type known by the present inventors prior to the present invention.

Part of the reason for the unexpected and substantial success of the present invention is that it meets a long felt and unmet need of the market for wireless communication services. While operators of systems of the type known prior to the present invention have focused primarily on price-insensitive business and heavy users, large segments of the market who would use wireless communication services at a lower price point have been ignored or under-served. Most of this under served segment readily uses wireline telephony of the type offered by the Incumbent Local Exchange Carriers (ILEC) and Competitive Local Exchange Carriers (CLEC). The price point, however, for these types of services is traditionally much lower than that of wireless communication services of the type known prior to the present invention.

Table 7 illustrates a comparison of the pricing and services and depict some of the reasons why the present inventors believe their business method, operations method, and network have been so successful. FIG. 7 compares the services, typical minutes of use per month, and average revenue per user of various types of telephony systems, namely, Cellular, PCS, the present invention, and traditional fixed wireline service available through ILEC's and CLEC's. This comparison reveals that, on these criteria, the present invention approximates the level of service available from traditional wireline service at a cost that approximates traditional wireline service, while offering many of the same features of other wireless communications networks. The present inventors believe that these features explain, at least in part, the long felt need, and substantial and unexpected success of the present invention in the market place.

TABLE 7

Product Comparison

| Product | Service | Pricing | |
|---|---|---|---|
| | | MOUs | ARPU |
| Cellular | Wide footprint with feature-rich service in digital footprint coverage area and analog services in the rest of the covered area. Nationwide roaming available. Voice quality varies and coverage is highway-focused. | 100<br>200<br>500<br>1000 | $20-22<br>45<br>100<br>200 |
| PCs | Reasonable digital footprint with rich feature set. Large roaming footprint available with good voice quality. | 100<br>200<br>500<br>1000 | $20-22<br>40<br>90<br>160 |
| PCP | Regional digital coverage (local and toll) of areas where the user lives, works, shops, and plays with attaching major artery coverage. Limited feature offering of those services most wanted. No roaming. | 100<br>200<br>500<br>1006''' | $28<br>28<br>28<br>28 |
| ILEC/<br>CLEC | Fixed traditional wireline service with local service and rich feature set. Toll services and extra - although nominal charge and low penetration of services (call waiting, call forwarding, conference and voice mail). | 100<br>200<br>500<br>1000 | $22<br>22<br>22<br>22 |

The present inventors believe that the unique combination of the business method, operations method, and network enables the user to derive a level of service that closely approximates that of their wireline telephone service, at a cost that is close to their wireline service, yet with enjoying the features of a wireless telecommunications system. These benefits have not been offered or obtained from any of the systems of the type known by the present inventors prior to the present invention.

The cost efficiency of the present invention is gained in four discrete ways. First, the technology employed by the present invention is, in the view of the present inventors, the best available technology for running a wireless communication system. Second, the present invention uses the inherent advantages of CDMA technology at its best. Systems capacity is loaded and operated at a high level. This allows the system to exploit the air interface at an optimal level. Third, CDMA system closely tracks minutes of use from a wireline operation model. This allows the CDMA technology to achieve several of the advantages of fixed applications. Fourth, the CDMA system avoids many of the issues that plagued prior attempts to introduce high capacity service, such as the PHS system discussed above. Instead, CDMA provide high voice quality and coverage similar to mobile service offerings of the type known prior to the present invention.

Table 8 compares mobile systems of the type known prior to the present invention, standard wireline systems, and the system of the present invention on a number of criteria.

TABLE 8

Comparative Performance

| | Mobile | Wireline | Present Invention |
|---|---|---|---|
| Busy-hour Erlangs | | | |
| Business | 20 me | 80 me | 0 me |
| Residential | 10 me | 50 me | 50 me |
| Minutes of Use (Average/Month) | | | |
| Business | 200-300 | ~2000 | 0 |
| Residential | <150 | ~900 | 950 |
| Peak-hour System Traffic | 17-20% | 10-12% | 10-12% |

In certain preferred embodiments to the present invention, the present inventors consider the link budget of the network of the present invention to be a key network planning parameter. Another feature of the present invention that distinguishes the invention from prior known systems is the deployment of a second or third carrier frequency upon launch of the network or shortly thereafter. As noted by Webb, the generally accepted approach of wireless system operators prior to the present invention was to install the minimum capacity necessary to service the expected subscriber base and not to boost capacity until demand had saturated the system, requiring capital improvements. The present inventors, in contrast, designed their system for capacity, as opposed to geographic coverage. In order to achieve the highest capacity utilization, particularly in densely populated areas of the network, a second or even a third carrier frequency may be added from launch of the network of shortly thereafter. The link budget of the network of the present invention reflects these facts.

In a preferred embodiment of the present invention, the EB/NO equals 5.5 db. This assumes reduced mobility and increased network capacity. The maximum number of users per sector is normally 15 for a mobile phone system of the type known prior to the present invention. In contrast, the maximum number of users per sector of the present invention is 19 and the average number 12.6.

Similarly, the coverage design conditions of the present invention entail the use of a higher decibel level than in prior known systems. In a preferred network of the present invention, the in home design coverage condition is 12-15 db. Similarly, in building coverage is preferably designed at 18 db.

Figure 21:
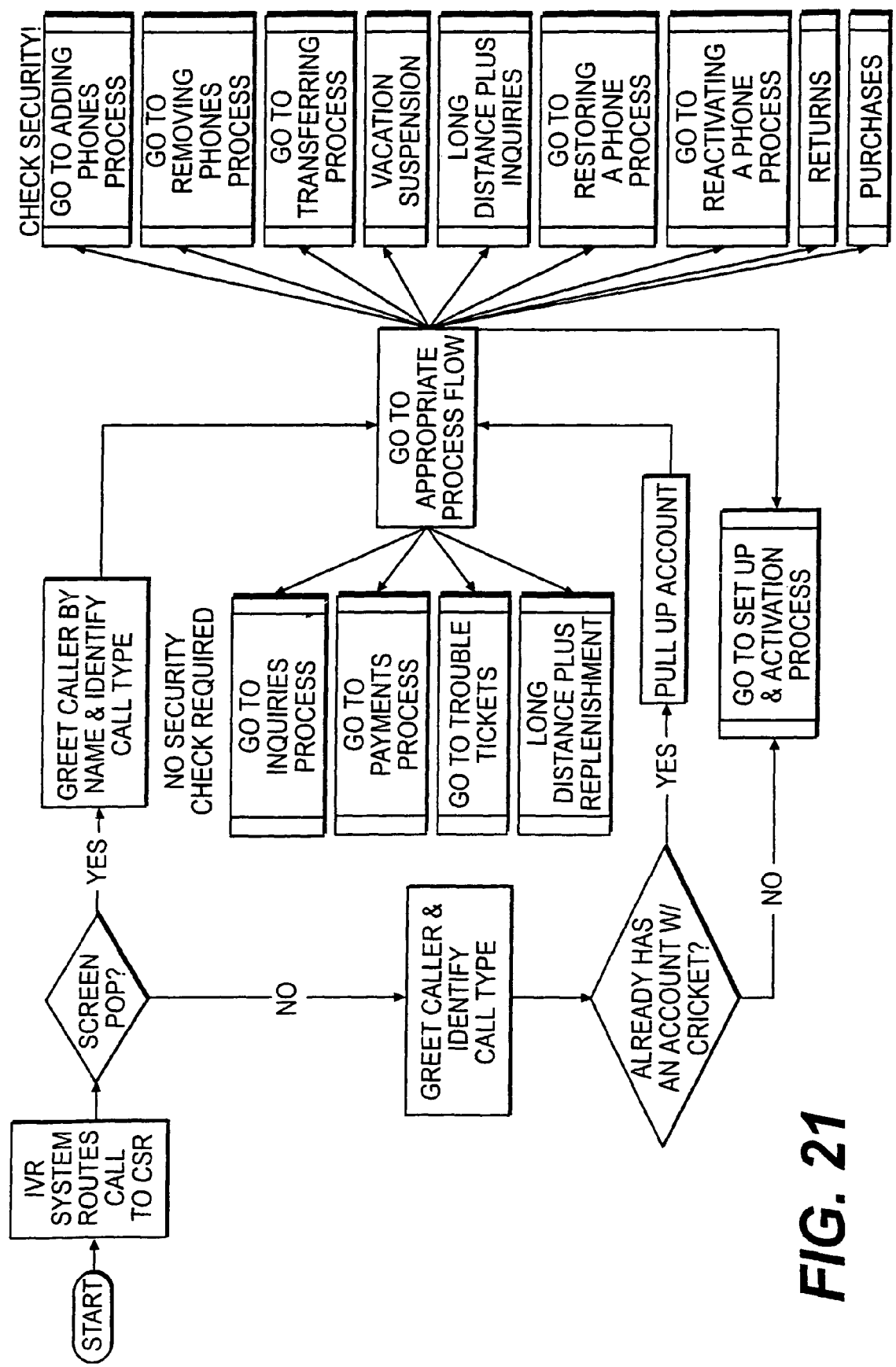
FIG. 21 is a flowchart depicting the process flow through the back office of a preferred embodiment of the present invention.

The present inventors have also been able to contain costs through the use of centralized cost control techniques. By centralizing the operation of a number of the cost centers of the wireless communications network, the present inventors have been able to isolate costs and procedure. In various preferred embodiments of the present invention, procedures are standardized, which enables the operator to reduce costs in order to achieve some of the advantages of the present invention. FIGS. 21 through 34 depict various standardized processes of the back office operation of a preferred embodiment of the present invention. FIG. 21 depicts one such method of standardization. FIG. 21 is a flowchart depicting how the cost center of the back office of an embodiment of the present invention routes and handles call traffic. The invention incorporates a series of process flows addressing various issues such as: adding phones; removing phones; transferring; suspending; long distance; restoring phone service; activating and reactivating a phone; returns; and purchases.

Figure 22:
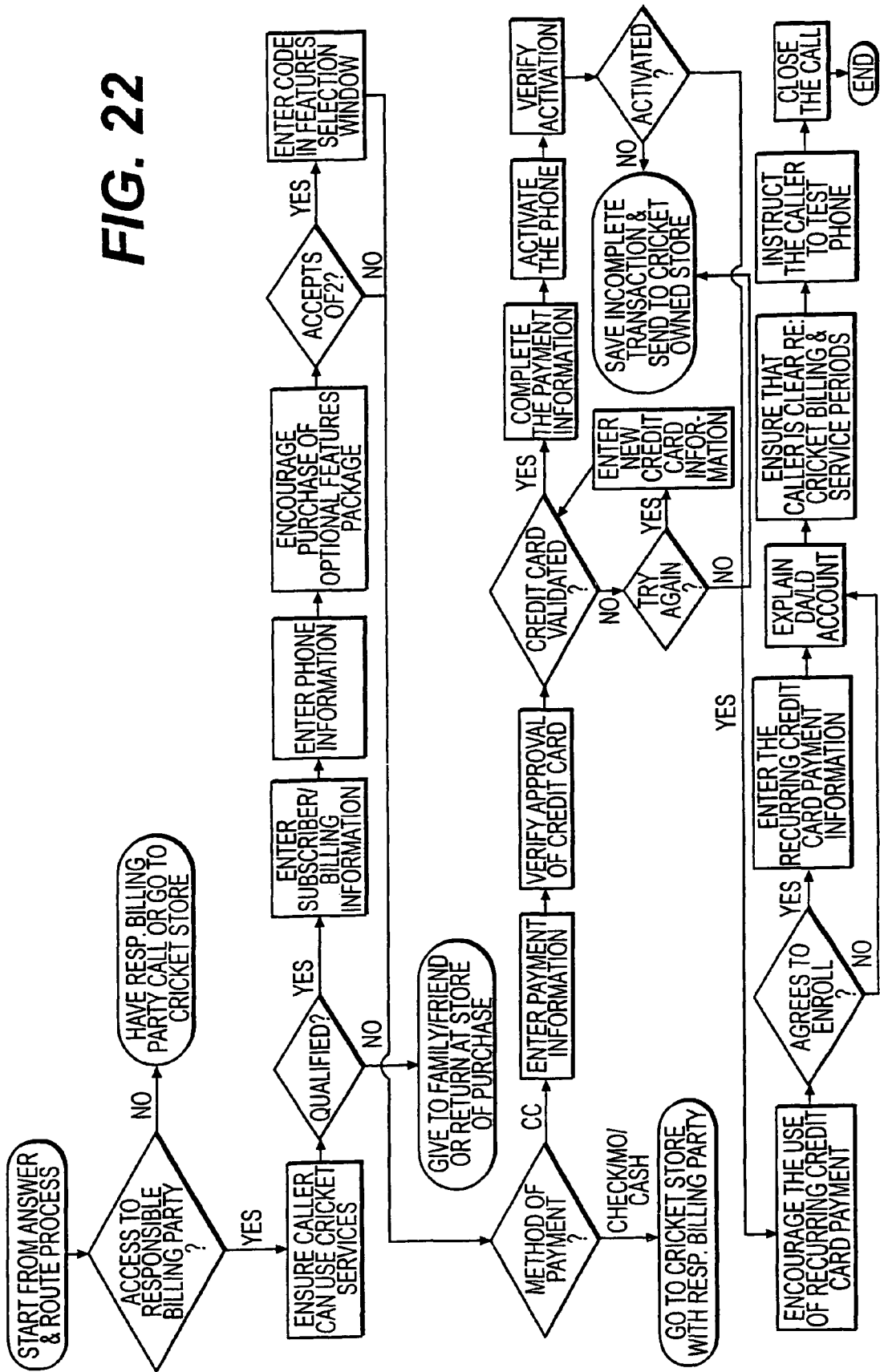
FIG. 22 is a flowchart depicting the process of set up and activation of a preferred embodiment of the present invention.
Figure 23:
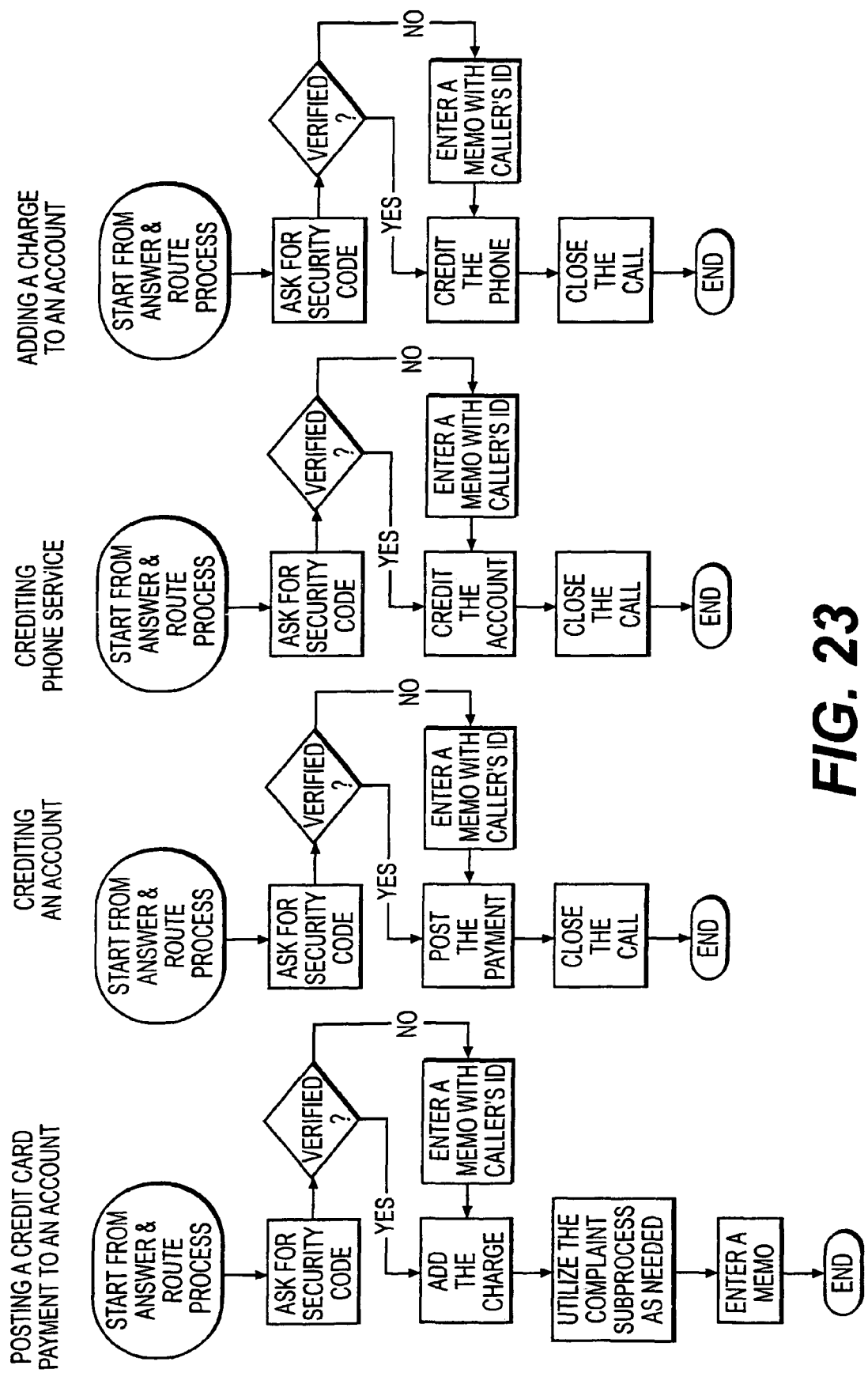
FIG. 23 depicts a process for adjusting the financial aspects of an account, for a preferred embodiment of the present invention.
Figure 24:
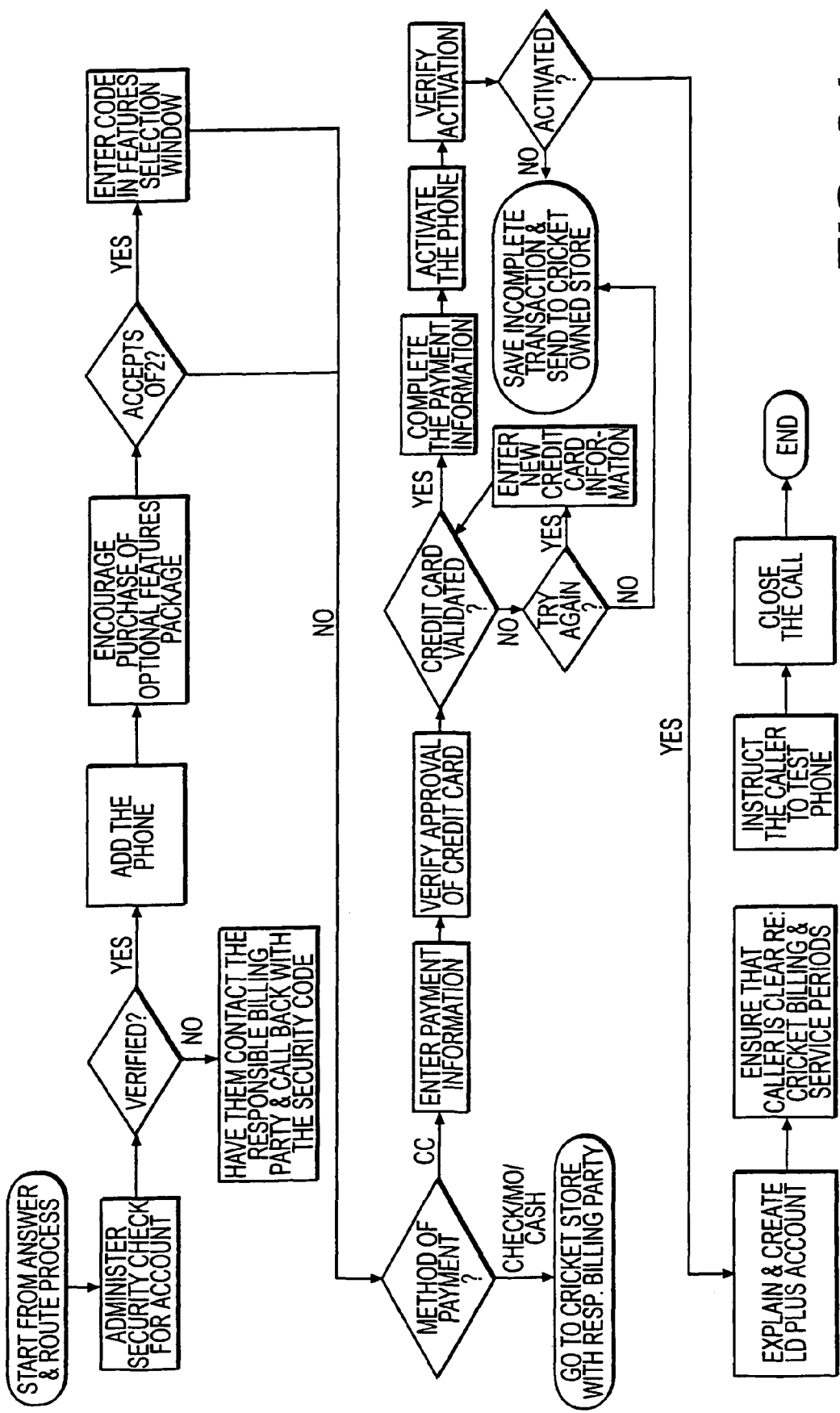
FIG. 24 is a flowchart depicting how to add a phone to an account in a preferred embodiment of the present invention.
Figure 25:
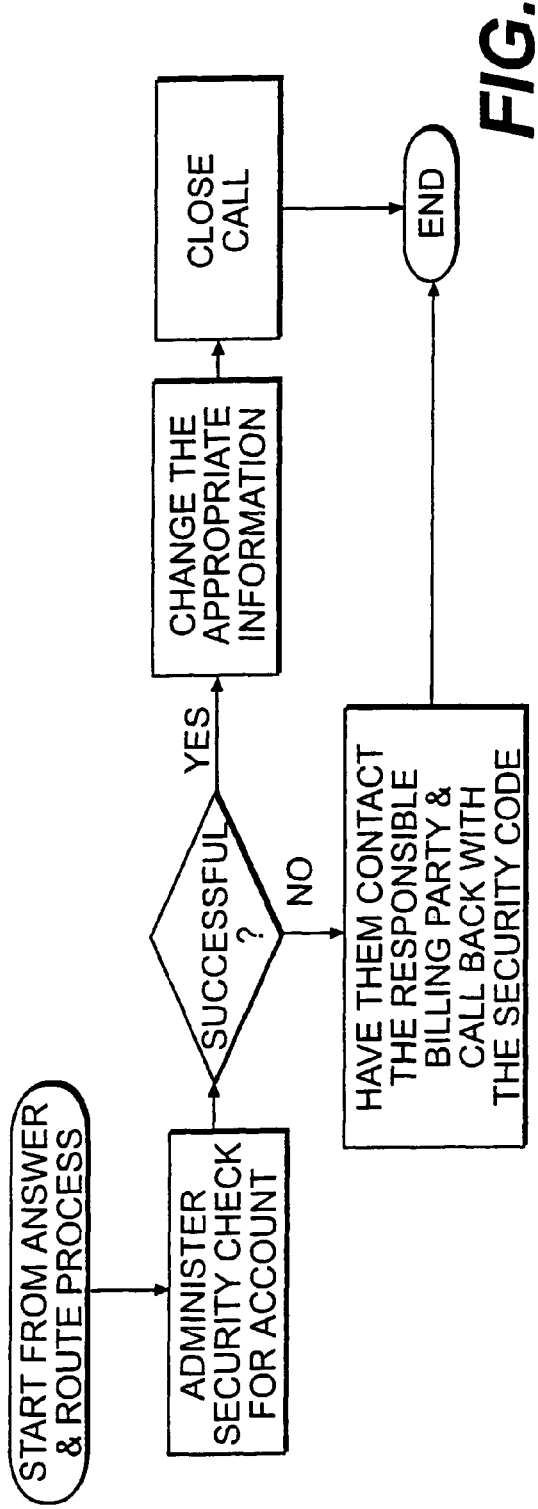
FIG. 25 is a flowchart depicting how to change general information on an existing account in a preferred embodiment of the present invention.
Figure 27:
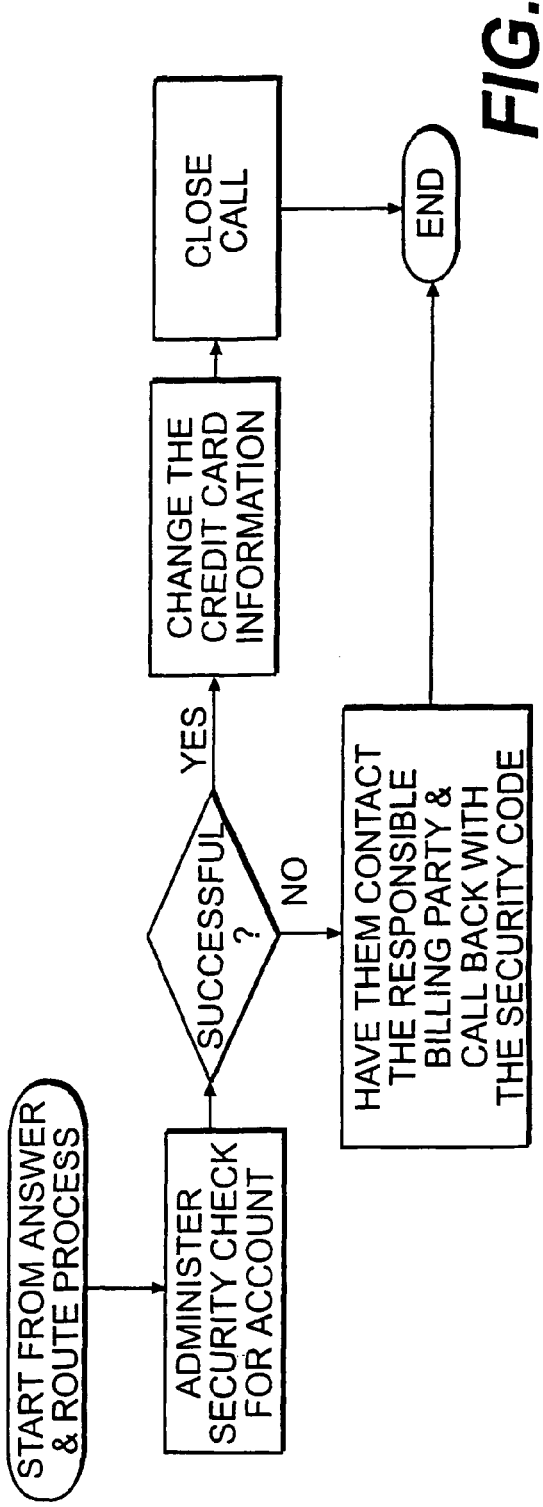
FIG. 27 is a flowchart depicting a process for changing credit card information in a preferred embodiment of the present invention.
Figure 26:
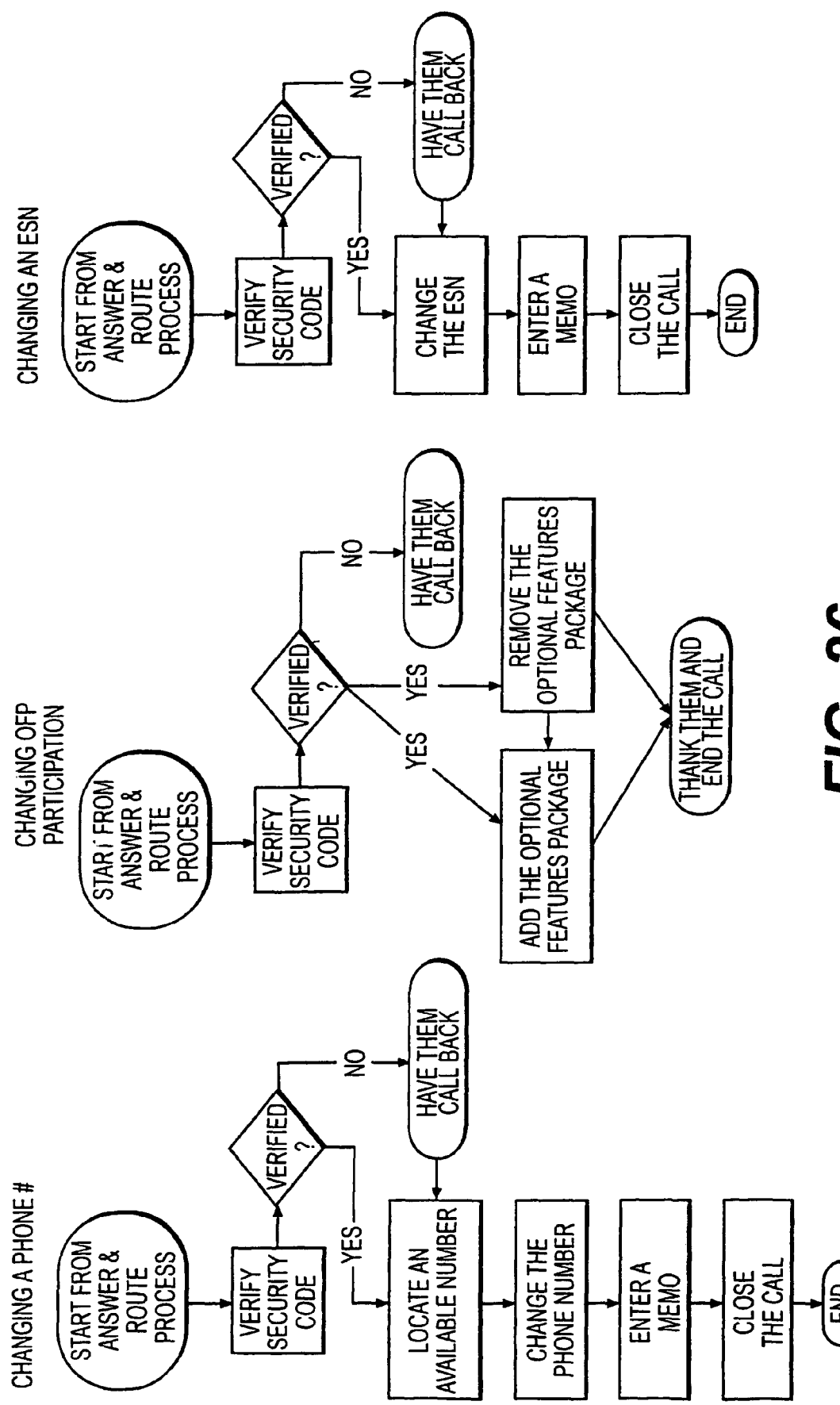
FIG. 26 is a flowchart depicting a process for changing a phone number and adjusting acceptance of optional features in a preferred embodiment of the present invention.
Figure 28:
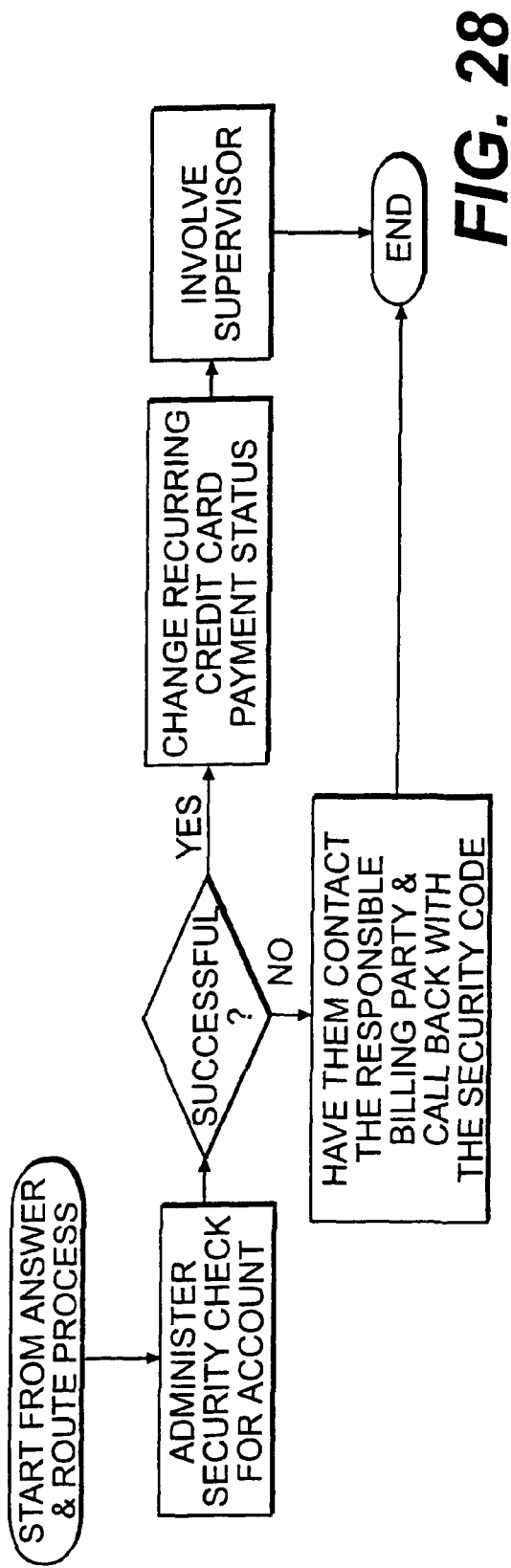
FIG. 28 is a flowchart depicting a process for changing recurring credit card payment information in a preferred embodiment of the present invention.
Figure 29:
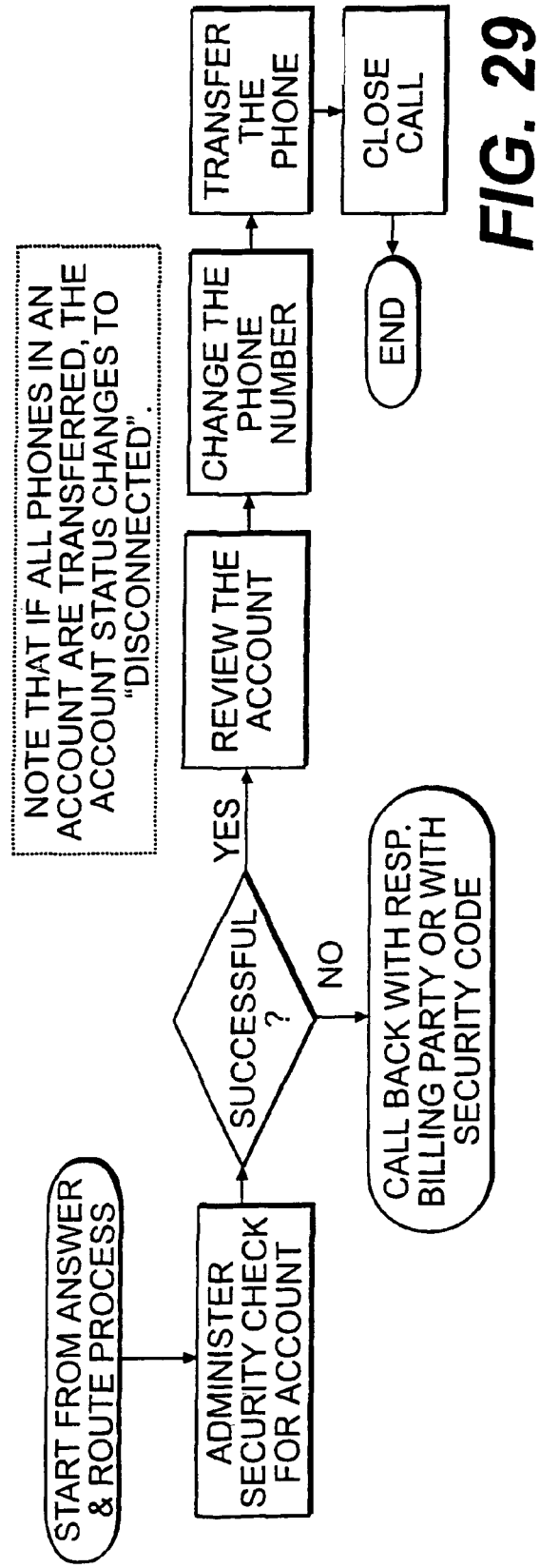
FIG. 29 is a flowchart depicting a process for transferring a phone in a preferred embodiment of the present invention.

FIG. 22 is a flowchart depicting the process for set up and activation. The goal of the process is to provide service in one-call resolution wherever possible. FIG. 23 depicts a process for adjusting the financial aspects of an account, including posting credit card payment, accrediting an account, crediting phone service, or adding a charge to an account. FIG. 24 is a flowchart depicting how to add a phone to an account in a preferred embodiment of the operation method of the present invention. FIG. 25 is a flowchart that explains how to change general information on an existing account in a preferred embodiment of the present invention. The process is complete when the subscriber's information has been verified for accuracy and the system has been adjusted. FIG. 26 depicts the process for changing a phone number and adjusting acceptance of the optional features offered by the wireless system operator in a preferred embodiment of the present invention. FIG. 27 depicts the process for changing credit card information in a preferred embodiment of the present invention. Similarly, FIG. 28 depicts the process for changing recurring credit card payment information in a preferred embodiment of the present invention. FIG. 29 is a flowchart depicting the process for transferring a phone, in a preferred embodiment of the present invention.

One of the features of the present invention that enables the system operator to maintain at cost is the elimination of accounts receivable and collections. This is accomplished through billing and payment in advance of receipt of the services.

Figure 30:
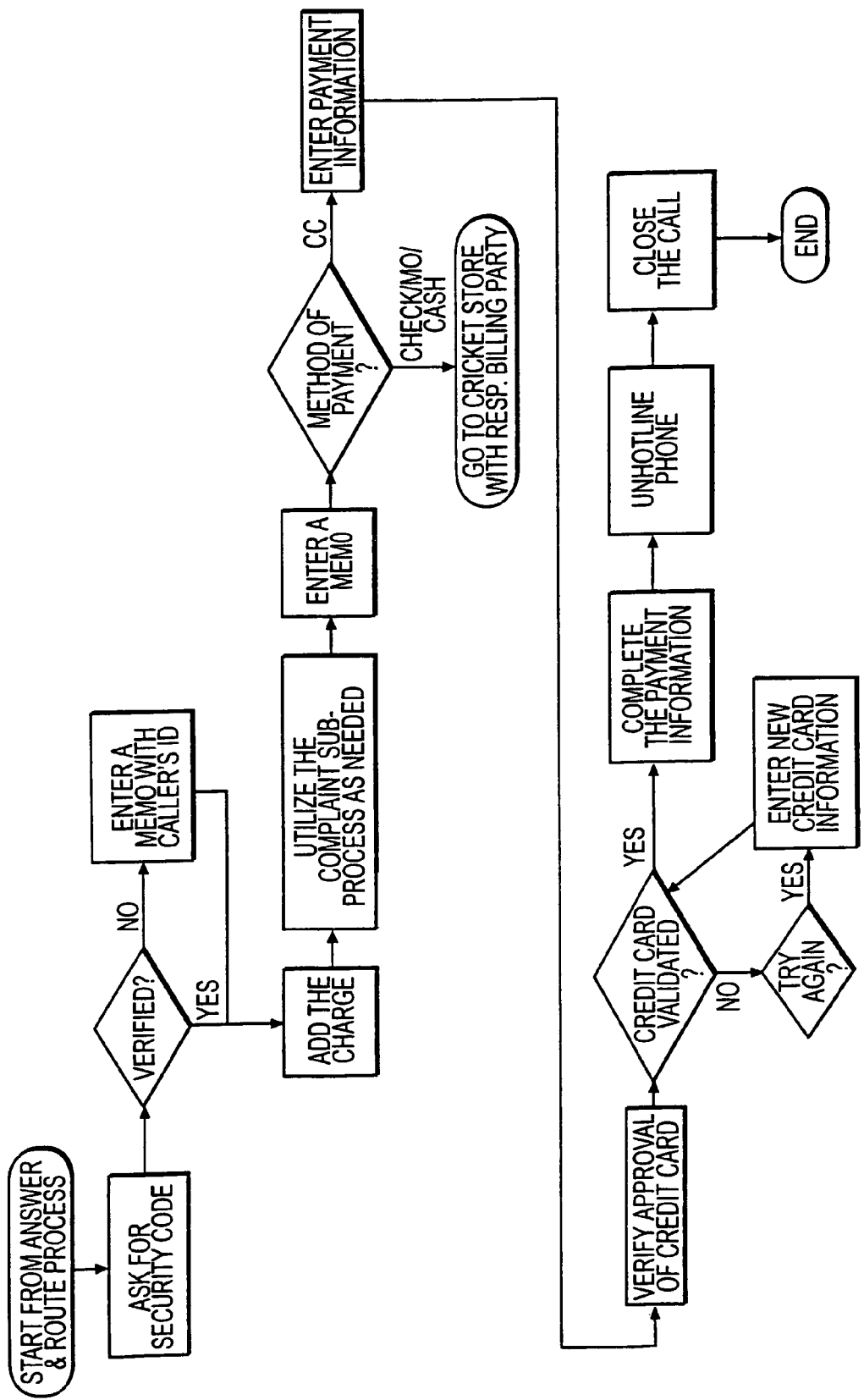
FIG. 30 is a flowchart depicting a process of "hotlining" and the process of restoring hotlined service in a preferred embodiment of the present invention.

The present inventors have found that it is not sufficient simply to prebill and require prepayment. In the absence of affirmative steps to prevent accrual of bad debt, back office costs can still become unnecessarily high. In a preferred embodiment of the present invention, service is terminated within a short period of time after the beginning of the month, if the user has not in fact prepaid their service for that month. Typically, in a preferred embodiment of the present invention, if a user has not paid by the fifth day of the month, services terminated and the account is "hotlined." FIG. 30 depicts the process of hotlining and the process of restoring hotlined service to an account. Since the hotlining and restoration is strictly a payment process on the part of the caller, security code verification is unnecessary, further reducing back office costs. An account may be hotlined either voluntarily or involuntarily in the preferred embodiment of the present invention.

Figure 33:
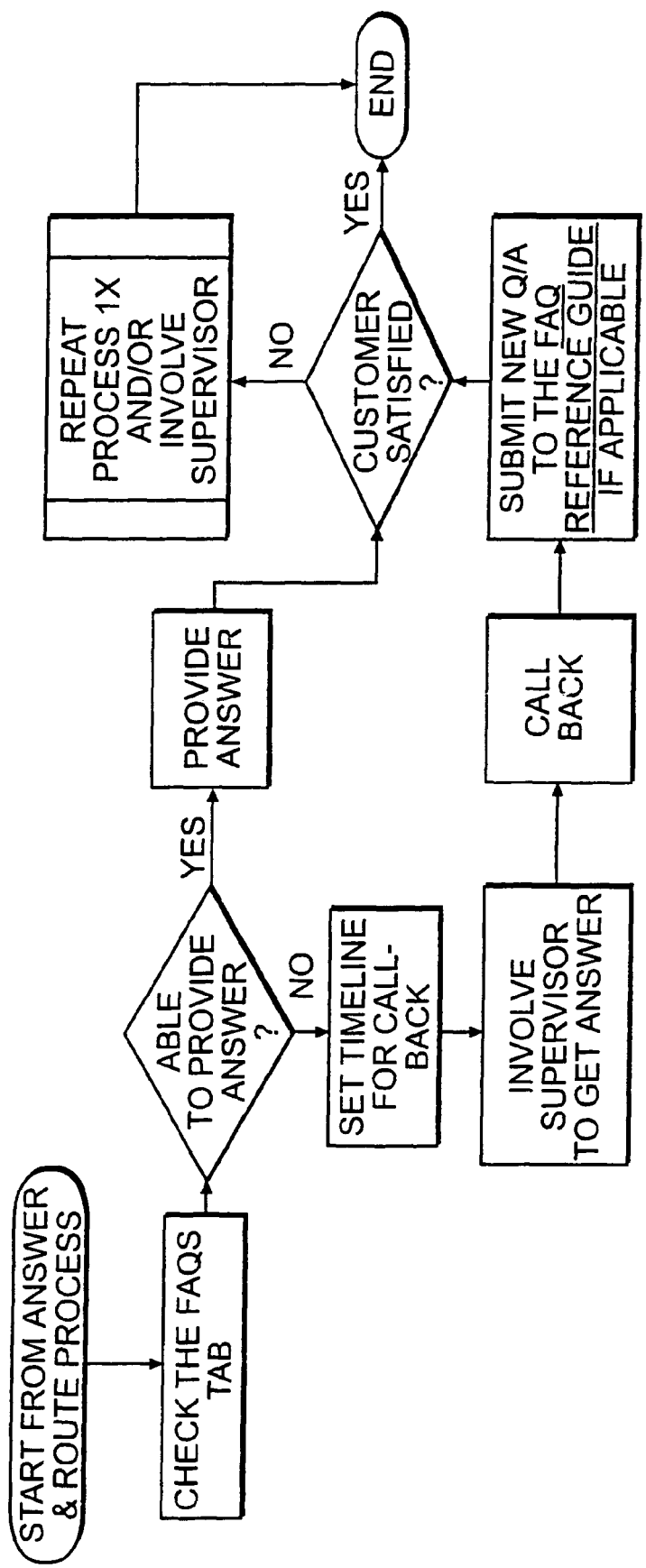
FIG. 33 is a flowchart depicting a process for dealing with frequently asked questions in a call center of a preferred embodiment of the present invention.

FIG. 31 depicts the process for removing a phone from a multi-phone account. FIG. 32 depicts the process of disconnecting a phone from a single phone account. Another key feature that the present inventors have found has helped reduce back office costs is to detail as many of the frequently asked questions as possible, and enable the call center to anticipate inquiries. FIG. 33 depicts a process for dealing with frequently asked questions and updating the standardized list of frequently asked questions when call center personnel encounters issues that have not been previously covered.

Figure 34:
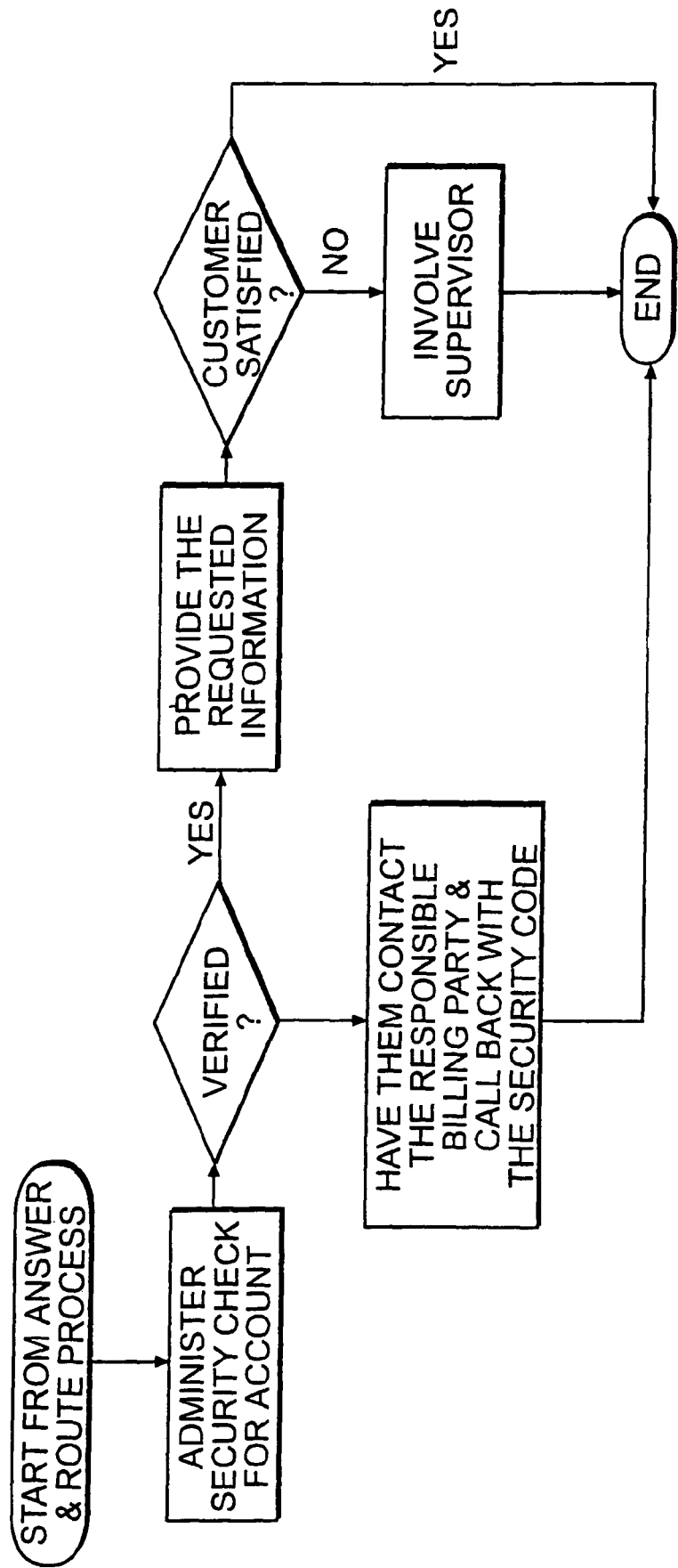
FIG. 34 is a flowchart depicting the steps involved in handling billing questions in a preferred embodiment of the present invention.

Another key component for reducing back office costs and achieving the cost advantages of the present invention is a reduction in the number of billing inquiries. This is accomplished in a preferred embodiment of the present invention by eliminating detailed call records. Most of the call center call traffic relates to questions about specific calls. Elimination of detailed records eliminates that call traffic and of the associated costs. FIG. 34 is a flowchart that depicts the steps involved in handling billing questions, in a preferred embodiment of the present invention.

The present inventors believe that by standardizing as many of the back office and call center processes as possible, and imposing rigorous quality control, the costs associated with operating the back office component of the wireless communications network can be reduced dramatically providing a number of the advantages of the present invention.

Adapting an Existing Network Infrastructure to the Business Model of the Present Invention The present inventors anticipate that in view of the distinct and substantial advantages of the present invention, operators of networks of the type known prior to the present invention may adapt their exiting network to the business model, operation method, and/or network design of the present invention, thereby expanding their level of service to customers and deriving substantial additional revenues. Due to some of the differences in the operations method in network design of the present invention relative to prior known wireless communication systems, re-engineering the cost structure of an existing network has certain distinct advantages. The Assignee of the application is aware of several competitors who have, after launch of Assignee's services, attempted to copy Assignee's fixed price, unlimited use offering.

Figure 20A:
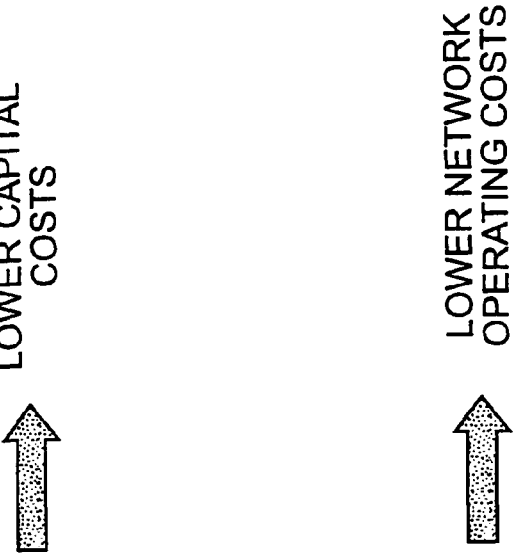
FIG. 20a is a chart illustrating the re-engineering of the cost structure of a wireless system according to the present invention.
Figure 20B:
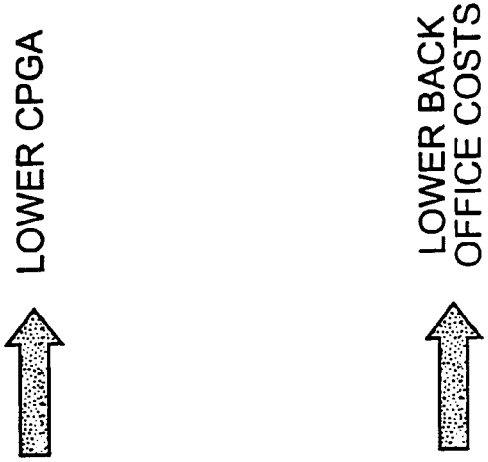
FIG. 20b is a chart illustrating the re-engineering of the cost structure of a wireless system according to the present invention.

FIG. 20a and 20b depict several of the discreet steps that may be used in a preferred process of re-engineering the cost structure of an existing network to achieve some of the advantages of the present invention. For example, the improvements in network build-out would result in lower capital costs. Improvements in network operations of the present invention would reduce substantially the back office and call center costs, which results in lower network operating costs. Customer acquisition costs would also fall, due to the rapid, simple sales cycle and direct distribution to a larger pool of prospective customers. This too would result in lower cost per gross add. Similarly, with respect to customer service, the high capacity and quality of the network, simplified billing, and reduced reliance by the customer on the back office operations results overall in lower back office costs.

Nonetheless, upgrading an existing PCS-type network to provide adequate capacity for the expected first year subscribers for the wireless communication service of the present invention may require substantial capital investment. Assuming approximately 6 percent penetration, in addition to the existing mobility subscribers, upgrading may require incremental capital expenditures equal to approximately 70 percent of the network's original cost.

Implementing an offering of the type of the present invention in addition to an established brand of wireless service would tend to dilute and devalue the existing brand. Creation of a separate brand for the offering of the present invention, on the other hand, would avoid dilution to and devaluation of the existing brand. It tends to be very difficult for a single organization to effectively implement different marketing strategies aimed at different audiences. Creating a separate brand and distinct organization, therefore, would more likely succeed by virtue of its single market focus. The offering of the present invention, however, may lead to migration of high ARPU mobility customers to the lower ARPU plan of the present invention. In addition, the service offerings of existing wireless communications networks of the type known prior to the present invention are focused in a different manner than that of the present invention. Existing mobility services tend to require broader geographic coverage and enhanced features. In contrast, the wireless communication services of the present invention require narrow geographic coverage, relatively limited features, and high capacity.

Table 9 depict some of the assumptions and differences between the present invention and a typical PCS based system.

TABLE 9

Key Assumptions in Converting a PCS-Type System to the System of the Present Invention

| Assumption/Criterion | PCS-Type System | Present Invention |
|---|---|---|
| Covered Pots | 1.0 m | 1.0 m |
| Covered Area | 1,200 km sq. | 1,200 km sq. |
| Cell Sites Coverage | 96 | 96 |
| Cell Sites Highway | 10 | 0 |
| Minutes of Use | 325 | 1000 |
| Busy Hour Days | 22 | 24 |
| Percent of Calls Blocked | 12% | 8% |
| Erlangs Per Subscriber | 0.030 Erlangs | 0.055 Erlangs |

Table 10 depicts some of the capital expenditure required to convert an existing network of the type known prior to the present invention to the business method, operation, and/or network of the present invention.

TABLE 10

Capital Expenditure to Convert an Existing PCS-Type System to Wireless Communication Network of the Present Invention

| PCS-Type System | PCS-Type System | Present Invention | Present Invention |
|---|---|---|---|
| Cell Sites Coverage | 96 | Additional Carriers | 155 |
| Highway Sites | 10 | Additional Optimization | $2.6M |
| Total Capital Expenditure | $477M | Total Capital Expenditure | $33.6M |

Therefore, the present inventors anticipate that it could cost 70 percent more in terms of capital expenditure to convert a wireless communications network of the type known prior to the present invention to the business method, operation method, and/or network of the present invention.

In fact, other operators have attempted to copy the business method, operations method, network, and/or system of the present invention. In the fall of 2000, BellSouth, AllTel, and US Cellular, each announced the launch of unlimited service plans in the Knoxville, Tenn.; Tucson, Ariz., and Albuquerque, N. Mex.; and Knoxville, Tenn. markets, respectively. AllTel's offering, in particular, provides evidence of secondary considerations supporting the patentability of the present invention.

Although AllTel had previously stated that they would not launch an offering of the type of the present invention, upon learning details of the Assignee's success using the business method, operations method, network, and system of the present invention, AllTel copied some of the critical features of the invention.

In particular, AllTel abandoned its prior skepticism of the invention and adopted several features of the invention including, without limitation: flat rate billing for unlimited service at a low level of ARPU; bill-in-advance and pay-in-advance service; and separate branding, along with other features.

Applicant does not assert that all prepaid plan offerings would use the present invention. For example, Freedom Wireless, the assignee of U.S. Pat. No. 6,157,823, recently sued a number of operators for use of a prepaid subscriber account feature. Nonetheless, prepaid service for a predetermined number of minutes of use could be employed along with other of the elements or embodiments of the present invention, in lieu of the flat rate, unlimited use elements of the present invention.

It will be apparent to persons of ordinary skill in the art that various modifications and variations may be made to the business method, operations method, network and/or system of the present invention, without departing from the scope or spirit of the invention. For example, each of the principal embodiments of the invention may be used separately or in conjunction-with one or another. Further, each of the various elements identified with each embodiment may be used either separately, in conjunction with one another, as well as in conjunction with elements of other or both of the remaining embodiments of the present invention. Moreover, depending on the type and disposition of the system an operator is running, certain of the embodiments and/or elements may provided substantial or little relative additional benefit. The present inventors do not intend that it is necessary to adopt any particular embodiment or all or any particular elements of any one or more embodiments of the invention. Rather, depending on the functionality and benefits desired, the operator may use the inventions in various combinations of the embodiments and elements of the intention. Various changes may be made in the network architecture, systems, and components of the present invention, as well as in the technology employed and standards governing the operation of the system. The present inventors intend that their invention would provide a viable business model to improve wireless communication services, in spite of any differences in network architecture, technology standards, or components, either as they exist today or as they may be develop in the future. Thus, it is intended that the present invention cover the modifications and variations of the invention provided they come within the scope of the appended claims and their equivalents

The invention claimed is:

1. A method of providing wireless communication services, the method comprising:
   establishing a wireless communication service plan that includes at least one voice service and at least one data service;
   permitting a mobile communication device user to subscribe to the wireless communication service plan;
   receiving at least a partial payment corresponding to the wireless communications service plan from the mobile communication device user; and
   providing, responsive to receiving the at least partial payment, wireless communication service to the mobile communication device user in accordance with the wireless communication service plan, wherein access to at least one of the at least one voice service and at least one data service under the wireless communication service plan is unlimited.

2. The method of claim 1, wherein the wireless communication service plan comprises a flat-rate plan.

3. The method of claim 1, further comprising:
   providing unlimited access to both the at least one voice service and the at least one data service under the wireless communication service plan.

4. The method of claim 1, wherein receiving at least a partial payment further comprises receiving an automated payment.

5. The method of claim 1, wherein the at least one voice service comprises nationwide long-distance calling.

6. The method of claim 1, wherein the at least one data service comprises download services for retrieving Internet content.

7. The method of claim 1, wherein the at least one data service comprises Short Message Service (SMS) messaging.

8. The method of claim 1, wherein the at least one data service comprises transfer of video data.

9. The method of claim 1, wherein the wireless communication service plan includes a first data service for which use is unlimited and a second data service for which use is limited.

10. The method of claim 1, wherein the wireless communication service plan includes a first voice service for which use is unlimited and a second voice service for which use is limited.

11. A method of providing wireless communication services, the method comprising:
 establishing a flat-rate wireless communication service plan that includes unlimited access to a data service;
 receiving an advance payment associated with a mobile communication device for the flat-rate wireless communication service plan, the advance payment corresponding to a predetermined period of time; and
 providing, responsive to receiving the advance payment, wireless communication service to the mobile communication device, for the predetermined period of time, in accordance with the flat-rate wireless communication service plan.

12. The method of claim 11, wherein the flat-rate wireless communication service plan further includes unlimited access to voice service.

13. The method of claim 12, wherein the voice service is at least partially provided using Voice over Internet Protocol (VoIP).

14. The method of claim 11, wherein the data service is provided using Code Division Multiple Access (CDMA) technology.

15. The method of claim 11, wherein the data service comprises text messaging.

16. The method of claim 15, wherein the flat-rate wireless communication service plan further includes data download service adapted to provide access to Internet content.

17. The method of claim 16, wherein the flat-rate wireless communication service plan provides unlimited access to the data download service.

18. The method of claim 11, wherein receiving an advance payment further comprises:
 automatically charging a credit card associated with a user of the mobile communication device.

19. The method of claim 11, wherein a coverage area corresponding to the flat-rate wireless communication service plan comprises a sub-national coverage area.

20. The method of claim 11, further comprising:
 determining that an advanced payment for a current period has not been received from a subscriber to the flat-rate wireless communication service plan; and
 suspending services under the flat-rate wireless communication service plan for a mobile communication device corresponding to the subscriber until the advanced payment is received.

* * * * *